US012568304B2

(12) United States Patent
    Komiya et al.

(10) Patent No.: US 12,568,304 B2
(45) Date of Patent: Mar. 3, 2026

(54) IMAGE PROCESSING APPARATUS, IMAGING APPARATUS, IMAGE PROCESSING METHOD, AND PROGRAM

(71) Applicant: FUJIFILM Corporation, Tokyo (JP)

(72) Inventors: Yuma Komiya, Saitama (JP); Akihiro Uchida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 131 days.

(21) Appl. No.: 18/338,190

(22) Filed: Jun. 20, 2023

(65) Prior Publication Data

US 2023/0336864 A1     Oct. 19, 2023

Related U.S. Application Data

(63) Continuation of application No. PCT/JP2021/047376, filed on Dec. 21, 2021.

(30) Foreign Application Priority Data

Dec. 28, 2020     (JP) ................................. 2020-219152

(51) Int. Cl.
    *H04N 23/63*          (2023.01)
    *G02B 7/36*           (2021.01)
                (Continued)

(52) U.S. Cl.
    CPC ............. *H04N 23/633* (2023.01); *G02B 7/36* (2013.01); *G03B 7/093* (2013.01); *G06T 7/11* (2017.01);
                (Continued)

(58) Field of Classification Search
    CPC ...... H04N 23/633; H04N 23/73; H04N 23/61; H04N 23/617; H04N 23/635; G02B 7/36;
                (Continued)

(56) References Cited

U.S. PATENT DOCUMENTS 9,372,874 B2 * 6/2016 Yuki ...................... H04N 23/64
2008/0024609 A1 1/2008 Konishi
                (Continued)

FOREIGN PATENT DOCUMENTS

JP     2007-282119 A     10/2007
JP     2009-077266 A     4/2009
                (Continued)

OTHER PUBLICATIONS

International Search Report issued in PCT/JP2021/047376; mailed Mar. 15, 2022.

(Continued)

*Primary Examiner* — Ahmed A Berhan

(74) *Attorney, Agent, or Firm* — Studebaker Brackett PLLC

(57)          ABSTRACT

There is provided an image processing apparatus including a processor and a memory connected to or built into the processor. The processor is configured to: detect a plurality of subjects based on a captured image obtained by being captured by an imaging apparatus; select, from among the plurality of subjects, a first subject and a second subject that is present within a range of a first distance from the first subject in an in-plane direction of the captured image; and output display data for displaying, on a display, the captured image, a first indicator that specifies a first subject image showing the first subject, and a second indicator that specifies a second subject image showing the second subject in a mode different from a mode of the first indicator.

24 Claims, 33 Drawing Sheets

(51) Int. Cl.

| | | |
|---|---|---|
| *G03B 7/093* | (2021.01) | |
| *G06T 7/11* | (2017.01) | |
| *H04N 23/61* | (2023.01) | |
| *H04N 23/73* | (2023.01) | |

(52) U.S. Cl.
CPC ... *H04N 23/73* (2023.01); *G06T 2207/20081* (2013.01); *G06T 2207/30242* (2013.01)

(58) Field of Classification Search
CPC . G03B 7/093; G06T 7/11; G06T 2207/20081; G06T 2207/30242; G06V 10/82; G06V 40/174; G06V 10/454
See application file for complete search history.

(56) References Cited

U.S. PATENT DOCUMENTS

| | | | |
|---|---|---|---|
| 2008/0118156 | A1 | 5/2008 | Okada |
| 2009/0237521 | A1 | 9/2009 | Nishijima |
| 2013/0169850 | A1* | 7/2013 | Oyama .................. H04N 23/61 345/672 |
| 2013/0194480 | A1 | 8/2013 | Fukata et al. |
| 2014/0081956 | A1 | 3/2014 | Yuki |
| 2019/0157876 | A1 | 5/2019 | Dobrowolski et al. |
| 2019/0286938 | A1 | 9/2019 | Backhus et al. |

FOREIGN PATENT DOCUMENTS

| | | | |
|---|---|---|---|
| JP | 2009-164820 | A | 7/2009 |
| JP | 2009-231956 | A | 10/2009 |
| JP | 2013-135446 | A | 7/2013 |
| JP | 2013-153376 | A | 8/2013 |
| JP | 2019-097380 | A | 6/2019 |
| JP | 2019-201387 | A | 11/2019 |

OTHER PUBLICATIONS

International Preliminary Report On Patentability (Chapter I) and Written Opinion of the International Searching Authority issued in PCT/JP2021/047376; issued Jul. 4, 2023.

Extended European Search Report issued in EP 21915154.5-1207 by the European Patent Office on Aug. 27, 2024, which is related to U.S. Appl. No. 18/338,190.

The partial supplementary European search report (R. 164 EPC) issued by the European Patent Office on May 31, 2024, which corresponds to European Patent Application No. 21915154.5-1207 and is related to U.S. Appl. No. 18/338,190.

Communication pursuant to Article 94(3) EPC issued by the European Patent Office on Oct. 1, 2025, which. Corresponds to European Patent Application No. 21915154.5-1207 and is related to U.S. Appl. No. 18/338,190.

An Office Action, "Notice of Reasons for Refusal," mailed by the Japanese Patent Office on Jan. 6, 2026, which corresponds to Japanese Patent Application No. 2022-573014 and is related to U.S. Appl. No. 18/338,190; with English language translation.

* cited by examiner

[REAR SURFACE VIEW]

Figure 11:
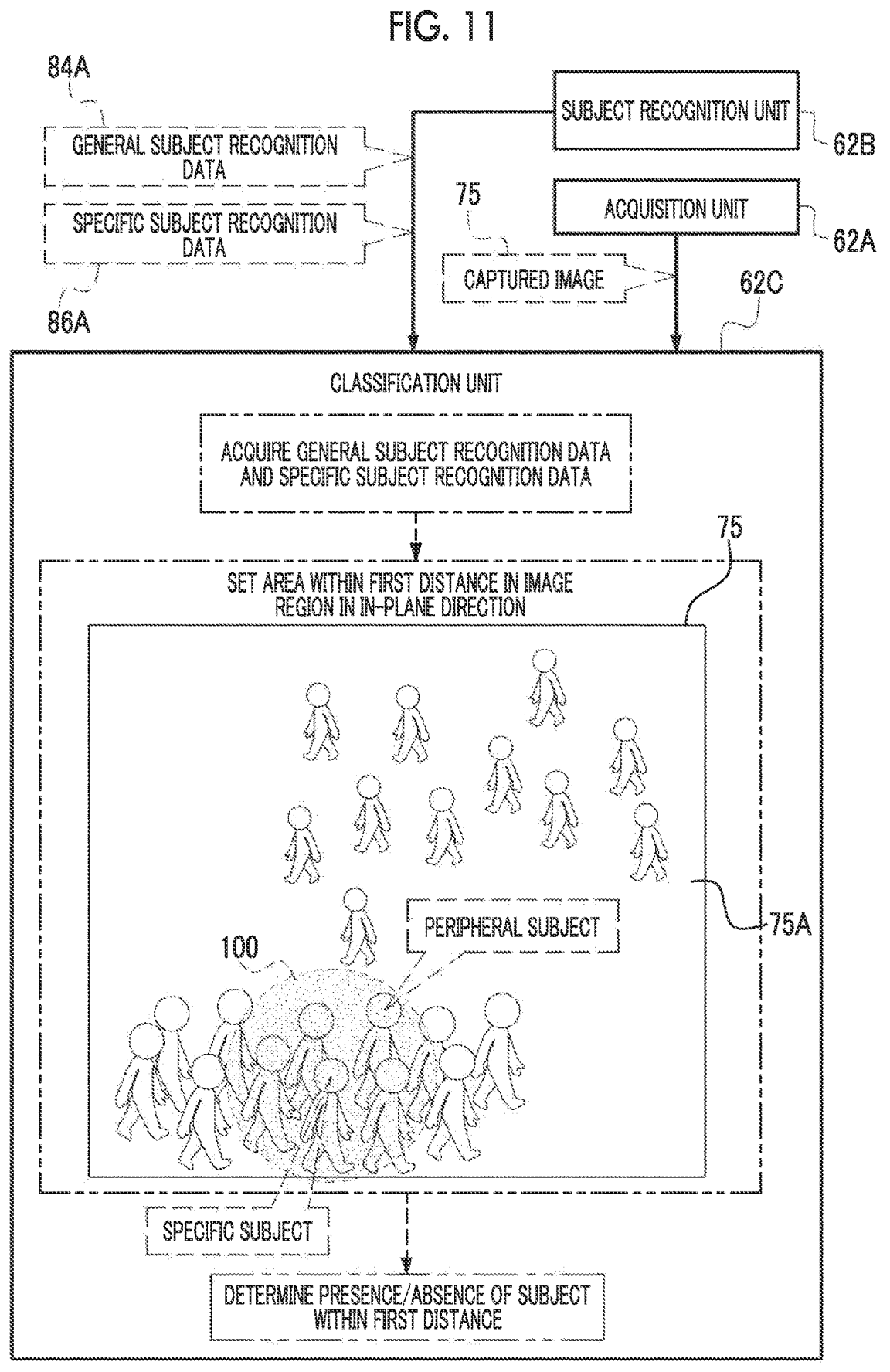

GENERAL SUBJECT RECOGNITION DATA

SPECIFIC SUBJECT RECOGNITION DATA

86A

SUBJECT RECOGNITION UNIT — 62B

ACQUISITION UNIT — 62A

75

CAPTURED IMAGE

62C

CLASSIFICATION UNIT

ACQUIRE GENERAL SUBJECT RECOGNITION DATA AND SPECIFIC SUBJECT RECOGNITION DATA

75

SET AREA WITHIN FIRST DISTANCE IN IMAGE REGION IN IN-PLANE DIRECTION

75A

PERIPHERAL SUBJECT

100

SPECIFIC SUBJECT

DETERMINE PRESENCE/ABSENCE OF SUBJECT WITHIN FIRST DISTANCE

Figure 24B:
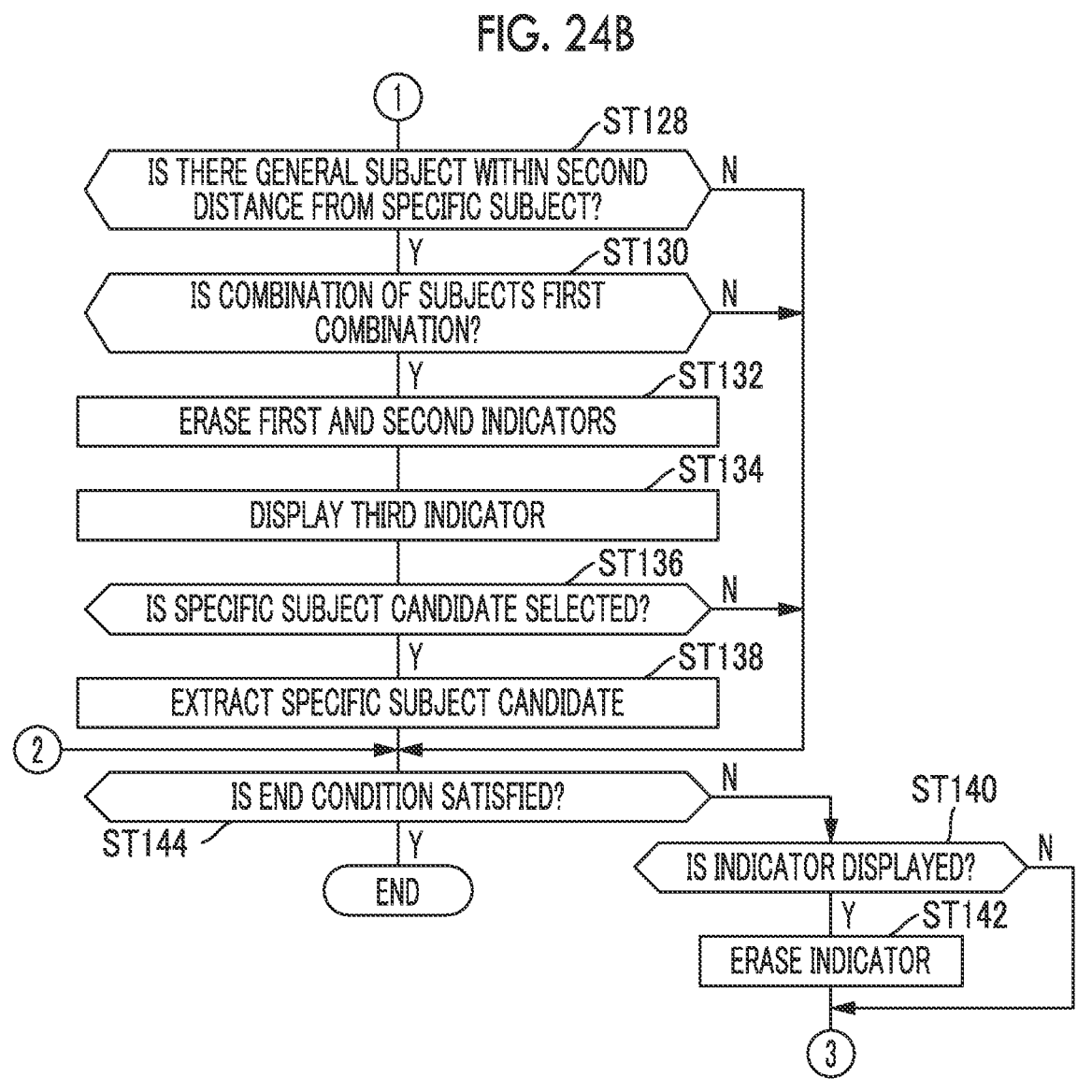

IS THERE GENERAL SUBJECT WITHIN SECOND DISTANCE FROM SPECIFIC SUBJECT?    N

Y    ST130

IS COMBINATION OF SUBJECTS FIRST COMBINATION?    N

Y    ST132

ERASE FIRST AND SECOND INDICATORS

ST134

DISPLAY THIRD INDICATOR

ST136

IS SPECIFIC SUBJECT CANDIDATE SELECTED?    N

Y    ST138

EXTRACT SPECIFIC SUBJECT CANDIDATE

②

IS END CONDITION SATISFIED?    N

ST144    Y    ST140

END

IS INDICATOR DISPLAYED?    N

Y    ST142

ERASE INDICATOR

Figure 30:
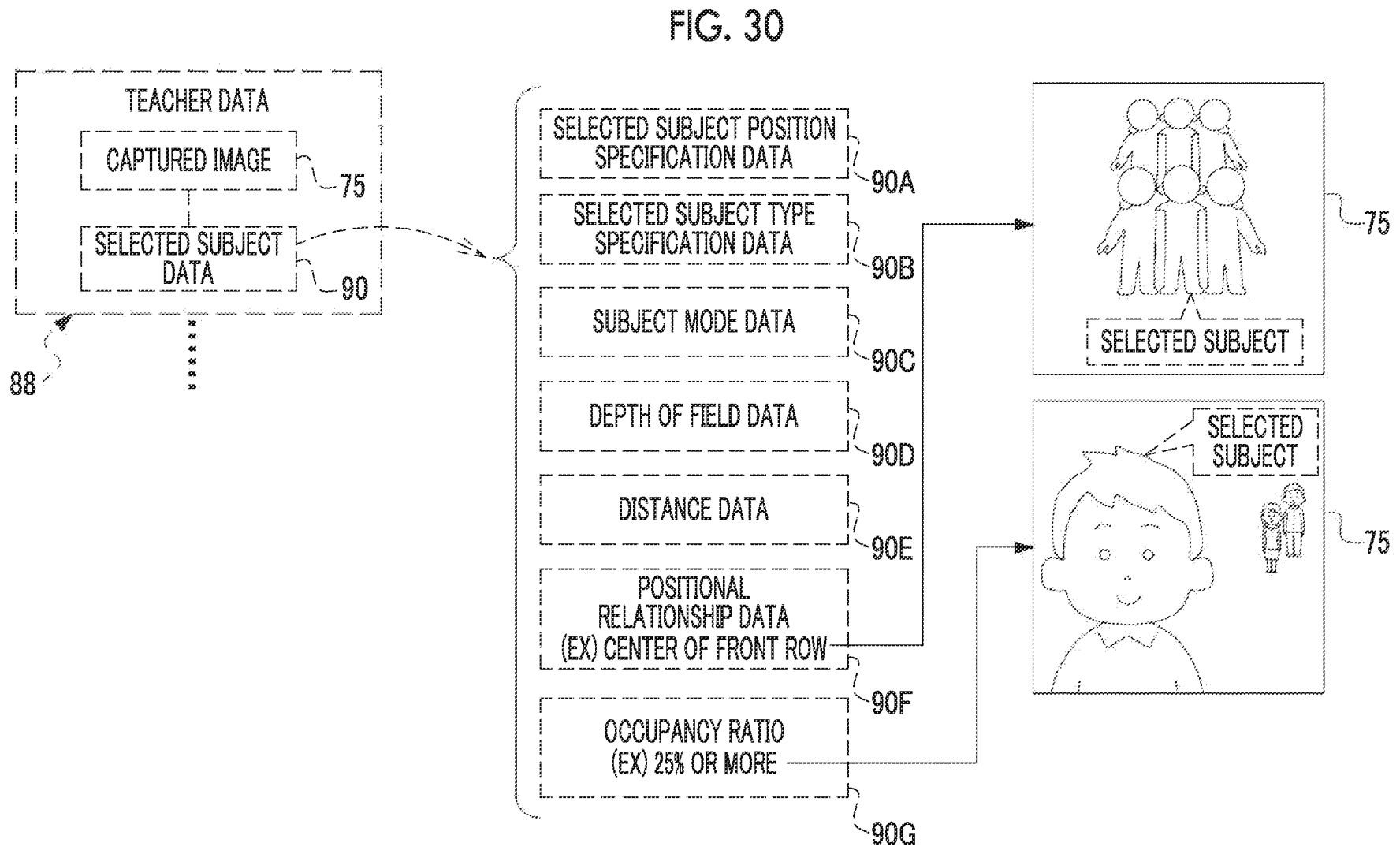

TEACHER DATA

CAPTURED IMAGE — 75

SELECTED SUBJECT DATA — 90

88

90A — SELECTED SUBJECT POSITION SPECIFICATION DATA

90B — SELECTED SUBJECT TYPE SPECIFICATION DATA

90C — SUBJECT MODE DATA

90D — DEPTH OF FIELD DATA

90E — DISTANCE DATA

90F — POSITIONAL RELATIONSHIP DATA (EX) CENTER OF FRONT ROW

90G — OCCUPANCY RATIO (EX) 25% OR MORE

SELECTED SUBJECT

75

SELECTED SUBJECT

75

IMAGE PROCESSING APPARATUS, IMAGING APPARATUS, IMAGE PROCESSING METHOD, AND PROGRAM

CROSS-REFERENCE TO RELATED APPLICATIONS

This application is a continuation application of International Application No. PCT/JP2021/047376 filed Dec. 21, 2021, the disclosure of which is incorporated herein by reference in its entirety. Further, this application claims priority under 35 USC 119 from Japanese Patent Application No. 2020-219152 filed Dec. 28, 2020, the disclosure of which is incorporated by reference herein.

BACKGROUND

1. Technical Field

The present invention relates to an image processing apparatus, an imaging apparatus, an image processing method, and a program.

2. Related Art

JP2013-135446A discloses an imaging apparatus that has an imaging unit, the imaging apparatus includes: a detection unit that detects a predetermined subject image included in an image obtained by being captured by the imaging unit; a classification unit that classifies the subject, which is detected by the detection unit, into a main subject and a non-main subject other than the main subject; a storage unit that stores feature information for specifying the subject and name information representing the subject; and a display control unit that displays the name information, which corresponds to a subject having the feature information stored in the storage unit in the subject in the image obtained by the imaging unit, at a neighborhood position of the corresponding subject, in which the display control unit displays the corresponding name information in a case where the main subject, which is classified by the classification unit, can be specified according to the feature information stored in the storage unit, and displays the corresponding name information for the non-main subject, which is classified by the classification unit, under a condition that both the non-main subject and the main subject can be specified with the feature information stored in the storage unit.

JP2019-201387A discloses a tracking control device including: an acquisition unit that acquires a plurality of continuous frame images including a specific subject from an imaging unit of an imaging apparatus; and a tracking control unit that performs tracking control to cause the imaging unit to track a tracking target that includes the subject, in which the tracking control unit sets, as the tracking target, an object that includes at least one of a feature portion that includes a part of the subject and characterizes the subject or a periphery portion positioned in the periphery of the feature portion, in the frame image.

JP2009-77266A discloses a digital camera including: a release button capable of a half-press operation and a full-press operation that is pushed deeper than the half-press operation; a face detection unit that detects a person's face from an image during a through image display for displaying an image that is output from an imaging unit on a display unit; a face selection order determination unit that determines a face selection order of a plurality of faces based on a predetermined standard in a case where the number of face detections is plural and that sets a face having the highest face selection order as an initial face; and a main face selection unit that selects one face as a main face to be a focus area in a case where the number of face detections is one, selects the initial face as the main face to be the focus area in a case where the number of face detections is plural, and selects a face having the same face selection order as the number of half-press operations as the main face in a case where the release button is half pressed continuously two or more times.

JP2019-097380A discloses an imaging apparatus capable of selecting a main subject. The imaging apparatus according to JP2019-097380A detects the subject from an image and selects the main subject from the detected subject. Further, the imaging apparatus described in JP2019-097380A displays a focus display for a subject within a predetermined depth of field such that a display form of the focus display for a main subject is different from a display form of the focus display for a subject other than the main subject, in a case where the main subject is in focus and the main subject is selected based on an instruction of a user regardless of a difference between a focus detection result for a focus detection region corresponding to the main subject and a focus detection result for a focus detection region corresponding to a subject other than the main subject within the predetermined depth of field.

SUMMARY

One embodiment according to the present disclosed technology provides an image processing apparatus, an imaging apparatus, an image processing method, and a program capable of distinguishing between a target subject and other subjects from among a plurality of subjects, even in a case where the plurality of subjects are densely gathered.

An image processing apparatus according to a first aspect of the present disclosed technology comprises: a processor; and a memory that is connected to or built into the processor, in which the processor is configured to: detect a plurality of subjects based on a captured image obtained by being captured by an imaging apparatus; select, from among the plurality of subjects, a first subject and a second subject that is present within a range of a first distance from the first subject in an in-plane direction of the captured image; and output display data for displaying, on a display, the captured image, a first indicator that specifies a first subject image showing the first subject, and a second indicator that specifies a second subject image showing the second subject in a mode different from a mode of the first indicator.

In the image processing apparatus of the first aspect according to a second aspect of the present disclosed technology, the display data includes first data for displaying a third indicator, which specifies the first subject and the second subject that are present within a second distance in the in-plane direction, on the display.

In the image processing apparatus of the second aspect according to a third aspect of the present disclosed technology, the first data includes data for erasing the first indicator and the second indicator from the display in a case where the third indicator is displayed on the display.

In the image processing apparatus of the first aspect according to a fourth aspect of the present disclosed technology, the display data includes data for displaying a third indicator, which specifies the first subject and the second subject that are present within a second distance in the in-plane direction, on the display instead of the first indicator and the second indicator.

In the image processing apparatus of any one of the second to fourth aspects according to a fifth aspect of the present disclosed technology, the processor is configured to acquire a type of each of the plurality of subjects based on the captured image, and the third indicator is an indicator in which a combination of a type of the first subject and a type of the second subject is a first combination, and the first subject and the second subject that are present within the second distance are specified.

In the image processing apparatus of fifth aspects according to a sixth aspect of the present disclosed technology, the display data includes second data for displaying, on the display, a fourth indicator in which a combination of a type of the first subject and a type of the second subject is a second combination that is different from the first combination, and the first subject and the second subject that are present within a third distance shorter than the second distance are specified.

In the image processing apparatus of the sixth aspect according to a seventh aspect of the present disclosed technology, the second data includes data for erasing the first indicator and the second indicator from the display in a case where the fourth indicator is displayed on the display.

In the image processing apparatus of any one of the first to seventh aspects according to an eighth aspect of the present disclosed technology, the processor is configured to output, in a case where an object indicator, which specifies the first subject and the second subject that are present within a default distance as one object, is displayed on the display, control data for control that is related to an imaging performed by the imaging apparatus, by using a region corresponding to at least a part of the object specified based on the object indicator.

In the image processing apparatus of the eighth aspect according to a ninth aspect of the present disclosed technology, the region corresponding to at least a part of the object is at least one of a first region corresponding to the first subject, a second region corresponding to the second subject, or a third region corresponding to the first subject and the second subject.

In the image processing apparatus of the eighth or ninth aspect according to a tenth aspect of the present disclosed technology, the control that is related to the imaging includes at least one of exposure control, focus control, or white balance control.

In the image processing apparatus of the tenth aspect according to an eleventh aspect of the present disclosed technology, the region corresponding to at least a part of the object is a first region corresponding to the first subject and a second region corresponding to the second subject, and the processor is configured to perform the exposure control based on a brightness of the first region corresponding to the first subject and a brightness of the second region corresponding to the second subject.

In the image processing apparatus of the tenth or eleventh aspect according to a twelfth aspect of the present disclosed technology, the region corresponding to at least a part of the object is a first region corresponding to the first subject and a second region corresponding to the second subject, and the processor is configured to perform the white balance control based on color of the first region corresponding to the first subject and color of the second region corresponding to the second subject.

In the image processing apparatus of any one of the first to twelfth aspects according to a thirteenth aspect of the present disclosed technology, the processor is configured to detect the plurality of subjects according to a first standard.

In the image processing apparatus of any one of the first to thirteenth aspects according to a fourteenth aspect of the present disclosed technology, the processor is configured to detect the first subject based on a second standard different from a standard for detecting the second subject.

In the image processing apparatus of the fourteenth aspect according to a fifteenth aspect of the present disclosed technology, the second standard is a standard defined based on at least one of a distance from the imaging apparatus, a depth of field, or a mode of the subject.

In the image processing apparatus of the fourteenth or fifteenth aspect according to a sixteenth aspect of the present disclosed technology, the second standard is a standard defined based on an instruction received by a reception device.

In the image processing apparatus of any one of the first to sixteenth aspects according to a seventeenth aspect of the present disclosed technology, the processor is configured to specify the first subject by using a trained model obtained by performing machine learning that uses, as teacher data, information including at least one of a parameter specified based on the captured image, a positional relationship between a selected subject that is selected according to an instruction received by a reception device from among the plurality of subjects and a remaining subject, or a mode of the selected subject.

In the image processing apparatus of the seventeenth aspect according to an eighteenth aspect of the present disclosed technology, the captured image includes a first designated subject image that shows a subject designated among the plurality of subjects, and the parameter includes a relative position of the first designated subject image in the captured image.

In the image processing apparatus of the seventeenth or eighteenth aspect according to a nineteenth aspect of the present disclosed technology, the captured image includes a second designated subject image that shows a subject designated among the plurality of subjects, and the parameter includes a value based on a ratio of the second designated subject image within the captured image.

In the image processing apparatus of any one of the first to nineteenth aspects according to a twentieth aspect of the present disclosed technology, the second indicator includes at least one of a number or a symbol specifying the second subject image.

In the image processing apparatus of any one of the first to twentieth aspects according to a twenty-first aspect of the present disclosed technology, the first distance is a distance within the captured image.

An imaging apparatus according to a twenty-second aspect of the present disclosed technology comprises: a processor; a memory that is connected to or built into the processor; and an image sensor, in which the processor is configured to: detect a plurality of subjects based on a captured image obtained by being captured by the image sensor; select, from among the plurality of subjects, a first subject and a second subject that is present within a range of a first distance from the first subject in an in-plane direction of the captured image; and display, on a display, the captured image, a first indicator that specifies a first subject image showing the first subject, and a second indicator that specifies a second subject image showing the second subject in a mode different from a mode of the first indicator.

An image processing method according to a twenty-third aspect of the present disclosed technology comprises: detecting a plurality of subjects based on a captured image obtained by being captured by an imaging apparatus; selecting, from among the plurality of subjects, a first subject and a second subject that is present within a range of a first distance from the first subject in an in-plane direction of the captured image; and outputting display data for displaying, on a display, the captured image, a first indicator that specifies a first subject image showing the first subject, and a second indicator that specifies a second subject image showing the second subject in a mode different from a mode of the first indicator.

A program according to a twenty-fourth aspect of the present disclosed technology causing a computer to execute a process comprises: detecting a plurality of subjects based on a captured image obtained by being captured by an imaging apparatus; selecting, from among the plurality of subjects, a first subject and a second subject that is present within a range of a first distance from the first subject in an in-plane direction of the captured image; and outputting display data for displaying, on a display, the captured image, a first indicator that specifies a first subject image showing the first subject, and a second indicator that specifies a second subject image showing the second subject in a mode different from a mode of the first indicator.

BRIEF DESCRIPTION OF THE DRAWINGS

Exemplary embodiments of the technology of the disclosure will be described in detail based on the following figures, wherein:

FIG. 11 is a conceptual diagram showing an example of the content of processing of a classification unit;

FIG. 24B is a continuation of the flowchart shown in FIG. 24A;

FIG. 27 is a conceptual diagram showing the content of processing of performing control that is related to an imaging;

FIG. 30 is a conceptual diagram showing a modification example of teacher data;

DETAILED DESCRIPTION

Hereinafter, an example of an embodiment of an image processing apparatus, an imaging apparatus, an image processing method, and a program according to the present disclosed technology will be described with reference to the accompanying drawings.

First, the wording used in the following description will be described.

CPU refers to an abbreviation of a "Central Processing Unit". GPU refers to an abbreviation of a "Graphics Processing Unit". TPU refers to an abbreviation of a "Tensor processing unit". NVM refers to an abbreviation of a "Non-volatile memory". RAM refers to an abbreviation of a "Random Access Memory". IC refers to an abbreviation of an "Integrated Circuit". ASIC refers to an abbreviation of an "Application Specific Integrated Circuit". PLD refers to an abbreviation of a "Programmable Logic Device". FPGA refers to an abbreviation of a "Field-Programmable Gate Array". SoC refers to an abbreviation of a "System-on-a-chip". SSD refers to an abbreviation of a "Solid State Drive". USB refers to an abbreviation of a "Universal Serial Bus". HDD refers to an abbreviation of a "Hard Disk Drive". EEPROM refers to an abbreviation of an "Electrically Erasable and Programmable Read Only Memory". EL refers to an abbreviation of "Electro-Luminescence". I/F refers to an abbreviation of an "Interface". UI refers to an abbreviation of a "User Interface". fps refers to an abbreviation of a "frame per second". MF refers to an abbreviation of "Manual Focus". AF refers to an abbreviation of "Auto Focus". CMOS refers to an abbreviation of a "Complementary Metal Oxide Semiconductor". CCD refers to an abbreviation of a "Charge Coupled Device". LAN refers to an abbreviation of a "Local Area Network". WAN refers to an abbreviation of a "Wide Area Network". CNN refers to an abbreviation of a "Convolutional Neural Network". AI refers to an abbreviation of "Artificial Intelligence".

Figure 1:
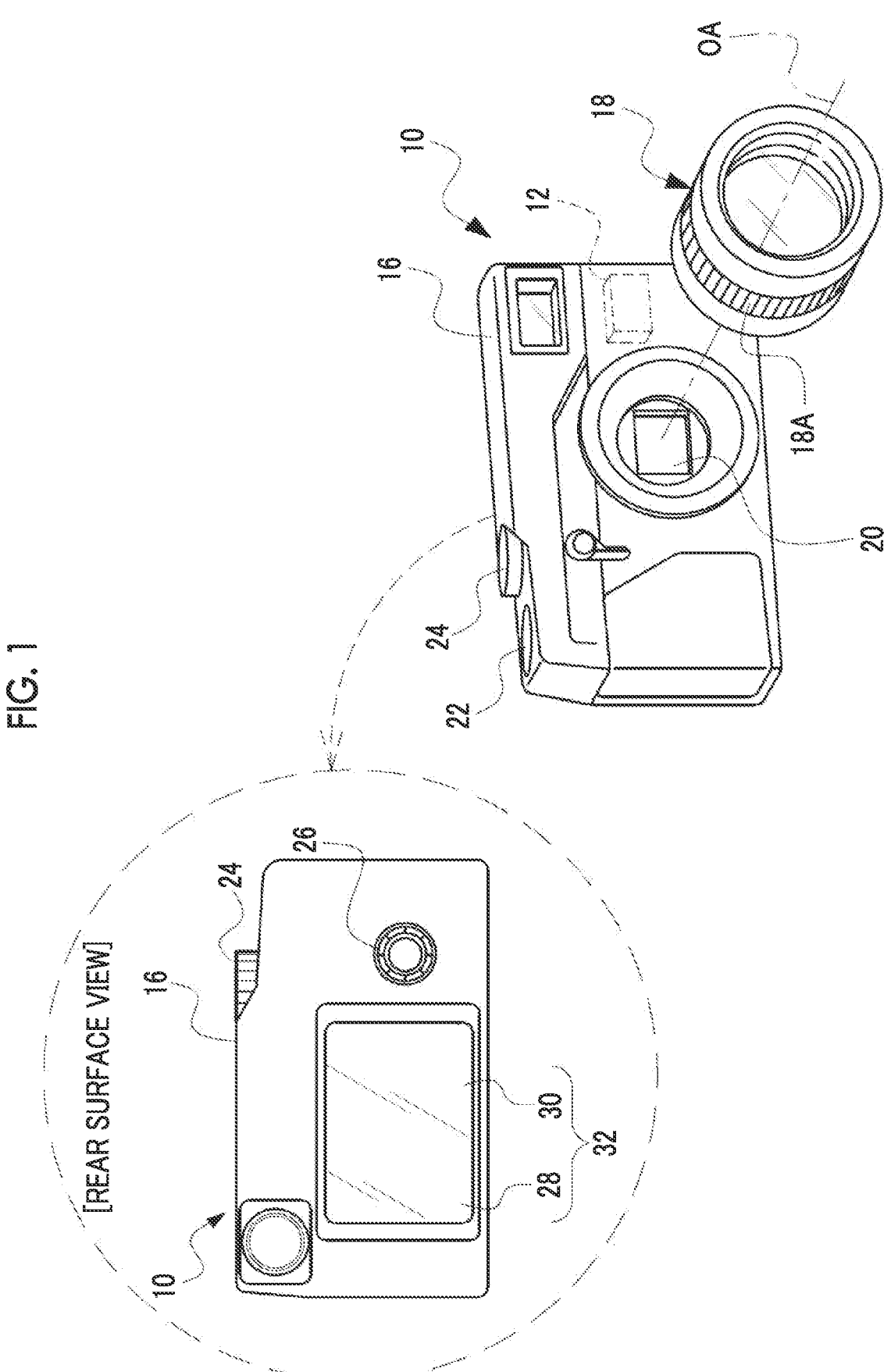
FIG. 1 is a schematic configuration diagram showing an example of a configuration of an entire imaging apparatus.

As an example shown in FIG. 1, the imaging apparatus 10 is an apparatus for imaging a subject and includes a controller 12, an imaging apparatus main body 16, and an interchangeable lens 18. The controller 12 is an example of an "image processing apparatus" and a "computer" according to the present disclosed technology. The controller 12 is built into the imaging apparatus main body 16 and controls the entire imaging apparatus 10. The interchangeable lens 18 is interchangeably attached to the imaging apparatus main body 16. The interchangeable lens 18 is provided with a focus ring 18A. In a case where a user or the like of the imaging apparatus 10 (hereinafter, simply referred to as the "user") manually adjusts the focus on the subject by the imaging apparatus 10, the focus ring 18A is operated by the user or the like.

In the example shown in FIG. 1, a lens-interchangeable digital camera is shown as an example of the imaging apparatus 10. However, this is only an example, and a digital camera with a fixed lens may be used or a digital camera, which is built into various electronic devices such as a smart device, a wearable terminal, a cell observation device, an ophthalmologic observation device, or a surgical microscope may be used.

An image sensor 20 is provided in the imaging apparatus main body 16. The image sensor 20 is a CMOS image sensor. The image sensor 20 captures an imaging range including at least one subject. In a case where the interchangeable lens 18 is attached to the imaging apparatus main body 16, subject light indicating the subject is transmitted through the interchangeable lens 18 and imaged on the image sensor 20, and then image data indicating an image of the subject is generated by the image sensor 20.

In the present embodiment, although the CMOS image sensor is exemplified as the image sensor 20, the present disclosed technology is not limited to this, for example, the present disclosed technology is established even in a case where the image sensor 20 is another type of image sensor such as a CCD image sensor.

A release button 22 and a dial 24 are provided on an upper surface of the imaging apparatus main body 16. The dial 24 is operated in a case where an operation mode of the imaging system, an operation mode of a playback system, and the like are set, and by operating the dial 24, an imaging mode, a playback mode, and a setting mode are selectively set as the operation mode in the imaging apparatus 10. The imaging mode is an operation mode in which the imaging is performed with respect to the imaging apparatus 10. The playback mode is an operation mode for playing the image (for example, a still image and/or a moving image) obtained by the performance of the imaging for recording in the imaging mode. The setting mode is an operation mode for setting the imaging apparatus 10 in a case where teacher data 88 (see FIG. 5), which will be described later, is generated, the teacher data 88 is supplied to a model generation device 92 (see FIG. 6), or various set values used in the control that is related to the imaging are set.

The release button 22 functions as an imaging preparation instruction unit and an imaging instruction unit, and is capable of detecting a two-step pressing operation of an imaging preparation instruction state and an imaging instruction state. The imaging preparation instruction state refers to a state in which the release button 22 is pressed, for example, from a standby position to an intermediate position (half pressed position), and the imaging instruction state refers to a state in which the release button 22 is pressed to a final pressed position (fully pressed position) beyond the intermediate position. In the following, the "state of being pressed from the standby position to the half pressed position" is referred to as a "half pressed state", and the "state of being pressed from the standby position to the fully pressed position" is referred to as a "fully pressed state". Depending on the configuration of the imaging apparatus 10, the imaging preparation instruction state may be a state in which the user's finger is in contact with the release button 22, and the imaging instruction state may be a state in which the operating user's finger is moved from the state of being in contact with the release button 22 to the state of being away from the release button 22.

A touch panel display 32 and an instruction key 26 are provided on a rear surface of the imaging apparatus main body 16.

Figure 2:
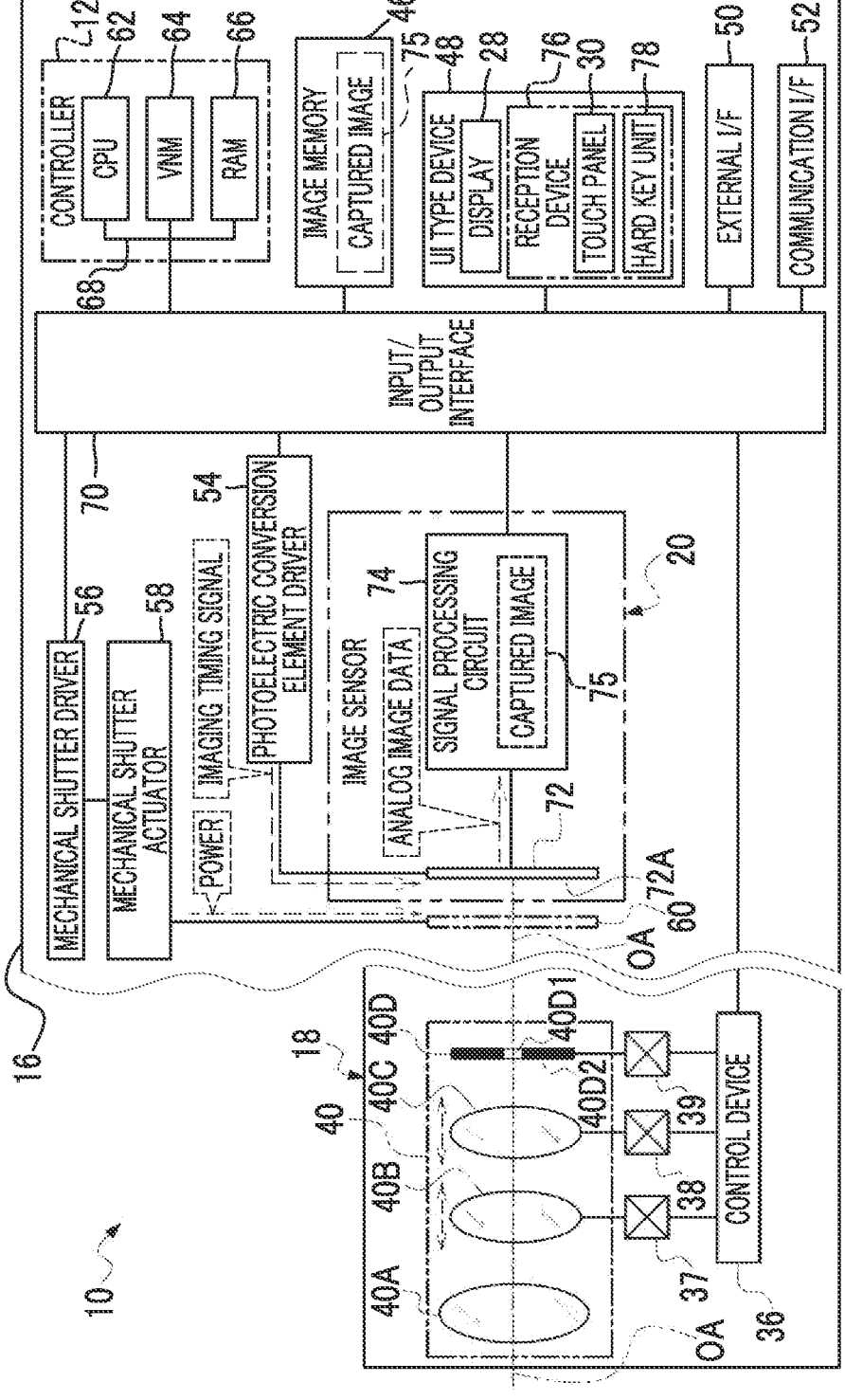
FIG. 2 is a schematic configuration diagram showing an example of hardware configurations of an optical system and an electrical system of the imaging apparatus.

The touch panel display 32 includes a display 28 and a touch panel 30 (see also FIG. 2). Examples of the display 28 include an EL display (for example, an organic EL display or an inorganic EL display). The display 28 may not be an EL display but may be another type of display such as a liquid crystal display.

The display 28 displays image and/or character information and the like. The display 28 is used for imaging for a live view image, that is, for displaying a live view image obtained by performing the continuous imaging in a case where the imaging apparatus 10 is in the imaging mode. The imaging, which is performed to obtain the live view image (hereinafter, also referred to as "imaging for a live view image"), is performed according to, for example, a frame rate of 60 fps. 60 fps is only an example, and a frame rate of fewer than 60 fps may be used, or a frame rate of more than 60 fps may be used.

Here, the "live view image" refers to a moving image for display based on the image data obtained by being imaged by the image sensor 20. The live view image is also commonly referred to as a through image.

The display 28 is also used for displaying a still image obtained by the performance of the imaging for a still image in a case where an instruction for performing the imaging for a still image is provided to the imaging apparatus 10 via the release button 22. The display 28 is also used for displaying a playback image or the like in a case where the imaging apparatus 10 is in the playback mode. Further, the display 28 is also used for displaying a menu screen where various menus can be selected and displaying a setting screen for setting the various set values used in control that is related to the imaging in a case where the imaging apparatus 10 is in the setting mode.

The touch panel 30 is a transmissive touch panel and is superimposed on a surface of a display region of the display 28. The touch panel 30 receives the instruction from the user by detecting contact with an indicator such as a finger or a stylus pen. In the following, for convenience of explanation, the above-mentioned "fully pressed state" includes a state in which the user turns on a softkey for starting the imaging via the touch panel 30.

In the present embodiment, although an out-cell type touch panel display in which the touch panel 30 is superimposed on the surface of the display region of the display 28 is exemplified as an example of the touch panel display 32, this is only an example. For example, as the touch panel display 32, an on-cell type or in-cell type touch panel display can be applied.

The instruction key 26 receives various instructions. Here, the "various instructions" refer to, for example, various instructions such as an instruction for displaying the menu screen, an instruction for selecting one or a plurality of menus, an instruction for confirming a selected content, an instruction for erasing the selected content, zooming in, zooming out, frame forwarding, and the like. Further, these instructions may be provided by the touch panel 30.

As an example shown in FIG. 2, the image sensor 20 includes photoelectric conversion elements 72. The photoelectric conversion elements 72 have a light receiving surface 72A. The photoelectric conversion elements 72 are disposed in the imaging apparatus main body 16 such that the center of the light receiving surface 72A and an optical axis OA coincide with each other (see also FIG. 1). The photoelectric conversion elements 72 have a plurality of photosensitive pixels arranged in a matrix shape, and the light receiving surface 72A is formed by the plurality of photosensitive pixels. The photosensitive pixel is a physical pixel having a photodiode (not shown), which photoelectrically converts the received light and outputs an electric signal according to the light receiving amount.

The interchangeable lens 18 includes an imaging lens 40. The imaging lens 40 has an objective lens 40A, a focus lens 40B, a zoom lens 40C, and a stop 40D. The objective lens 40A, the focus lens 40B, the zoom lens 40C, and the stop 40D are disposed in the order of the objective lens 40A, the focus lens 40B, the zoom lens 40C, and the stop 40D along the optical axis OA from the subject side (object side) to the imaging apparatus main body 16 side (image side).

Further, the interchangeable lens 18 includes a control device 36, a first actuator 37, a second actuator 38, and a third actuator 39. The control device 36 controls the entire interchangeable lens 18 according to the instruction from the imaging apparatus main body 16. The control device 36 is a device having a computer including, for example, a CPU, an NVM, a RAM, and the like. Although a computer is exemplified here, this is only an example, and a device including an ASIC, FPGA, and/or PLD may be applied. Further, as the control device 36, for example, a device implemented by a combination of a hardware configuration and a software configuration may be used.

The first actuator 37 includes a slide mechanism for focus (not shown) and a motor for focus (not shown). The focus lens 40B is attached to the slide mechanism for focus so as to be slidable along the optical axis OA. Further, the motor for focus is connected to the slide mechanism for focus, and the slide mechanism for focus operates by receiving the power of the motor for focus to move the focus lens 40B along the optical axis OA.

The second actuator 38 includes a slide mechanism for zoom (not shown) and a motor for zoom (not shown). The zoom lens 40C is attached to the slide mechanism for zoom so as to be slidable along the optical axis OA. Further, the motor for zoom is connected to the slide mechanism for zoom, and the slide mechanism for zoom operates by receiving the power of the motor for zoom to move the zoom lens 40C along the optical axis OA.

The third actuator 39 includes a power transmission mechanism (not shown) and a motor for stop (not shown). The stop 40D has an opening 40D1 and is a stop in which the size of the opening 40D1 is variable. The opening 40D1 is formed by a plurality of stop leaf blades 40D2. The plurality of stop leaf blades 40D2 are connected to the power transmission mechanism. Further, the motor for stop is connected to the power transmission mechanism, and the power transmission mechanism transmits the power of the motor for stop to the plurality of stop leaf blades 40D2. The plurality of stop leaf blades 40D2 receives the power that is transmitted from the power transmission mechanism and changes the size of the opening 40D1 by being operated. The stop 40D adjusts the exposure by changing the size of the opening 40D1.

The motor for focus, the motor for zoom, and the motor for stop are connected to the control device 36, and the control device 36 controls each drive of the motor for focus, the motor for zoom, and the motor for stop. In the present embodiment, a stepping motor is adopted as an example of the motor for focus, the motor for zoom, and the motor for stop. Therefore, the motor for focus, the motor for zoom, and the motor for stop operate in synchronization with a pulse signal in response to a command from the control device 36. Although an example in which the motor for focus, the motor for zoom, and the motor for stop are provided in the interchangeable lens 18 has been described here, this is only an example, and at least one of the motor for focus, the motor for zoom, or the motor for stop may be provided in the imaging apparatus main body 16. The constituent and/or operation method of the interchangeable lens 18 can be changed as needed.

In the imaging apparatus 10, in the case of the imaging mode, an MF mode and an AF mode are selectively set according to the instructions provided to the imaging apparatus main body 16. The MF mode is an operation mode for manually focusing. In the MF mode, for example, by operating the focus ring 18A or the like by the user, the focus lens 40B is moved along the optical axis OA with the movement amount according to the operation amount of the focus ring 18A or the like, thereby the focus is adjusted.

In the AF mode, the imaging apparatus main body 16 calculates a focusing position according to a subject distance and adjusts the focus by moving the focus lens 40B toward the calculated focusing position. Here, the focusing position refers to a position of the focus lens 40B on the optical axis OA in a state of being in focus. In the following, for convenience of explanation, the control for aligning the focus lens 40B with the focusing position is also referred to as "AF control".

The imaging apparatus main body 16 includes the image sensor 20, a controller 12, an image memory 46, a UI type device 48, an external I/F 50, a communication I/F 52, a photoelectric conversion element driver 54, a mechanical shutter driver 56, a mechanical shutter actuator 58, a mechanical shutter 60, and an input/output interface 70. Further, the image sensor 20 includes the photoelectric conversion elements 72 and a signal processing circuit 74.

The controller 12, the image memory 46, the UI type device 48, the external I/F 50, the photoelectric conversion element driver 54, the mechanical shutter driver 56, and the signal processing circuit 74 are connected to the input/output interface 70. Further, the control device 36 of the interchangeable lens 18 is also connected to the input/output interface 70.

The controller 12 includes a CPU 62, an NVM 64, and a RAM 66. Here, the CPU 62 is an example of a "processor" according to the present disclosed technology, and the NVM 64 is an example of a "memory" according to the present disclosed technology.

The CPU 62, the NVM 64, and the RAM 66 are connected via a bus 68, and the bus 68 is connected to the input/output interface 70. In the example shown in FIG. 2, one bus is shown as the bus 68 for convenience of illustration, but a plurality of buses may be used. The bus 68 may be a serial bus or may be a parallel bus including a data bus, an address bus, a control bus, and the like.

The NVM 64 is a non-temporary storage medium that stores various parameters and various programs. For example, the NVM 64 is an EEPROM. However, this is only an example, and an HDD and/or SSD or the like may be applied as the NVM 64 instead of or together with the EEPROM. Further, the RAM 66 temporarily stores various types of information and is used as a work memory.

The CPU 62 reads a necessary program from the NVM 64 and executes the read program in the RAM 66. The CPU 62 controls the entire imaging apparatus 10 according to the program executed on the RAM 66. In the example shown in FIG. 2, the image memory 46, the UI type device 48, the external I/F 50, the communication I/F 52, the photoelectric conversion element driver 54, the mechanical shutter driver 56, and the control device 36 are controlled by the CPU 62.

The photoelectric conversion element driver 54 is connected to the photoelectric conversion elements 72. The photoelectric conversion element driver 54 supplies an imaging timing signal, which defines the timing of the imaging performed by the photoelectric conversion elements 72, to the photoelectric conversion elements 72 according to an instruction from the CPU 62. The photoelectric conversion elements 72 perform reset, exposure, and output of an electric signal according to the imaging timing signal supplied from the photoelectric conversion element driver 54. Examples of the imaging timing signal include a vertical synchronization signal, and a horizontal synchronization signal.

In a case where the interchangeable lens 18 is attached to the imaging apparatus main body 16, the subject light incident on the imaging lens 40 is imaged on the light receiving surface 72A by the imaging lens 40. Under the control of the photoelectric conversion element driver 54, the photoelectric conversion elements 72 photoelectrically convert the subject light, which is received from the light receiving surface 72A and output the electric signal corresponding to the amount of light of the subject light to the signal processing circuit 74 as analog image data indicating the subject light. Specifically, the signal processing circuit 74 reads the analog image data from the photoelectric conversion elements 72 in units of one frame and for each horizontal line by using an exposure sequential reading method.

The signal processing circuit 74 generates digital image data by digitizing the analog image data. In the following, for convenience of explanation, in a case where it is not necessary to distinguish between digital image data to be internally processed in the imaging apparatus main body 16 and an image indicated by the digital image data (that is, an image that is visualized based on the digital image data and displayed on the display 28 or the like), it is referred to as a "captured image 75".

In the present embodiment, the CPU 62 of the controller 12 detects a plurality of subjects based on the captured image 75 obtained by being captured by the imaging apparatus 10. In the present embodiment, the detection of the subject refers to, for example, the detection of a subject image that indicates the subject. That is, the CPU 62 detects the subject captured in the subject image by detecting the subject image that indicates the subject from the captured image 75. Further, in the imaging apparatus 10 according to the present embodiment, subject recognition processing is performed by the CPU 62. The subject recognition processing refers to processing of recognizing the subject based on the captured image 75. In the present embodiment, the recognition of the subject refers to processing that includes at least detection of the subject or specification of a type of the subject. The subject recognition processing is realized by using an AI method, a template matching method, or the like.

The mechanical shutter 60 is a focal plane shutter and is disposed between the stop 40D and the light receiving surface 72A. The mechanical shutter 60 includes a front curtain (not shown) and a rear curtain (not shown). Each of the front curtain and the rear curtain includes a plurality of leaf blades. The front curtain is disposed closer to the subject side than the rear curtain.

The mechanical shutter actuator 58 is an actuator having a link mechanism (not shown), a solenoid for a front curtain (not shown), and a solenoid for a rear curtain (not shown). The solenoid for a front curtain is a drive source for the front curtain and is mechanically connected to the front curtain via the link mechanism. The solenoid for a rear curtain is a drive source for the rear curtain and is mechanically connected to the rear curtain via the link mechanism. The mechanical shutter driver 56 controls the mechanical shutter actuator 58 according to the instruction from the CPU 62.

The solenoid for a front curtain generates power under the control of the mechanical shutter driver 56 and selectively performs winding up and pulling down the front curtain by applying the generated power to the front curtain. The solenoid for a rear curtain generates power under the control of the mechanical shutter driver 56 and selectively performs winding up and pulling down the rear curtain by applying the generated power to the rear curtain. In the imaging apparatus 10, the exposure amount with respect to the photoelectric conversion elements 72 is controlled by controlling the opening and closing of the front curtain and the opening and closing of the rear curtain by the CPU 62.

In the imaging apparatus 10, the imaging for a live view image and the imaging for a recorded image for recording the still image and/or the moving image are performed by using the exposure sequential reading method (rolling shutter method). The image sensor 20 has an electronic shutter function, and the imaging for a live view image is implemented by achieving an electronic shutter function without operating the mechanical shutter 60 in a fully open state.

In contrast to this, the imaging accompanied by the main exposure, that is, the imaging for a still image is implemented by achieving the electronic shutter function and operating the mechanical shutter 60 so as to shift the mechanical shutter 60 from a front curtain closed state to a rear curtain closed state.

The image memory 46 stores the captured image 75 generated by the signal processing circuit 74. That is, the signal processing circuit 74 stores the captured image 75 in the image memory 46. The CPU 62 acquires a captured image 75 from the image memory 46 and executes various processes by using the acquired captured image 75.

The UI type device 48 includes a display 28, and the CPU 62 displays various information on the display 28. Further, the UI type device 48 includes a reception device 76. The reception device 76 includes a touch panel 30 and a hard key unit 78. The hard key unit 78 is a plurality of hard keys including an instruction key 26 (see FIG. 1). The CPU 62 operates according to various instructions received by using the touch panel 30. Here, although the hard key unit 78 is included in the UI type device 48, the present disclosed technology is not limited to this, for example, the hard key unit 78 may be connected to the external I/F 50.

The external I/F 50 controls the exchange of various information between the imaging apparatus 10 and an apparatus existing outside the imaging apparatus 10 (hereinafter, also referred to as an "external apparatus"). Examples of the external I/F 50 include a USB interface. The external apparatus (not shown) such as a smart device, a personal computer, a server, a USB memory, a memory card, and/or a printer is directly or indirectly connected to the USB interface. The communication I/F 52 controls the exchange of information between the CPU 62 and an external computer (for example, the imaging support apparatus 202 (see FIG. 32)) via a network 204 (see FIG. 32). For example, the communication I/F 52 transmits information according to the request from the CPU 62 to the external computer via the network 204. Further, the communication I/F 52 receives the information transmitted from the external apparatus and outputs the received information to the CPU 62 via the input/output interface 70.

By the way, as one of known imaging apparatuses in the related art, an imaging apparatus equipped with a function of detecting a subject is known. In this type of imaging apparatus, a detection frame that surrounds the detected position of the subject in a specifiable manner is displayed on the display in a state of being superimposed on the live view image or the like. In recent years, the performance of detecting a subject by using the AI method has been improved, and detection targets include not only a person but also a small animal, a vehicle, or the like. As the number of detection targets increases in this way, it is conceivable that the number of detection frames displayed on the display as the detection result also increases. In this case, in a case where the number of detection frames displayed on the display increases, it is expected that the visibility of the live view image or the like on which the detection frames are superimposed is deteriorate and it is difficult for a user or the like to select a specific subject (hereinafter, also referred to as a "specific subject") to be controlled (for example, AF control, exposure control, and/or) in relation to the imaging. Even in a case where the number of detection frames displayed on the display is limited, it is expected that the detection frame will not be displayed for the subject that is intended by the user or the like in a case where the subject for which the detection frame is to be displayed is not appropriately selected. Therefore, in the present embodiment, as an example, the imaging apparatus 10 can distinguish between the specific subject and a subject other than the specific subject even in a case where the detection frames displayed on the display are densely gathered due to an increase in the number of subjects that are the detection targets. Hereinafter, a specific example will be described.

Figure 3:
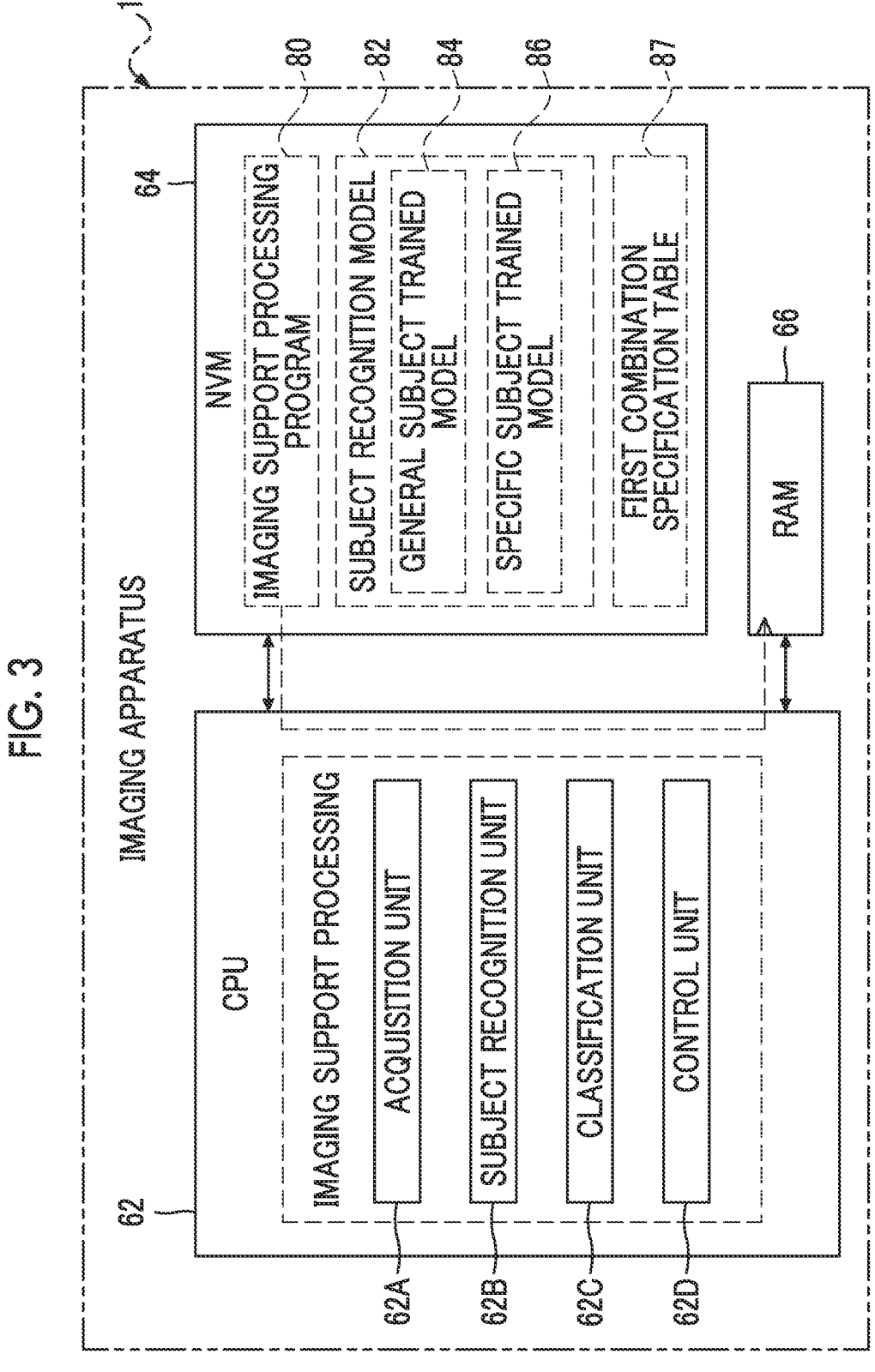
FIG. 3 is a block diagram showing an example of a storing content of an NVM included in an imaging apparatus and a function of a main part of a CPU included in the imaging apparatus.

As an example shown in FIG. 3, the NVM 64 of the imaging apparatus 10 stores an imaging support processing program 80, a subject recognition model 82, and a first combination specification table 87. The subject recognition model 82 includes a general subject trained model 84 and a specific subject trained model 86. Here, the imaging support processing program 80 is an example of a "program" according to the present disclosed technology.

The CPU 62 reads the imaging support processing program 80 from the NVM 64 and executes the read imaging support processing program 80 on the RAM 66. The CPU 62 performs the imaging support processing according to the imaging support processing program 80 executed on the RAM 66 (see FIG. 24A and FIG. 24B). The imaging support processing is realized by the CPU 62 operating as an acquisition unit 62A, a subject recognition unit 62B, a classification unit 62C, and a control unit 62D in accordance with the imaging support processing program 80.

The general subject trained model 84 is, for example, a trained model generated by optimizing a learning model (for example, CNN) by using machine learning. Here, the teacher data, which is used in the machine learning for the learning model, is labeled data. The labeled data is, for example, data in which the captured image 75 and the correct answer data are associated with each other. The correct answer data is data including, for example, data capable of specifying a type of the general subject that is captured in the captured image 75 and data capable of specifying a position of the general subject in the captured image 75. The general subject refers to all subjects defined as the detection targets (for example, a person's face, the entire person, an animal other than a person, a vehicle, an insect, a building, a natural object, or the like).

Figure 4:
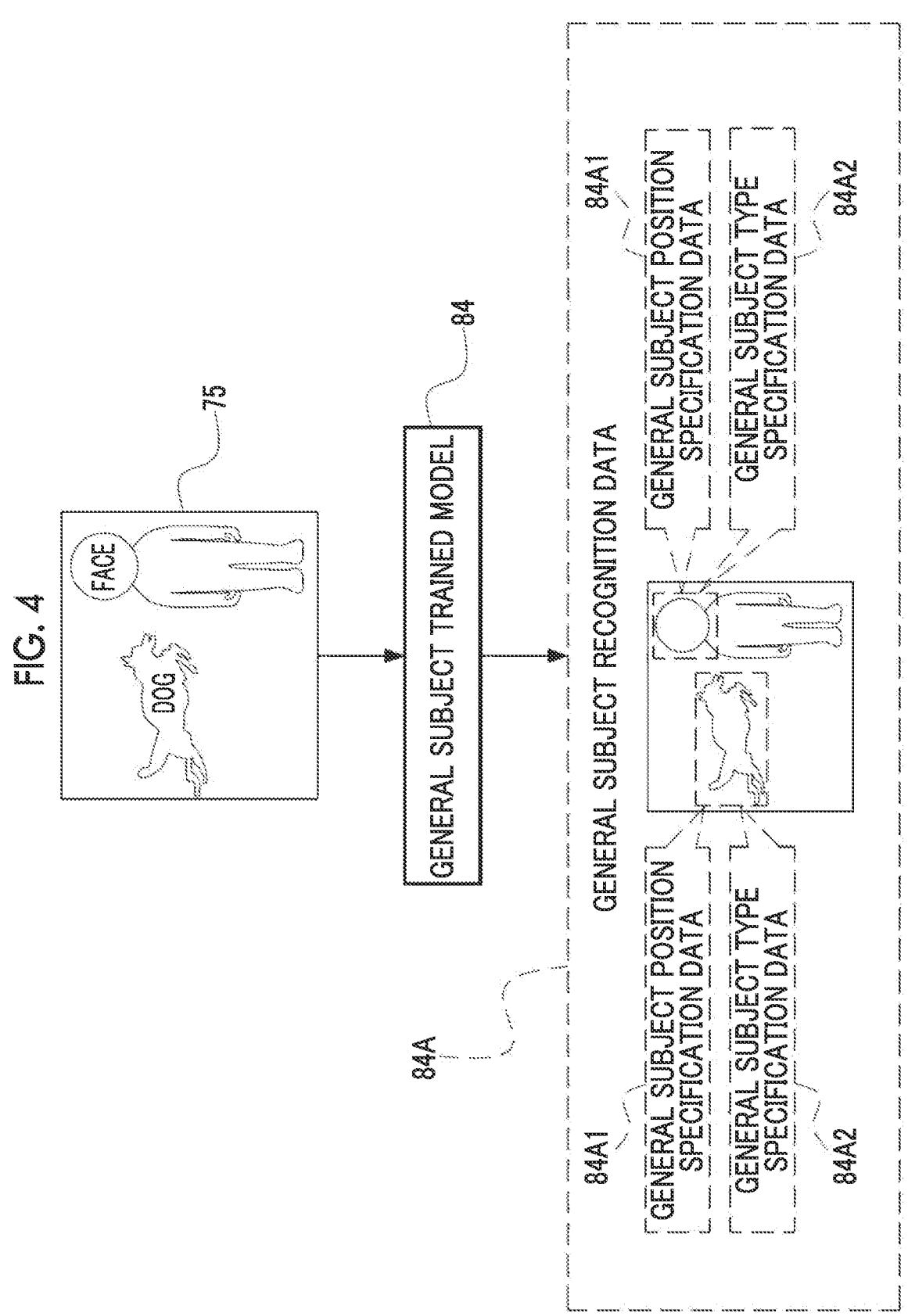
FIG. 4 is a conceptual diagram showing an example of an input/output of a general subject trained model.

In a case where the captured image 75 is input, the general subject trained model 84 outputs general subject recognition data 84A. The general subject recognition data 84A includes general subject position specification data 84A1 and general subject type specification data 84A2. In the example shown in FIG. 4, in the captured image 75, a dog and a person's face are captured, and information that is capable of specifying a relative position of the person's face in the captured image 75 and information that is capable of specifying a relative position of the dog in the captured image 75 are exemplified as the general subject position specification data 84A1. Further, in the example shown in FIG. 4, information that is capable of specifying that a subject present at a position specified from the general subject position specification data 84A1 is the person's face and information that is capable of specifying that a subject present at a position specified from the general subject position specification data 84A1 is the dog are exemplified as the general subject type specification data 84A2 in the captured image 75. The general subject trained model 84 is an example of a "first standard" according to the present disclosed technology.

Figure 5:
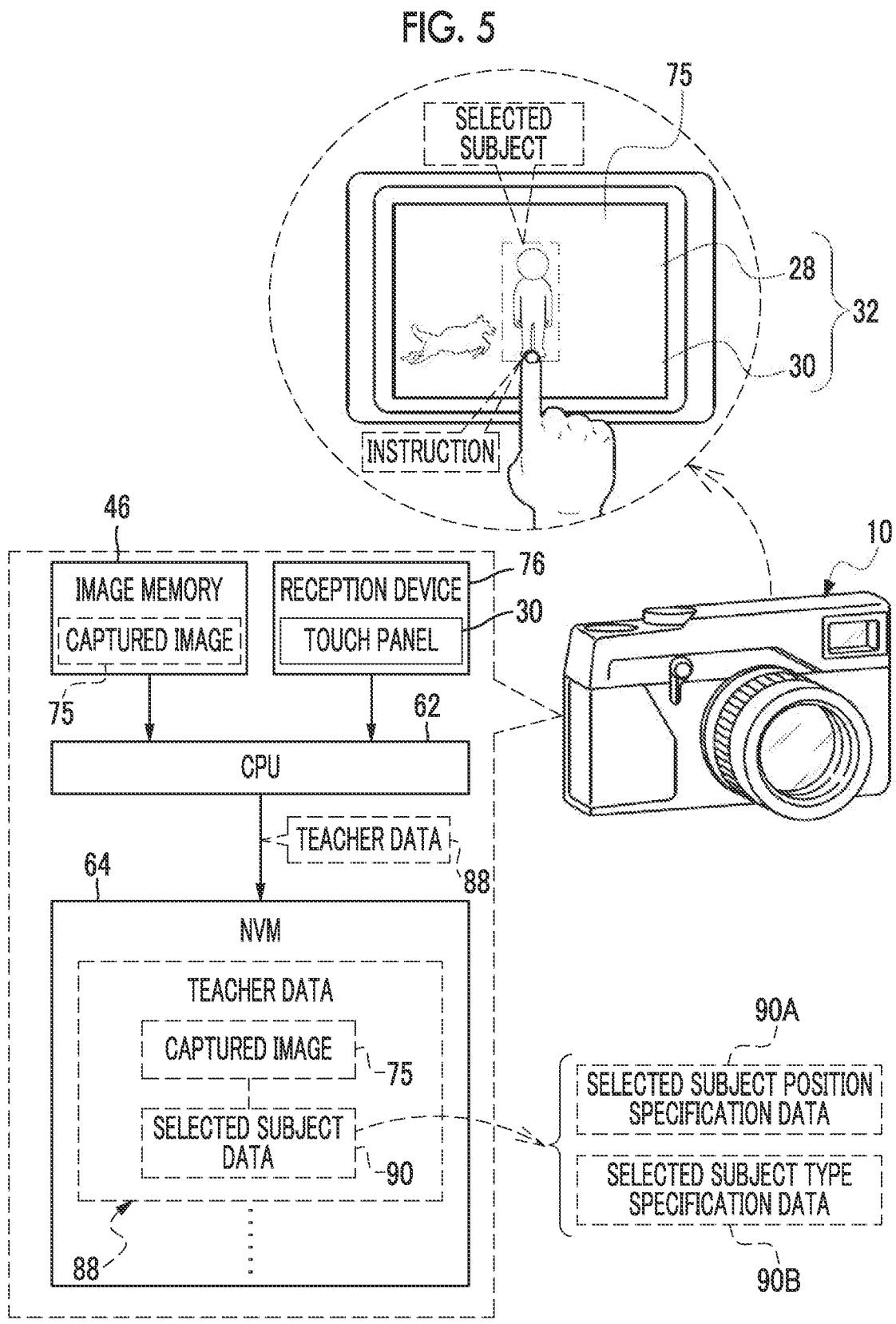
FIG. 5 is a conceptual diagram showing an example of a configuration of generating teacher data.
Figure 6:
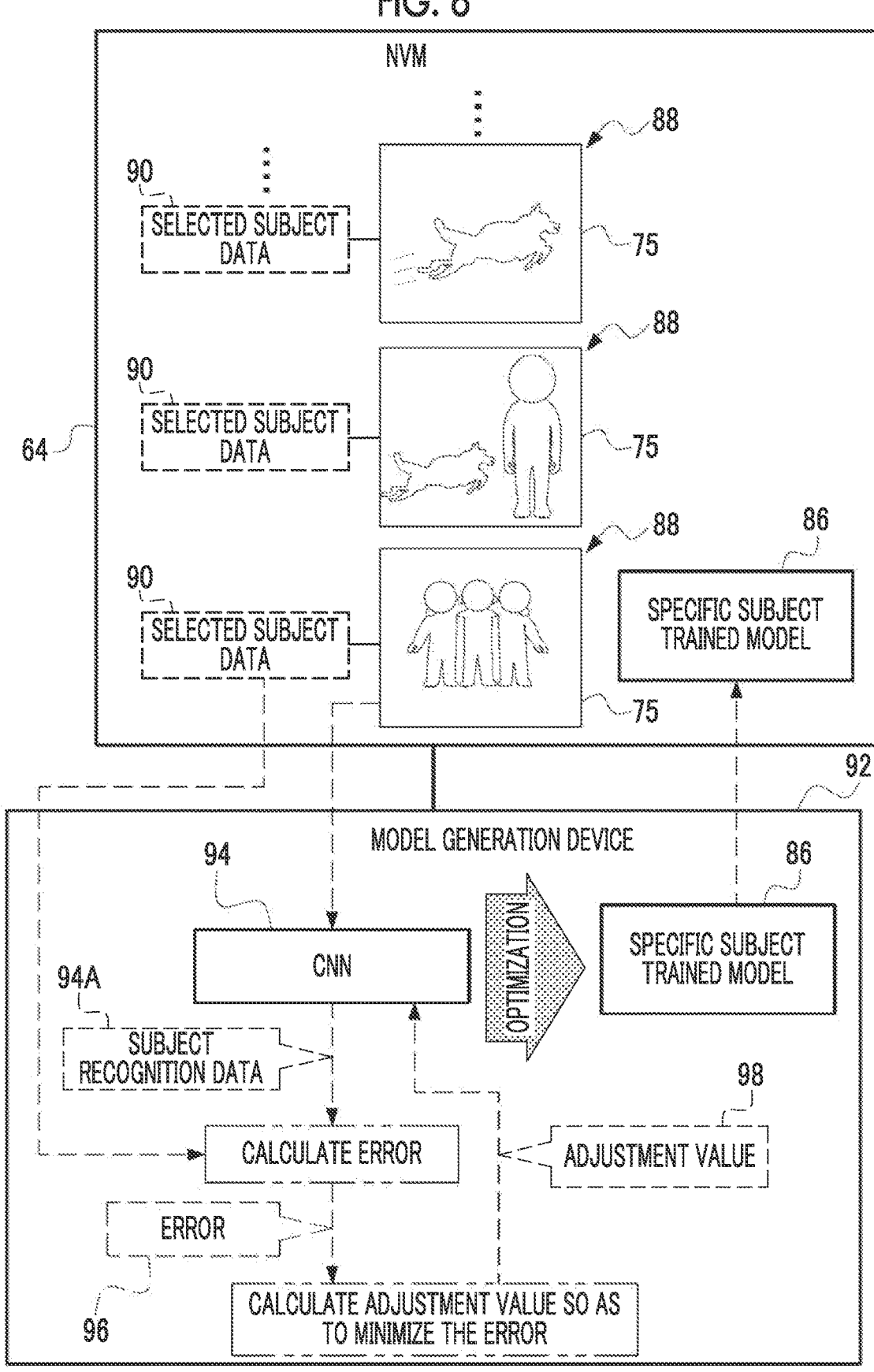
FIG. 6 is a conceptual diagram showing an example of the content of processing of a model generation device.

FIG. 5 shows an example of how to create the teacher data 88 used for generating the specific subject trained model 86 (see FIG. 3 and FIG. 6).

As an example shown in FIG. 5, in the imaging apparatus 10, in a state where the captured image 75 is displayed on the display 28, a selected subject, which is selected according to an instruction received by the reception device 76 (in the example shown in FIG. 5, a touch panel 30), is designated as the specific subject. That is, by designating one subject image from the captured image 75 displayed on the display 28 via the reception device 76 by the user or the like, one of the subjects, which is being captured in the captured image 75, is designated. The selected subject is an example of a "selected subject", a "first designated subject image", and a "second designated subject image" according to the present disclosed technology.

The CPU 62 acquires the captured image 75 from the image memory 46. Here, the captured image 75, which is acquired from the image memory 46 by the CPU 62, is the captured image 75 displayed on the display 28 at the timing when the instruction is received by the reception device 76.

The CPU 62 generates the selected subject data 90 related to the selected subject based on the captured image 75. The selected subject data 90 includes selected subject position specification data 90A and selected subject type specification data 90B. The selected subject position specification data 90A is data including a parameter specified from the captured image 75. The selected subject position specification data 90A includes a parameter (for example, two-dimensional coordinates that is capable of specifying a position in the captured image 75) capable of specifying a relative position of the selected subject in the captured image 75 as a parameter specified from the captured image 75.

The selected subject type specification data 90B is data that is capable of specifying a type of the selected subject (for example, a dog, a person's face, and the like). The selected subject type specification data 90B is, for example, data generated according to an instruction received by the reception device 76. However, this is only an example, and the selected subject type specification data 90B may be data that is capable of specifying the type that is specified by the subject recognition processing.

The CPU 62 generates the teacher data 88 by associating the captured image 75, which is acquired from the image memory 46, with the selected subject data 90, which is generated based on the captured image 75, and stores the teacher data 88 in the NVM 64. The NVM 64 stores the teacher data 88 for a plurality of frames. Here, the plurality of frames refer to, for example, tens of thousands of frames (for example, "50,000"). However, this is only an example, and the number of frames may be less than tens of thousands of frames (for example, several thousand frames) or may be more than tens of thousands of frames (for example, hundreds of thousands of frames). Here, the frame refers to the number of captured images 75.

As an example shown in FIG. 6, the specific subject trained model 86 is generated by the model generation device 92. The model generation device 92 includes a CNN 94. Further, the model generation device 92 is connected to the NVM 64.

The model generation device 92 reads the teacher data 88 from the NVM 64 frame by frame. The model generation device 92 acquires the captured image 75 from the teacher data 88 and inputs the acquired captured image 75 to the CNN 94. In a case where the captured image 75 is input, the CNN 94 performs an inference and outputs the subject recognition data 94A indicating an inference result. The subject recognition data 94A is data of the same item as the data included in the selected subject data 90 included in the teacher data 88. The data of the same item refers to, for example, information that is capable of specifying the relative position of the subject expected as the specific subject in the captured image 75 input to the CNN 94, information that is capable of specifying the type of the subject expected as the specific subject captured in the captured image 75 input to the CNN 94.

The model generation device 92 calculates an error 96 between the selected subject data 90 and the subject recognition data 94A, which are associated with the captured image 75 input to the CNN 94. The error 96 refers to, for example, an error between the information, which is capable of specifying the relative position of the subject expected as the specific subject in the captured image 75 input to the CNN 94, and the selected subject position specification data 90A included in selected subject data 90 (see FIG. 5), an error between the information, which is capable of specifying the type of subject expected as the specific subject captured in the captured image 75 input to the CNN 94, and the selected subject type specification data 90B included in the selected subject data 90, and the like.

The model generation device 92 calculates a plurality of adjustment values 98 that minimize the error 96. Thereafter, the model generation device 92 adjusts a plurality of optimization variables in the CNN 94 by using the plurality of calculated adjustment values 98. Here, the plurality of optimization variables in the CNN 94 refer to, for example, a plurality of bonding loads and a plurality of offset values included in the CNN 94, and the like.

The model generation device 92 repeats learning processing of inputting the captured image 75 to the CNN 94, calculating the error 96, calculating the plurality of adjustment values 98, and adjusting the plurality of optimization variables in the CNN 94, for the number of frames of the captured images 75 stored in the NVM 64. That is, the model generation device 92 optimizes the CNN 94 by adjusting the plurality of optimization variables in the CNN 94 by using the plurality of adjustment values 98 calculated so as to minimize the error 96 for each of the plurality of frames of the captured image 75 in the NVM 64.

The model generation device 92 generates the specific subject trained model 86 by optimizing the CNN 94. That is, the CNN 94 is optimized by adjusting the plurality of optimization variables included in the CNN 94, whereby the specific subject trained model 86 is generated. The model generation device 92 stores the generated specific subject trained model 86 in the NVM 64. The specific subject trained model 86 is an example of a "second standard" according to the present disclosed technology.

Figure 7:
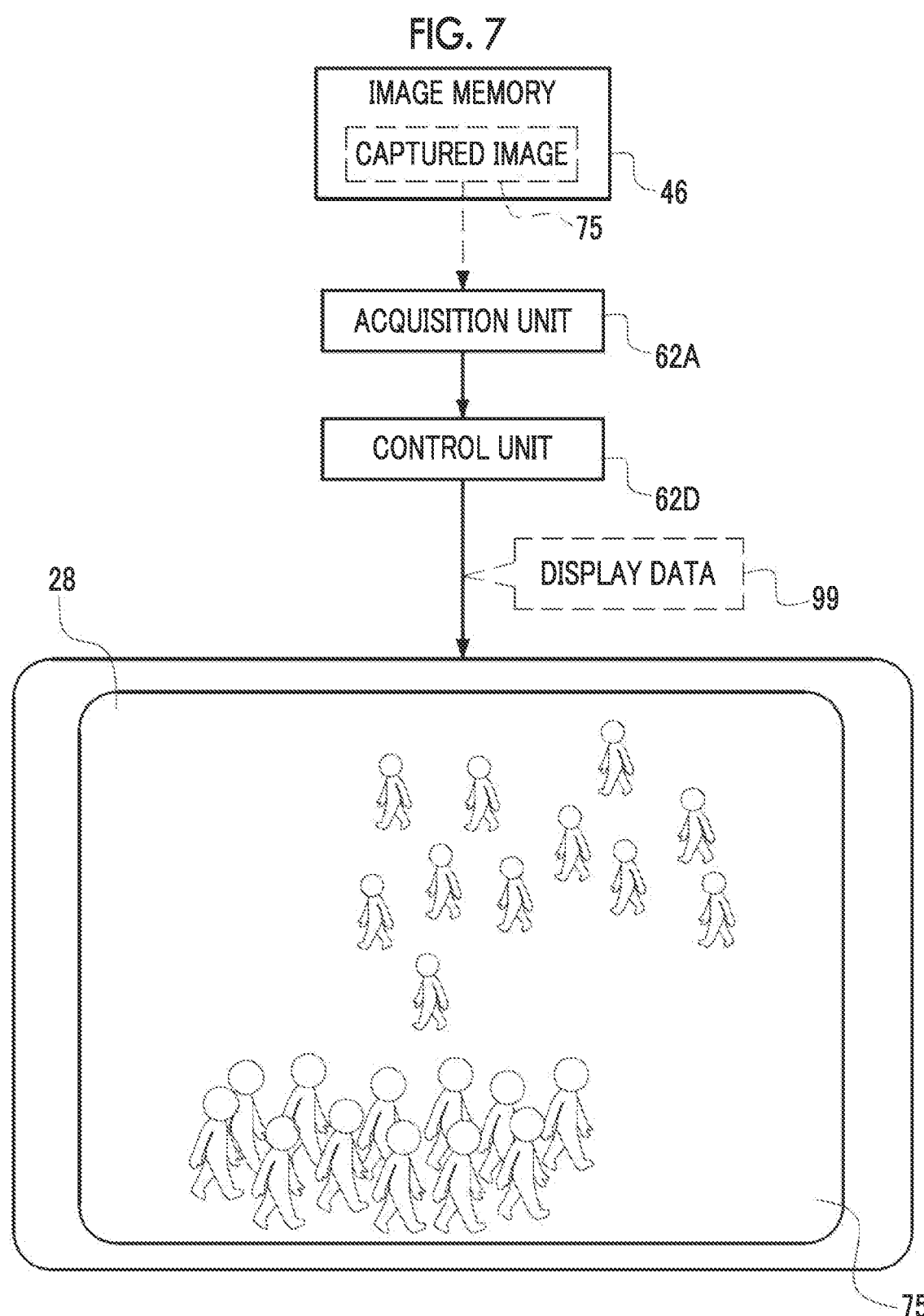
FIG. 7 is a conceptual diagram showing an example of the content of processing of an acquisition unit and a control unit.

As an example shown in FIG. 7, the acquisition unit 62A acquires the captured image 75 from the image memory 46. The control unit 62D displays the captured image 75, which is acquired from the image memory 46, on the display 28. In this case, for example, the control unit 62D generates display data 99 for display the display data 99 on the display 28 and outputs the generated display data 99 on the display 28. Accordingly, the captured image 75 is displayed on the display 28. Examples of the type of the captured image 75 that is displayed on the display 28 include a live view image. However, the live view image is only an example and may be another type of image such as a post view image. The display data 99 is an example of "display data" according to the present disclosed technology.

Figure 8:
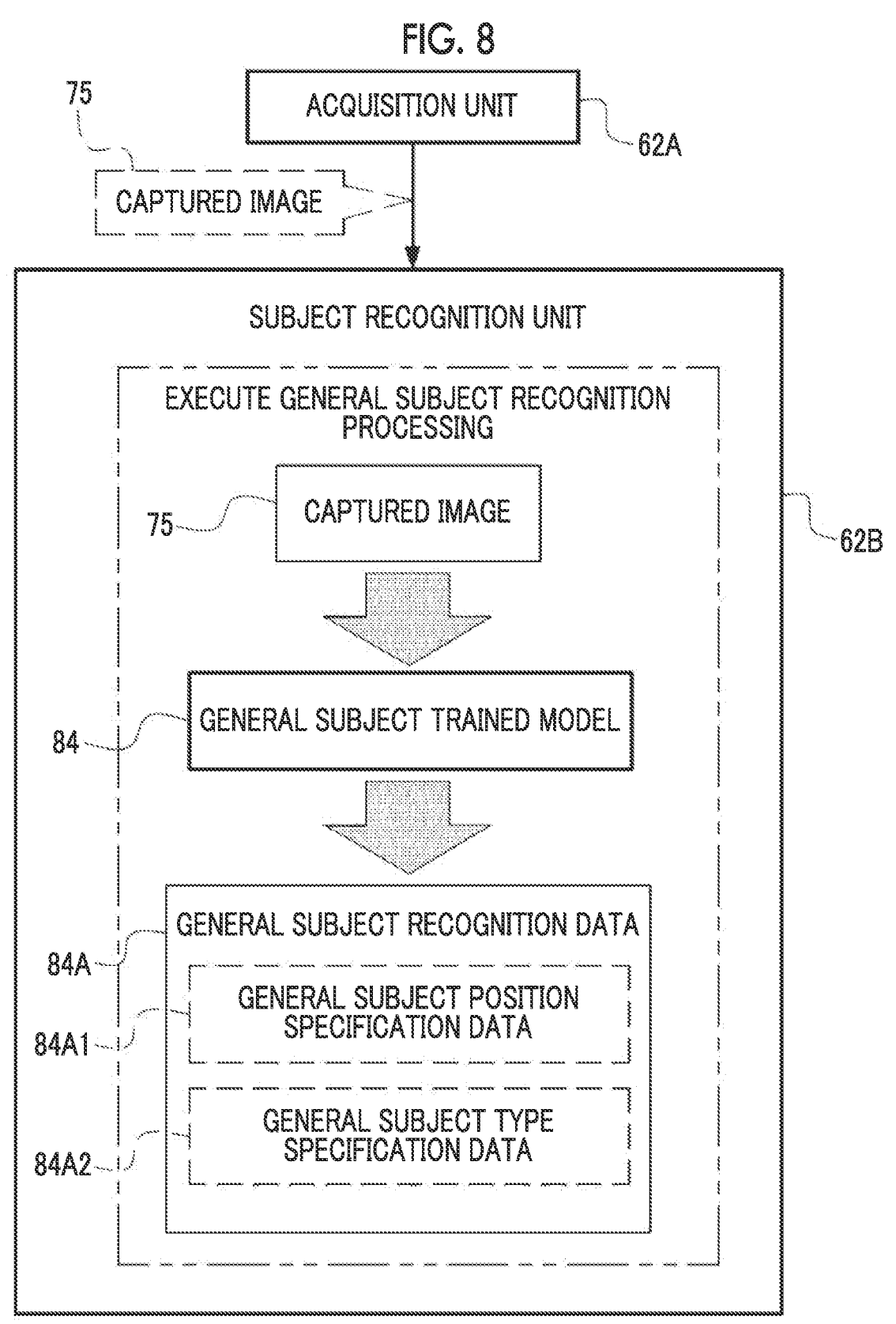
FIG. 8 is a block diagram showing an example of the content of general subject recognition processing of a subject recognition unit.

As an example shown in FIG. 8, the subject recognition unit 62B executes general subject recognition processing, which is subject recognition processing, on the general subject based on the captured image 75 acquired by the acquisition unit 62A. For example, in this case, the subject recognition unit 62B inputs the captured image 75, which is acquired by the acquisition unit 62A, to the general subject trained model 84. In a case where the captured image 75 is input, the general subject trained model 84 outputs general subject recognition data 84A. The general subject recognition data 84A includes the general subject position specification data 84A1 and the general subject type specification data 84A2.

Figure 9:
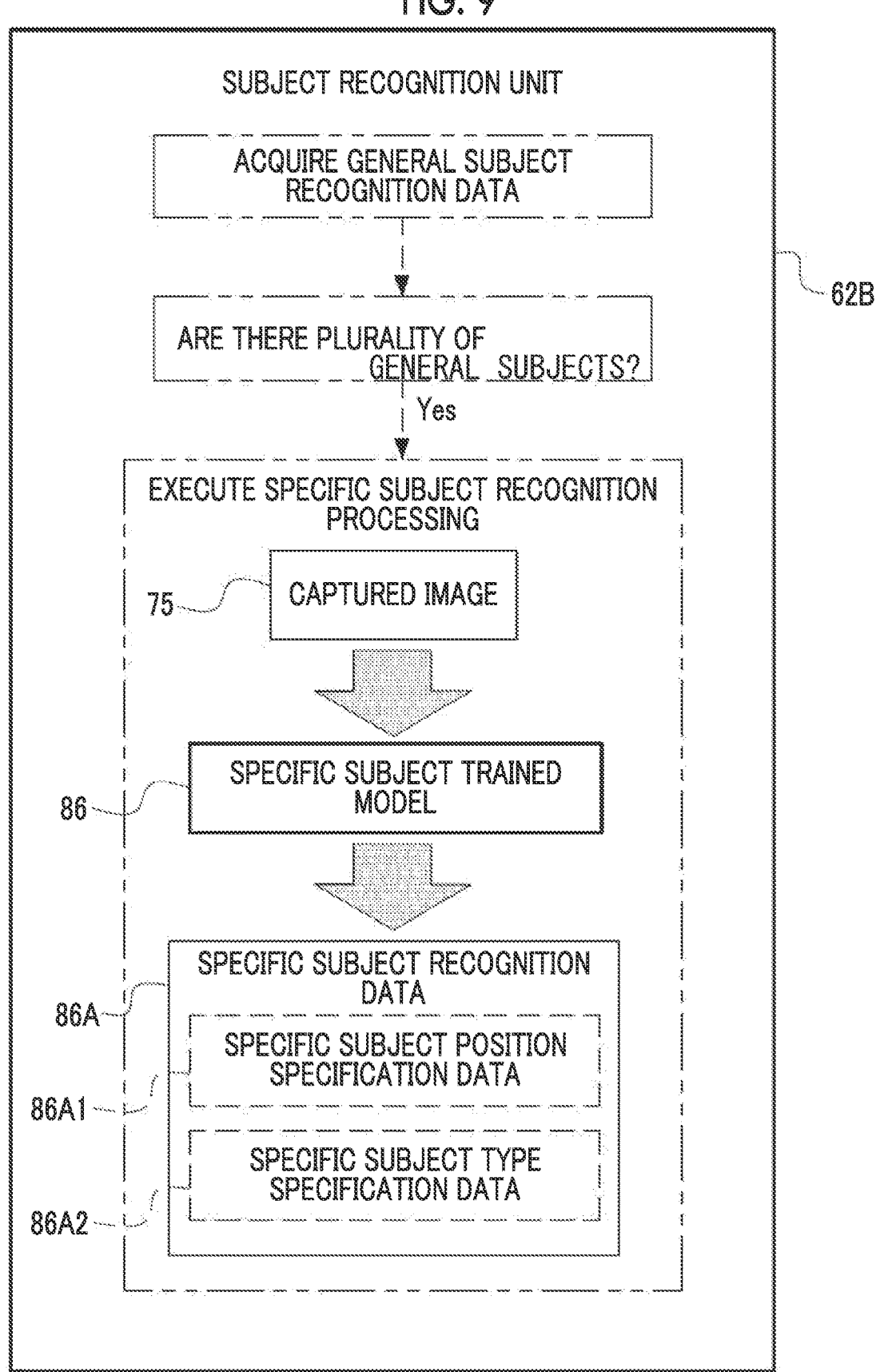
FIG. 9 is a block diagram showing an example of the content of specific subject recognition processing of the subject recognition unit.

As an example shown in FIG. 9, the subject recognition unit 62B acquires the general subject recognition data 84A output from the general subject trained model 84. Thereafter, by referring to the acquired general subject recognition data 84A, the subject recognition unit 62B determines whether or not a plurality of general subjects are present in the captured image 75 acquired by the acquisition unit 62A, that is, in the captured image 75 input to the general subject trained model 84, that is, whether or not the plurality of general subjects are captured in the captured image 75 input to the general subject trained model 84. Here, the determination that the plurality of general subjects are present in the captured image 75 means that the plurality of general subjects are detected based on the captured image 75.

The subject recognition unit 62B executes the specific subject recognition processing based on the captured image 75 acquired by the acquisition unit 62A in a case where it is determined that the plurality of general subjects are present in the captured image 75 that is input to the general subject trained model 84. For example, in this case, the subject recognition unit 62B inputs the captured image 75 acquired by the acquisition unit 62A, that is, the captured image 75 input to the general subject trained model 84 to the specific subject trained model 86. The specific subject trained model 86 outputs the specific subject recognition data 86A in a case where the captured image 75 is input. The specific subject recognition data 86A includes specific subject position specification data 86A1 and specific subject type specification data 86A2.

Figure 10:
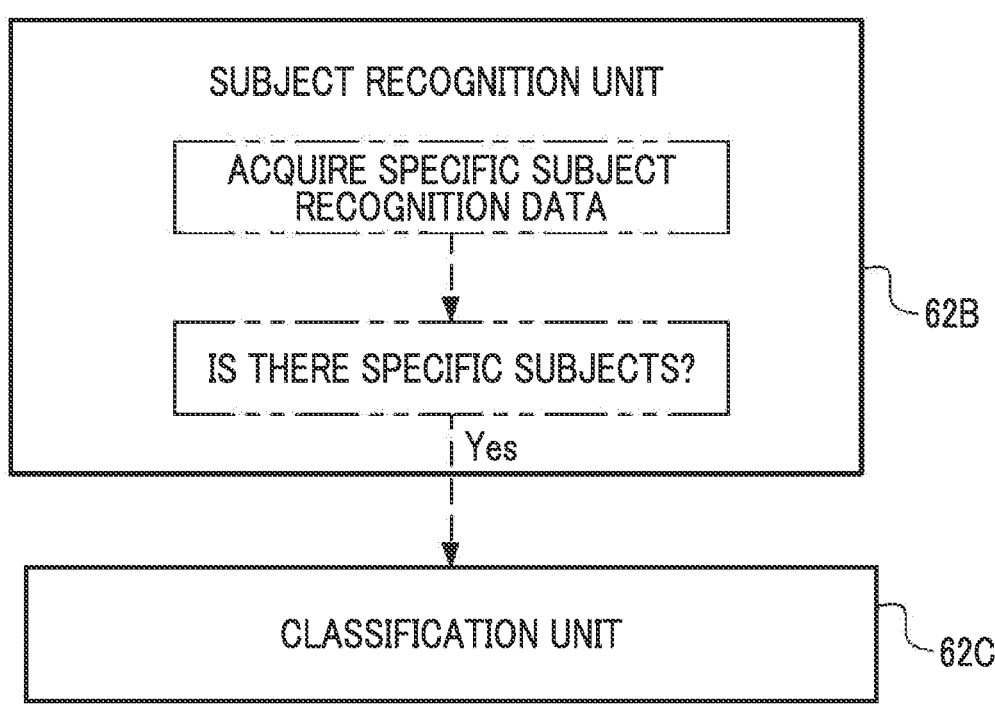
FIG. 10 is a block diagram showing an example of the content of processing of the subject recognition unit.

As an example shown in FIG. 10, the subject recognition unit 62B acquires the specific subject recognition data 86A output from the specific subject trained model 86. Thereafter, by referring to the acquired specific subject recognition data 86A, the subject recognition unit 62B determines whether or not specific subject is present in the captured image 75 acquired by the acquisition unit 62A, that is, in the captured image 75 input to the specific subject trained model 86, that is, whether or not the specific subject is captured in the captured image 75 input to the specific subject trained model 86. Here, the determination that the specific subject is present in the captured image 75 means that the specific subject is detected based on the captured image 75.

Figure 12:
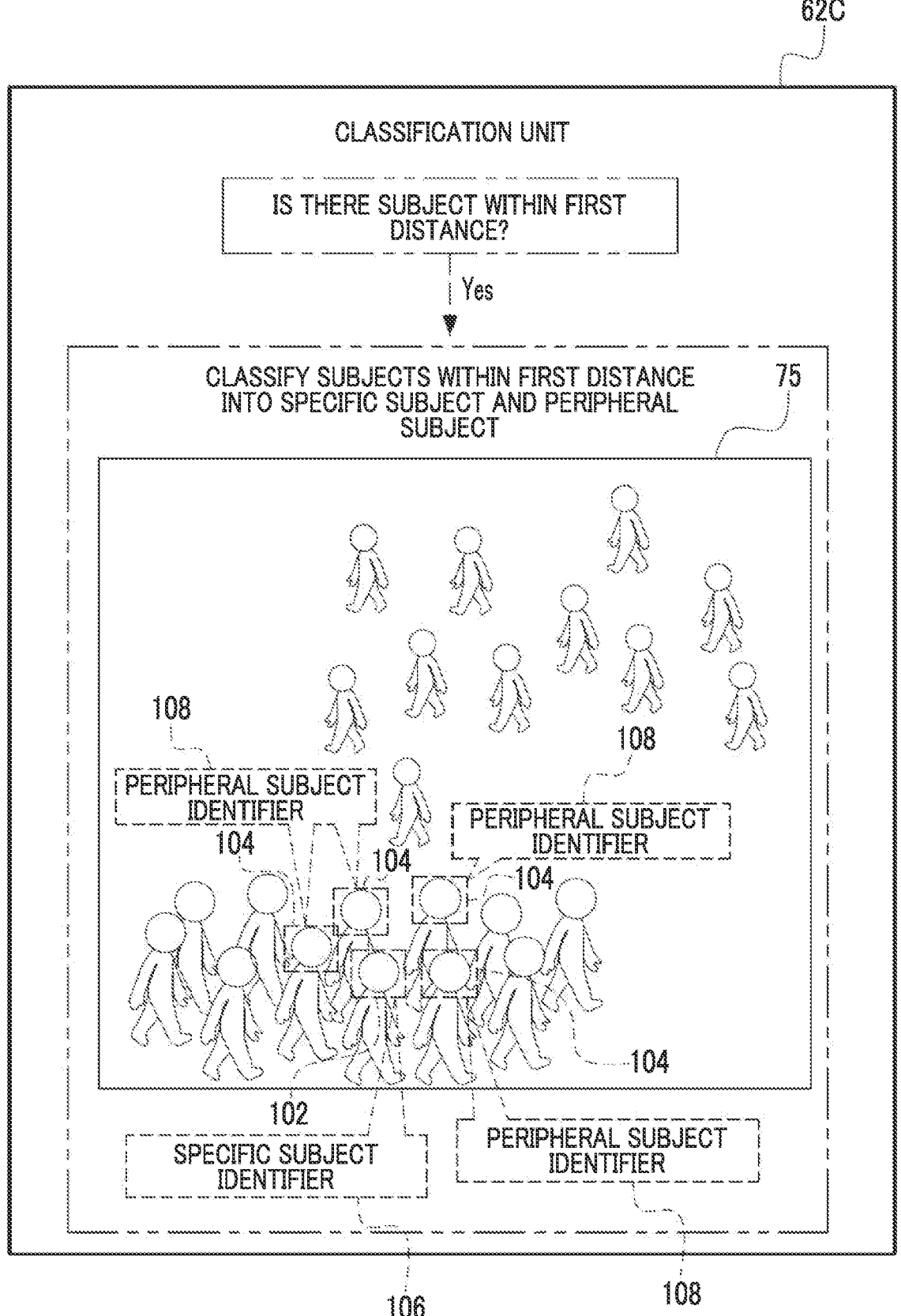
FIG. 12 is a conceptual diagram showing an example of the content of processing of the classification unit.
Figure 13:
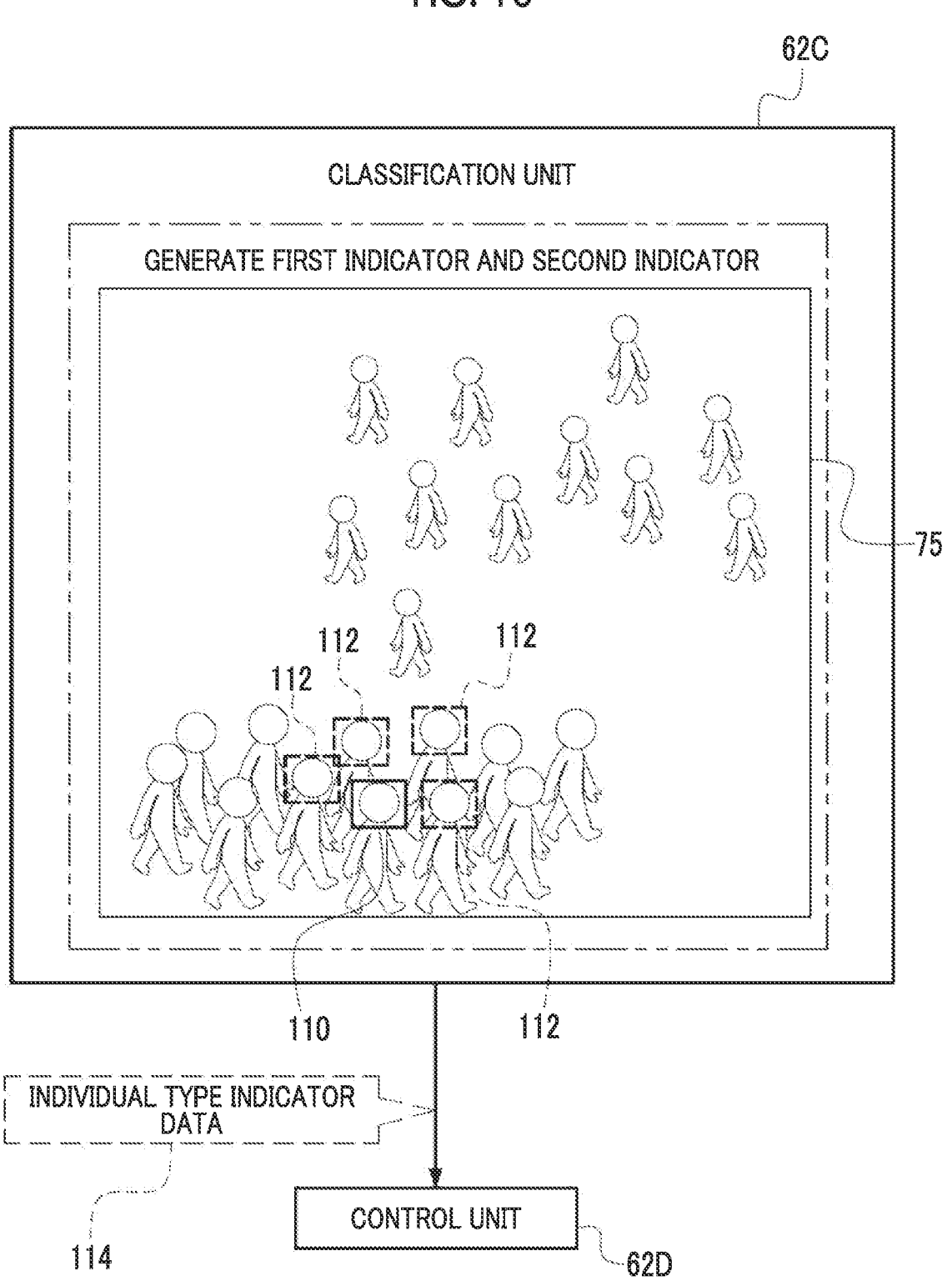
FIG. 13 is a conceptual diagram showing an example of the content of processing of the classification unit.

In a case where the subject recognition unit 62B determines that the specific subject is present in the captured image 75 input to the specific subject trained model 86, the classification unit 62C performs, for example, the processing shown in FIG. 11 to FIG. 13.

As an example shown in FIG. 11, the classification unit 62C selects the specific subject from the plurality of general subjects detected based on the captured image 75 and a peripheral subject that is present within a range of a first distance from the specific subject in an in-plane direction of the captured image 75. Here, an example of the first distance includes a distance within the captured image 75. The distance within the captured image 75 is represented, for example, in pixel units. The first distance may be a fixed value or may be a variable value that is changed according to an instruction received by the reception device 76 or the like and/or various conditions. Further, the specific subject is an example of a "first subject" according to the present disclosed technology, and the peripheral subject is an example of a "second subject" according to the present disclosed technology. Further, the first distance is an example of a "first distance" and a "default distance" according to the present disclosed technology.

The classification unit 62C acquires the general subject recognition data 84A and the specific subject recognition data 86A from the subject recognition unit 62B. Thereafter, the classification unit 62C sets an area 100 within the first distance in an image region 75A in the in-plane direction of the captured image 75 acquired by the acquisition unit 62A, that is the captured image 75 input to the general subject trained model 84 and the specific subject trained model 86, with reference to the specific subject recognition data 86A. The area 100 within the first distance refers to an area within the first distance from a specific location (for example, the center of the face) of the specific subject that is specified by using the general subject recognition data 84A in the in-plane direction of the captured image 75. The in-plane direction of the captured image 75 refers to an in-plane direction perpendicular to a depth direction, that is, a direction in a two-dimensional plane defined by two-dimensional coordinates that specify a position in the captured image 75. The area 100 within the first distance is an example of a "range of a first distance from a first subject in an in-plane direction of a captured image" according to the present disclosed technology.

The classification unit 62C determines whether or not the general subject is present in the area 100 within the first distance set in the image region 75A, that is, whether or not the general subject is captured in the area 100 within the first distance, with reference to the general subject recognition data 84A. The determination that the general subject is present in the area 100 within the first distance means that the general subject in the area 100 within the first distance is selected.

As an example shown in FIG. 12, in a case where the classification unit 62C determines that a general subject is present in the area 100 within the first distance, the classification unit 62C classifies the general subjects in the area 100 within the first distance into the specific subject and the peripheral subject.

In the captured image 75, the specific subject is surrounded by a first hypothetical frame 102. The first hypothetical frame 102 is an invisible rectangular frame, which is a so-called bounding box. The first hypothetical frame 102 is generated by the classification unit 62C according to the specific subject position specification data 86A1 included in the specific subject recognition data 86A. The classification unit 62C adds a specific subject identifier 106, which indicates that a specific subject is present in the first hypothetical frame 102, to the first hypothetical frame 102.

In the captured image 75, the general subject is surrounded by a second hypothetical frame 104. The second hypothetical frame 104 is an invisible rectangular frame, which is a so-called bounding box. The second hypothetical frame 104 is generated by the classification unit 62C according to the general subject position specification data 84A1 included in the general subject recognition data 84A. The classification unit 62C adds a peripheral subject identifier 108, which indicates that a peripheral subject is present in the second hypothetical frame 104, to the second hypothetical frame 104 in the area 100 within the first distance. That is, the peripheral subject identifier 108 is added only to the second hypothetical frame 104 in the area 100 within the first distance from among all the second hypothetical frames 104 corresponding to all the general subjects that are present in the captured image 75.

As described above, the classification unit 62C classifies the general subjects in the area 100 within the first distance into the specific subject and the peripheral subject by adding the specific subject identifier 106 to the first hypothetical frame 102 and adding the peripheral subject identifier 108 to the second hypothetical frame 104 in the area 100 within the first distance.

As an example shown in FIG. 13, the classification unit 62C generates a first indicator 110 with reference to the specific subject identifier 106 and the first hypothetical frame 102, and generates a second indicator 112 with reference to the peripheral subject identifier 108 and the second hypothetical frame 104.

The first indicator 110 specifies a specific subject image indicating the specific subject. The first indicator 110 is a display frame that has the same position, size, and shape as the first hypothetical frame 102, and is visualized by being displayed on the display 28. The first indicator 110 is generated by processing the first hypothetical frame 102 so as to be visualized.

The second indicator 112 specifies a peripheral subject image indicating the peripheral subject in a mode different from that of the first indicator 110. The second indicator 112 is a display frame that has the same position, size, and shape as the second hypothetical frame 104, and is visualized by being displayed on the display 28. The second indicator 112 is generated by processing the second hypothetical frame 104 so as to be visible.

In the example shown in FIG. 13, the first indicator 110 is a frame of a solid line, and the second indicator 112 is a frame of a broken line. It should be noted that this is only an example, and the classification unit 62C may generate the first indicator 110 and the second indicator 112 in a distinguishable manner by changing color of the first indicator 110 and color of the second indicator 112 or the like. Further, the classification unit 62C may generate the first indicator 110 and the second indicator 112 in a distinguishable manner by changing a contrast of the first indicator 110 and a contrast of the second indicator 112.

The control unit 62D acquires the data, which includes the first indicator 110 and the second indicator 112 generated by the classification unit 62C, from the classification unit 62C as the individual type indicator data 114.

Figure 14:
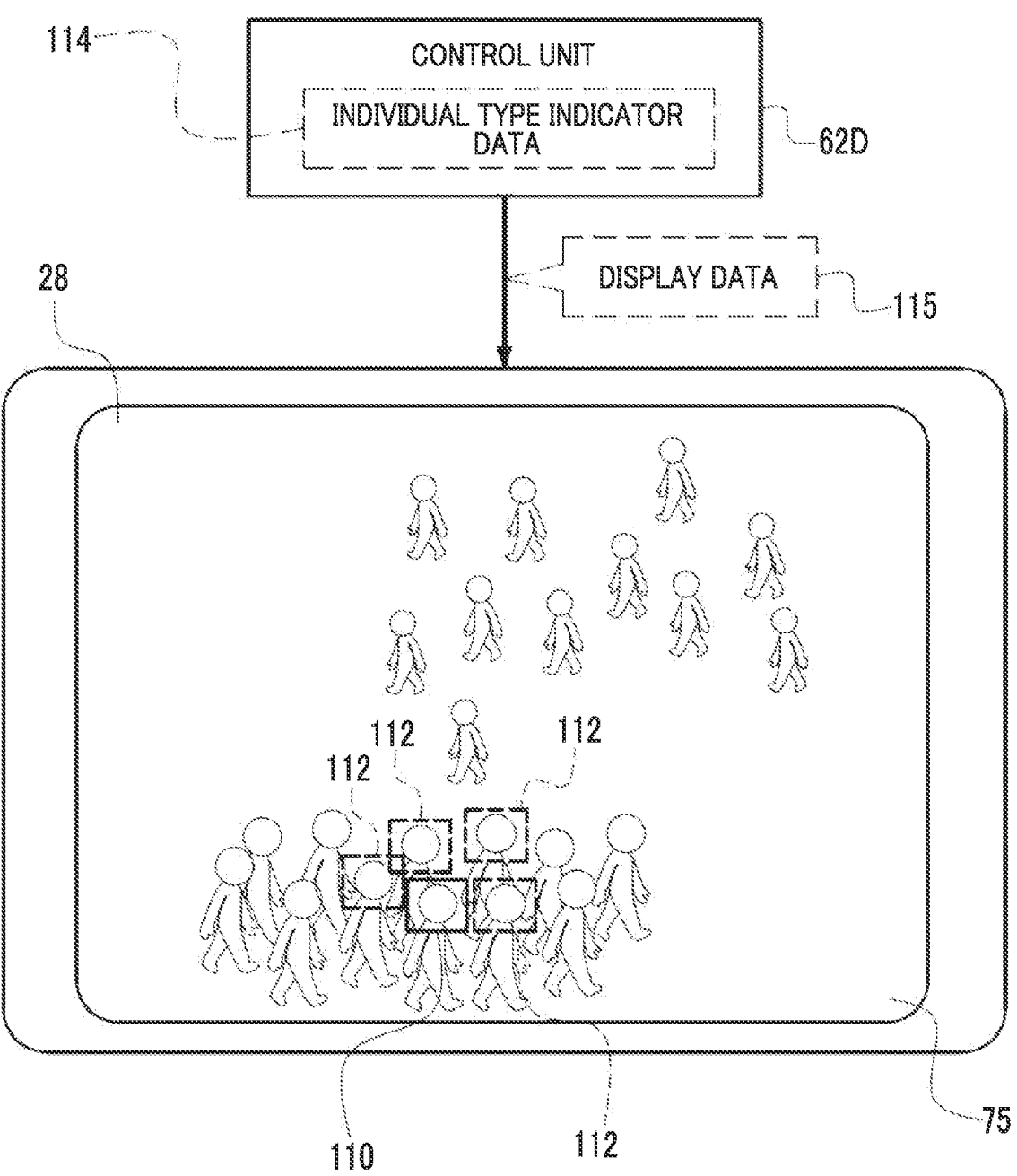
FIG. 14 is a conceptual diagram showing an example of the content of processing of the control unit.

As an example shown in FIG. 14, the control unit 62D superimposes the first indicator 110 and the second indicator 112 on the captured image 75 and displays the first indicator 110 and the second indicator 112 on the display 28 based on the individual type indicator data 114. In this case, for example, the control unit 62D generates the display data 115 based on the individual type indicator data 114 and outputs the generated display data 115 to the display 28. The display data 115 is data for displaying the first indicator 110 and the second indicator 112 on the display 28. The display data 115 is an example of "display data" according to the present disclosed technology. Further, here, although an example of the embodiment in which the display data 99 (see FIG. 7) and the display data 115 are output separately has been described, the present disclosed technology is not limited to this, and the display data 99 may be integrated with the display data 115. That is, the display data 115 may be display data in which the first indicator 110 and the second indicator 112 are superimposed on the captured image 75.

Figure 15:
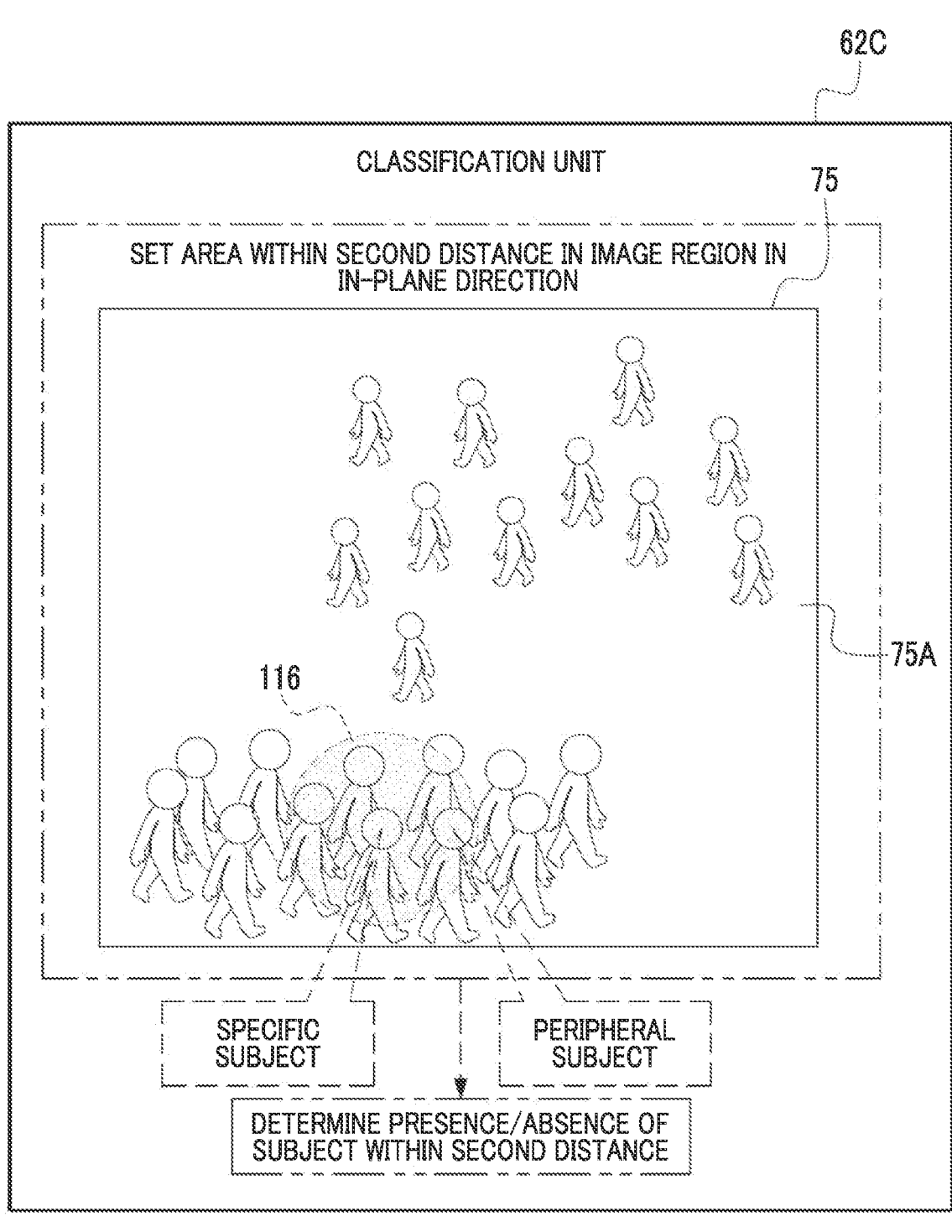
FIG. 15 is a conceptual diagram showing an example of the content of processing of the classification unit.

As an example shown in FIG. 15, the classification unit 62C selects the specific subject from the plurality of general subjects detected based on the captured image 75 and a peripheral subject that is present within a range of a second distance from the specific subject in an in-plane direction of the captured image 75. Here, an example of the second distance includes a distance within the captured image 75. The distance within the captured image 75 is represented, for example, in pixel units. The second distance may be a fixed value or may be a variable value that is changed according to an instruction received by the reception device 76 or the like and/or various conditions. Further, the second distance is a distance shorter than the first distance. However, this is only an example, and the second distance may be a distance equal to or longer than the first distance. Further, the second distance is an example of a "second distance" and a "default distance" according to the present disclosed technology.

The classification unit 62C sets an area 116 within the second distance in an image region 75A in the in-plane direction of the captured image 75 acquired by the acquisition unit 62A, that is the captured image 75 input to the general subject trained model 84 and the specific subject trained model 86, with reference to the specific subject recognition data 86A. The area 116 within the second distance refers to an area within the second distance from a specific location (for example, the center of the face) of the specific subject that is specified by using the general subject recognition data 84A in the in-plane direction of the captured image 75. The in-plane direction of the captured image 75 refers to an in-plane direction perpendicular to a depth direction, that is, a direction in a two-dimensional plane defined by two-dimensional coordinates that specify a position in the captured image 75. The area 116 within the second distance is an example of a "range of a second distance from a second subject in an in-plane direction of a captured image" according to the present disclosed technology.

The classification unit 62C determines whether or not the general subject is present in the area 116 within the second distance set in the image region 75A, that is, whether or not the general subject is captured in the area 116 within the second distance, with reference to the general subject recognition data 84A. The determination that the general subject is present in the area 116 within the second distance means that the general subject in the area 116 within the second distance is selected.

Figure 16:
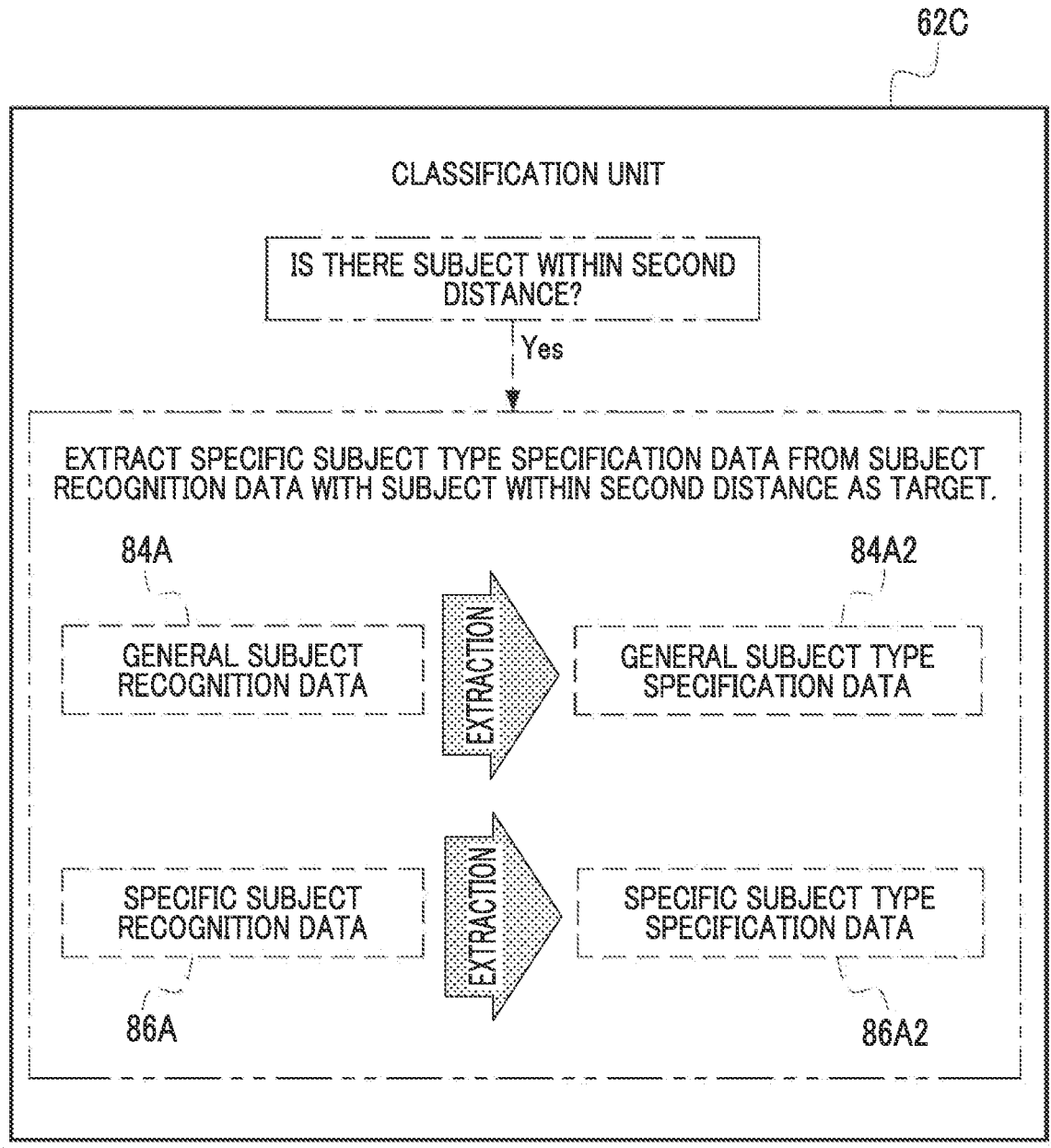
FIG. 16 is a conceptual diagram showing an example of the content of processing of the classification unit.

As an example shown in FIG. 16, in a case where it is determined that the general subject is present in the area 116 within the second distance set in the image region 75A, the classification unit 62C acquires the type of the general subject in the area 116 within the second distance by extracting the general subject type specification data 84A2 from the general subject recognition data 84A with the general subject in the area 116 within the second distance as the target. Further, the classification unit 62C acquires the type of the specific subject by extracting the specific subject type specification data 86A2 from the specific subject recognition data 86A.

Figure 17:
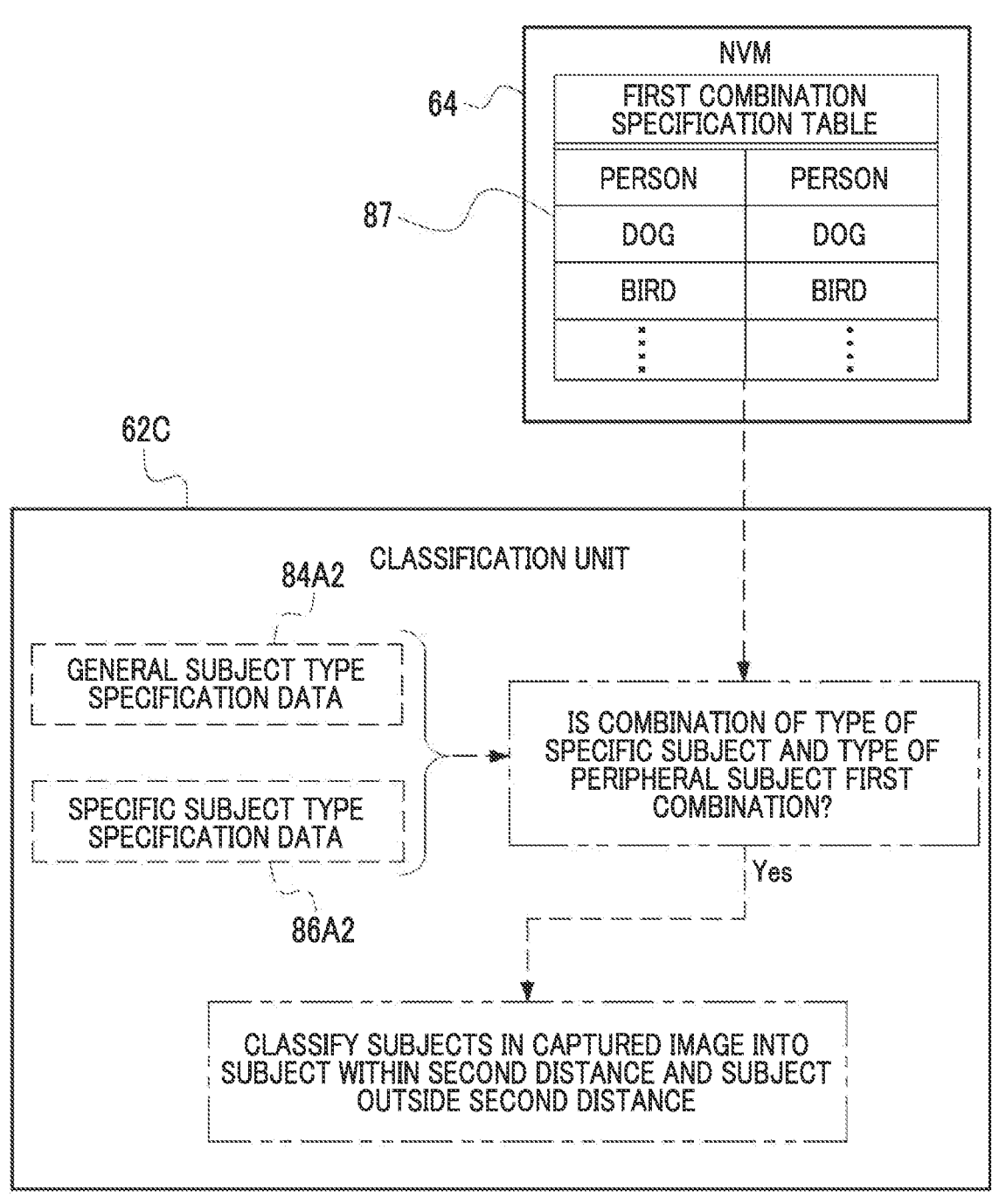
FIG. 17 is a conceptual diagram showing an example of the content of processing of the classification unit.

As an example shown in FIG. 17, the classification unit 62C determines whether or not a combination of the specific subject and the general subject in the area 116 within the second distance is a first combination with reference to a first combination specification table 87 in the NVM 64. The first combination specification table 87 defines a combination of a type of the specific subject and a type of the general subject. The combination that is defined in the first combination specification table 87 is an example of a "first combination" according to the present disclosed technology. In the example shown in FIG. 17, a combination in a case where the type of the specific subject and the type of the general subject are the same is shown. However, this is only an example, and other combinations may be used. Further, the combination defined based on the first combination specification table 87 may be fixed or may be changed according to an instruction received by the reception device 76 or the like and/or various conditions.

The classification unit 62C determines whether or not a type, which is specified based on the general subject type specification data 84A2 extracted from the general subject recognition data 84A, and a type, which is specified based on the specific subject type specification data 86A2 extracted from the specific subject recognition data 86A, coincide any of the combinations defined in the first combination specification table 87. That is, the classification unit 62C determines whether or not the combination of the type of the general subject and the type of the specific subject coincide any of the combinations defined in the first combination specification table 87 in the area 116 within the second distance.

That is, in a case where it is determined that the combination of the type of the general subject and the type of the specific subject coincide any of the combinations defined in the first combination specification table 87 in the area 116 within the second distance, the classification unit 62C classifies the general subjects in the captured image 75 into a subject within the second distance and a subject outside the second distance. The subject within the second distance refers to the specific subject and the peripheral subject that are present in the area 116 within the second distance, and the subject outside the second distance refers to the general subject other than the specific subject and peripheral subject that are present in the area 116 within the second distance from among all the general subjects in the captured image 75.

Figure 18:
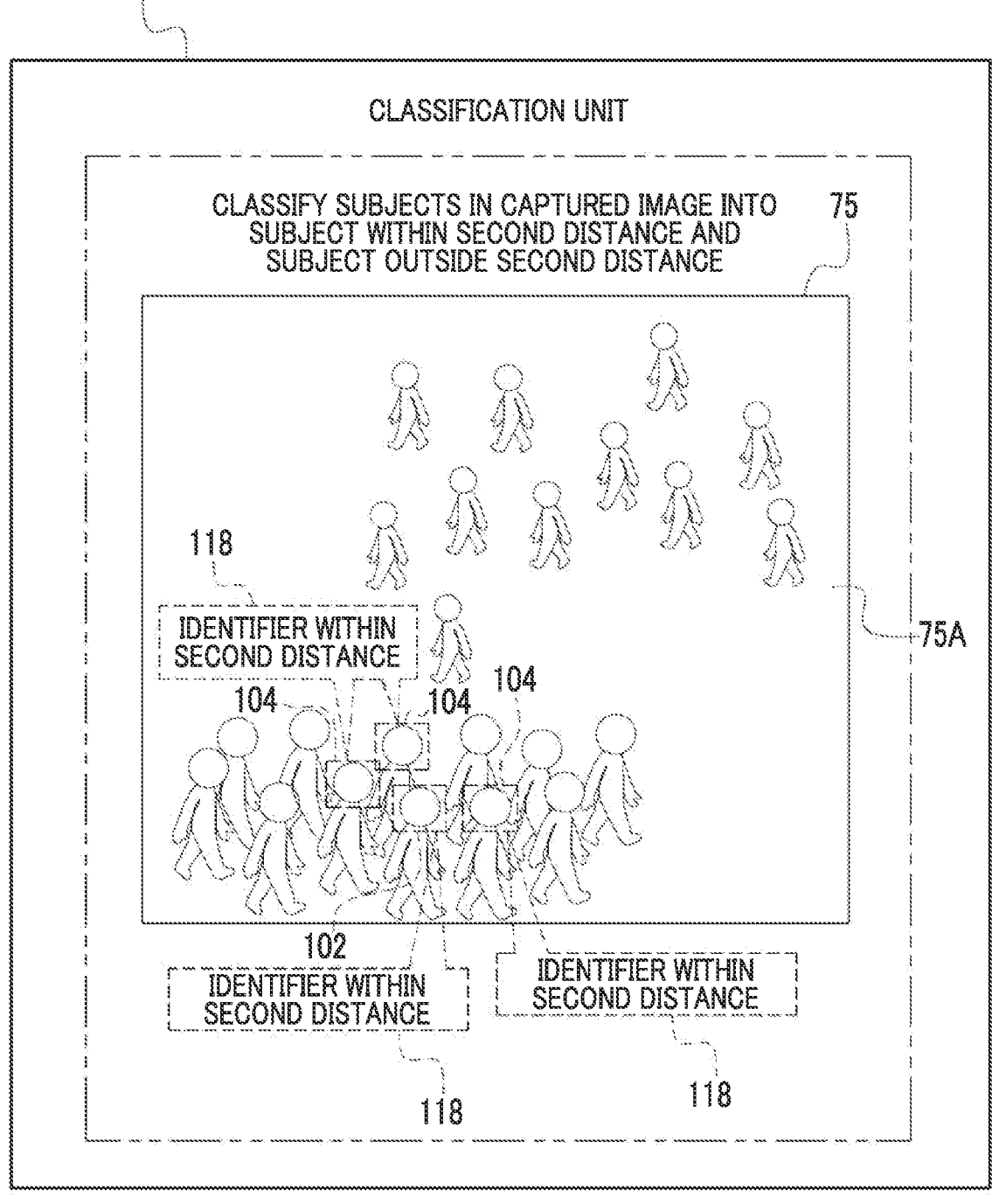
FIG. 18 is a conceptual diagram showing an example of the content of processing of the classification unit.

As an example shown in FIG. 18, the classification unit 62C adds an identifier 118 within the second distance, which indicates that each of the first hypothetical frame 102 and the second hypothetical frame 104 is present within the area 116 within the second distance, to the first hypothetical frame 102 and the second hypothetical frame 104 in the area 116 within the second distance.

As described above, the classification unit 62C classifies all the subjects in the captured image 75 into the subject within the second distance and the subject outside the second distance by adding the identifier 118 within the second distance to each of the first hypothetical frame 102 and the second hypothetical frame 104 within the area 116 within the second distance.

Figure 19:
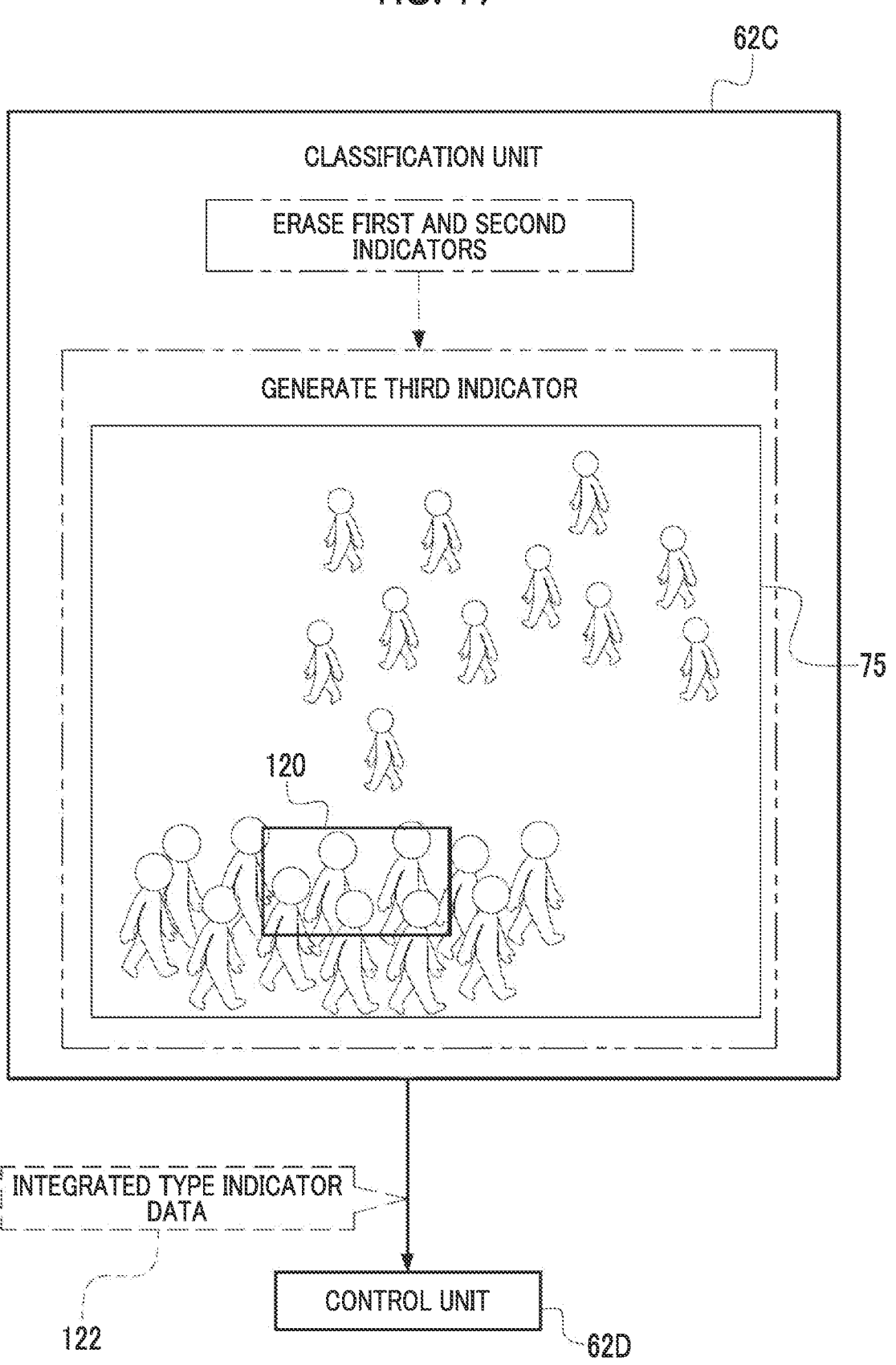
FIG. 19 is a conceptual diagram showing an example of the content of processing of the classification unit.

In a case where all the subjects in the captured image 75 are classified into the subject within the second distance and the subject outside the second distance, as an example shown in FIG. 19, the classification unit 62C erases the first indicator 110 and the second indicator 112 in a case where the first indicator 110 and the second indicator 112 are present. Thereafter, the classification unit 62C generates a third indicator 120 with reference to the first hypothetical frame 102 to which the identifier 118 within the second distance is added and the second hypothetical frame 104 to which the identifier 118 within the second distance is added.

The third indicator 120 is an indicator in which the combination of the type of the specific subject and the type of the peripheral subject is defined in the first combination specification table 87, and the specific subject and peripheral subject that are present within the area 116 within the second distance are specified. For the third indicator 120, the combination of the type of the specific subject and the type of the peripheral subject is defined in the first combination specification table 87, and the third indicator 120 is a display frame (a rectangular-shaped frame in the example shown in FIG. 19) that surrounds the first hypothetical frame 102 and the second hypothetical frame 104 corresponding to the specific subject and the peripheral subject that are present within the area 116 within the second distance and is visualized by being displayed on the display 28.

The control unit 62D acquires the data, which includes the third indicator 120 generated by the classification unit 62C, from the classification unit 62C as integrated type indicator data 122.

Figure 20:
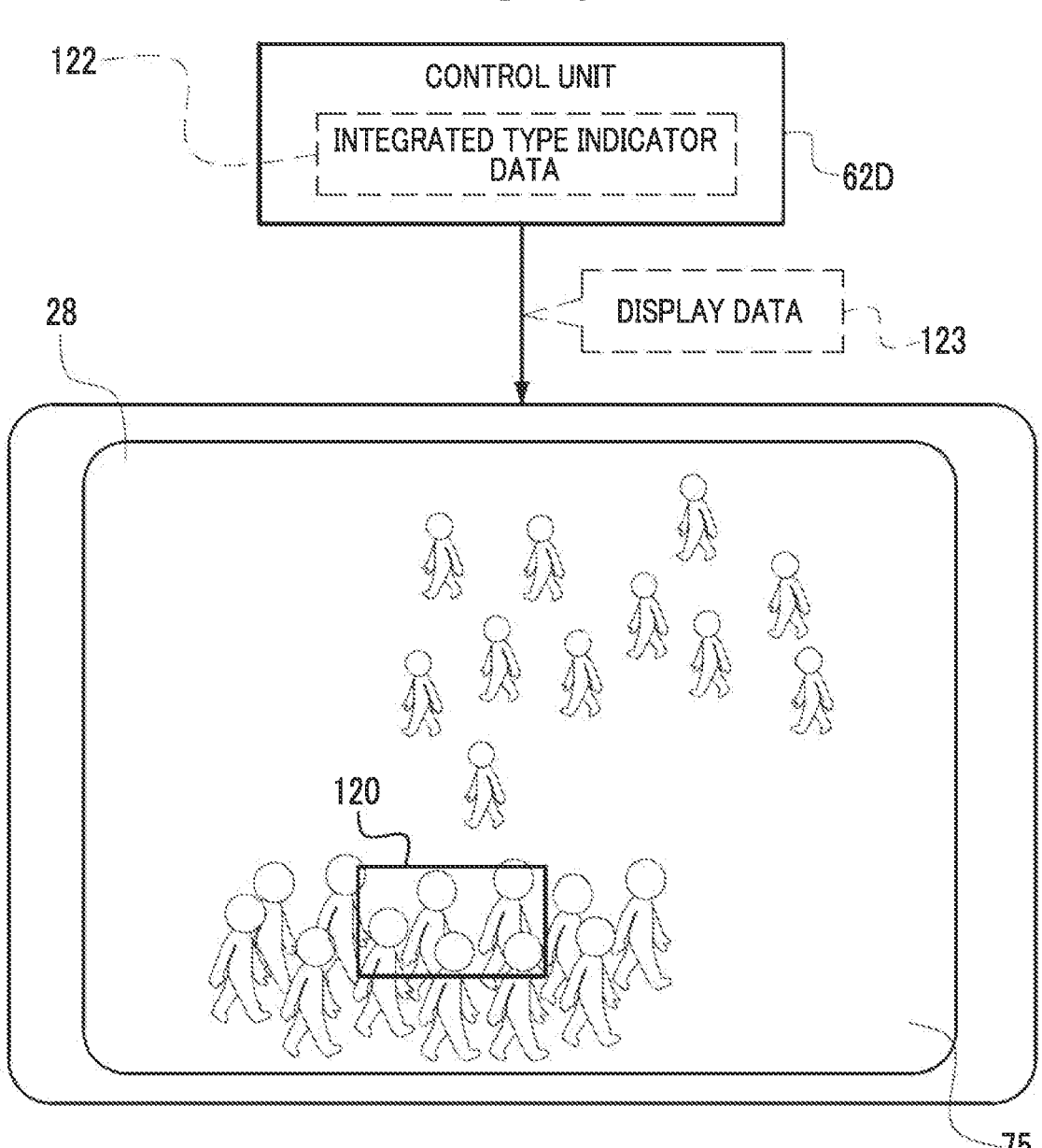
FIG. 20 is a conceptual diagram showing an example of the content of processing of the control unit.

As an example shown in FIG. 20, the control unit 62D erases the first indicator 110 and the second indicator 112 based on the integrated type indicator data 122, superimposes the third indicator 120 on the captured image 75, and displays the third indicator 120 on the display 28. In this case, for example, the control unit 62D generates the display data 123 based on the integrated type indicator data 122 and outputs the generated display data 123 to the display 28. The display data 123 is data for erasing the first indicator 110 and the second indicator 112 and displaying the third indicator 120 on the display 28. In other words, the display data 123 is data for displaying the third indicator 120 on the display 28 instead of the first indicator 110 and the second indicator 112. Here, the display data 123 is an example of "display data" and "first data" according to the present disclosed technology.

Figure 21:
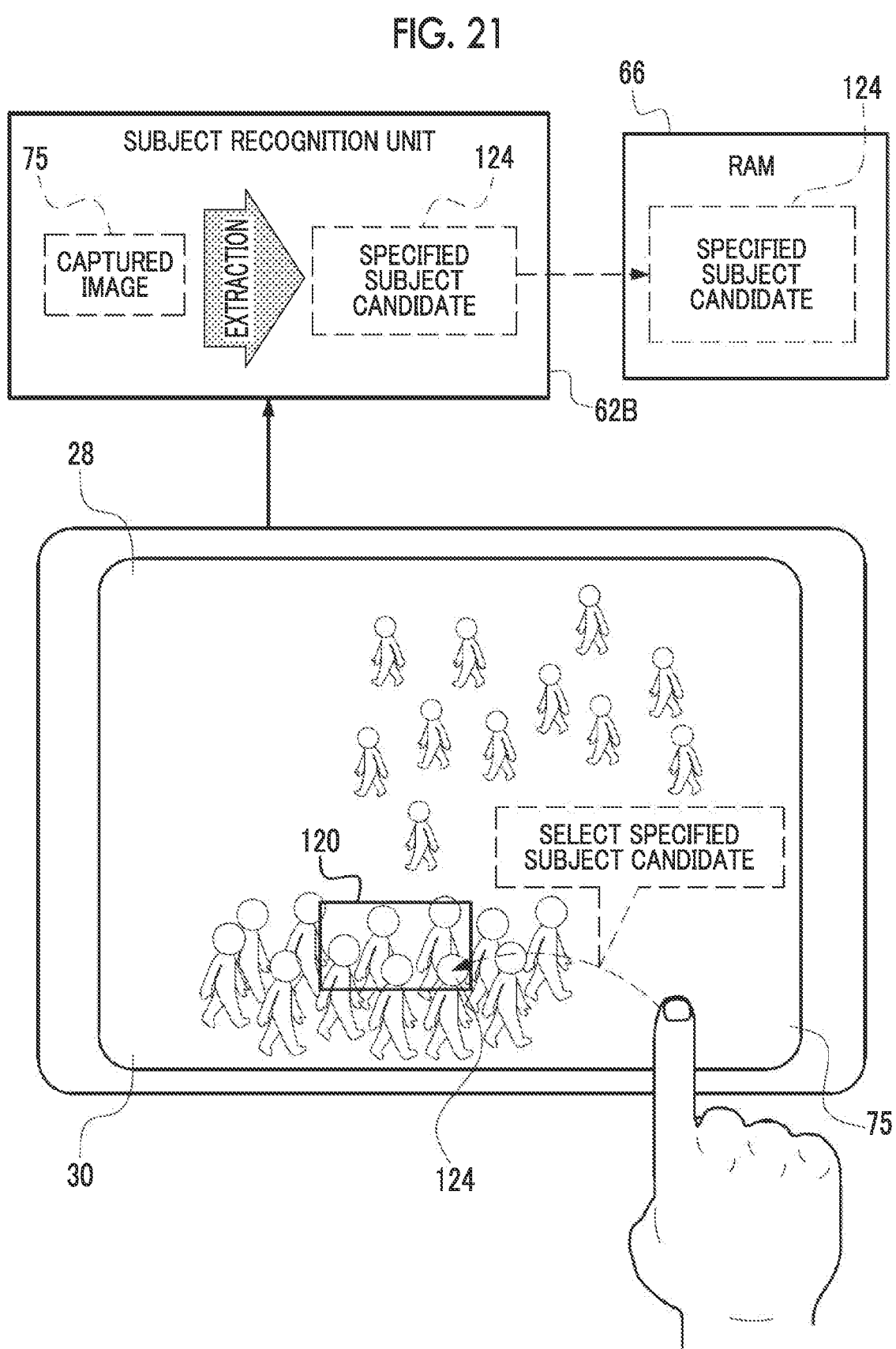
FIG. 21 is a conceptual diagram showing an example of the content of processing of the subject recognition unit.

As an example shown in FIG. 21, in a case where the user or the like desires to change the specific subject in a case where the captured image 75 is displayed on the display 28 and the third indicator 120 is superimposed on the captured image 75 and displayed, a specific subject candidate 124 is selected by the user or the like via a touch panel 30. That is, any peripheral subject, which is present in the third indicator 120, is selected as the specific subject candidate 124 by the user or the like via the touch panel 30. As described above, in a case where the specific subject candidate 124 is selected, the subject recognition unit 62B extracts the specific subject candidate 124 from the captured image 75 displayed on the display 28 at an immediately before a timing of moment when the specific subject candidate 124 is selected, and the extracted specific subject candidate 124 is stored (overwritten and stored) in the RAM 66. Note that it is not always necessary to select the specific subject candidate 124 in a state where the third indicator 120 is superimposed and displayed. The specific subject candidate 124 may be selected based on that any of the second indicators 112 are selected by the user or the like in a state where the first indicator 110 and the second indicator 112 are superimposed on the captured image 75 as shown in FIG. 14 and displayed. Further, the specific subject candidate 124 may be selected from the subjects that are present outside a range of the second distance from the specific subject.

Figure 22:
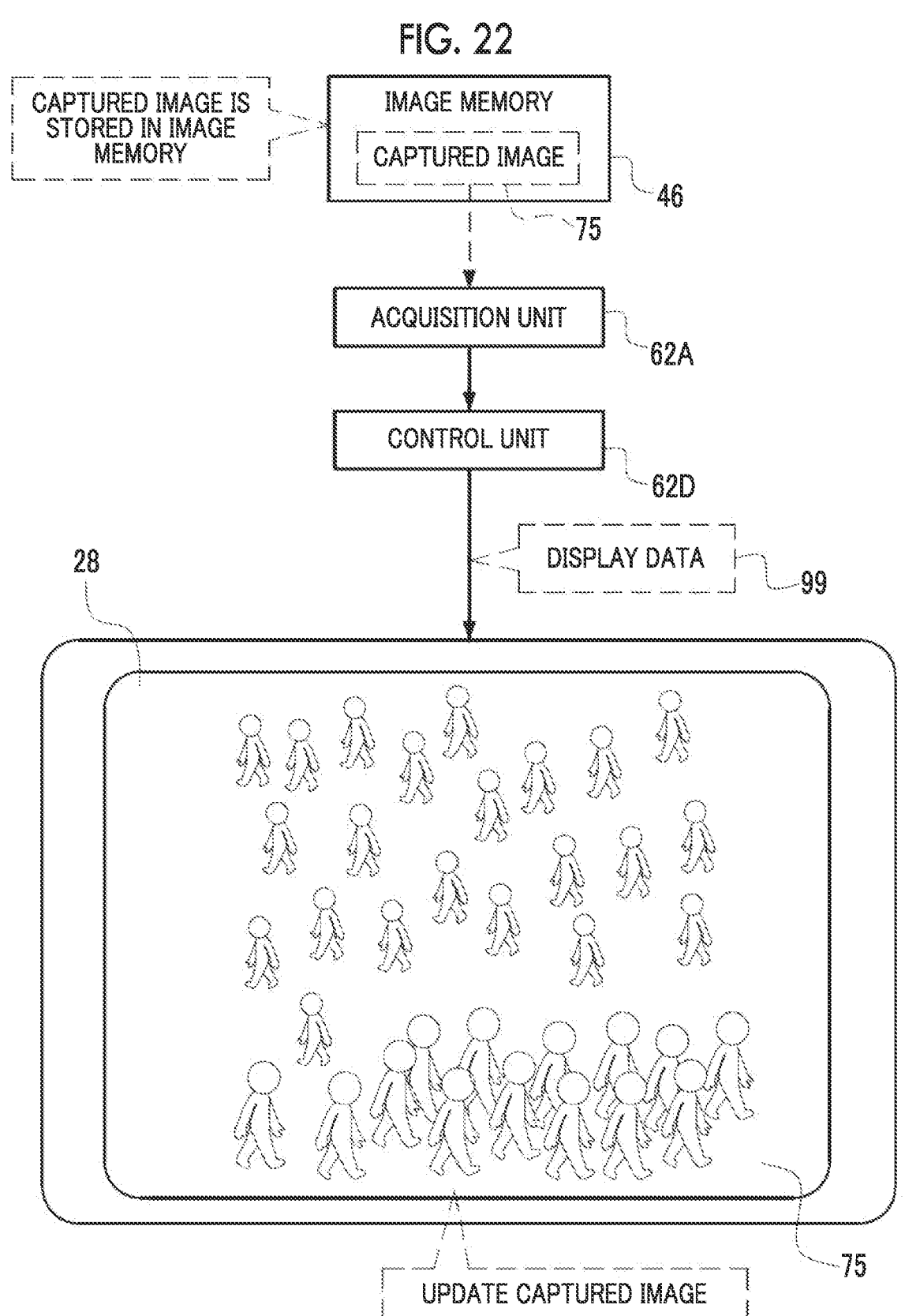
FIG. 22 is a conceptual diagram showing an example of the content of processing of the acquisition unit and the control unit.

As an example shown in FIG. 22, in a case where a new captured image 75 is stored in the image memory 46 after the specific subject candidate 124 is selected and stored in the RAM 66, the latest captured image 75 is acquired from the image memory 46 by the acquisition unit 62A. The control unit 62D generates the display data 99 for displaying the latest captured image 75, which is acquired by the acquisition unit 62A, and outputs the generated display data 99 to the display 28. Accordingly, the captured image 75, which is displayed on the display 28, is updated with the latest captured image 75.

Figure 23:
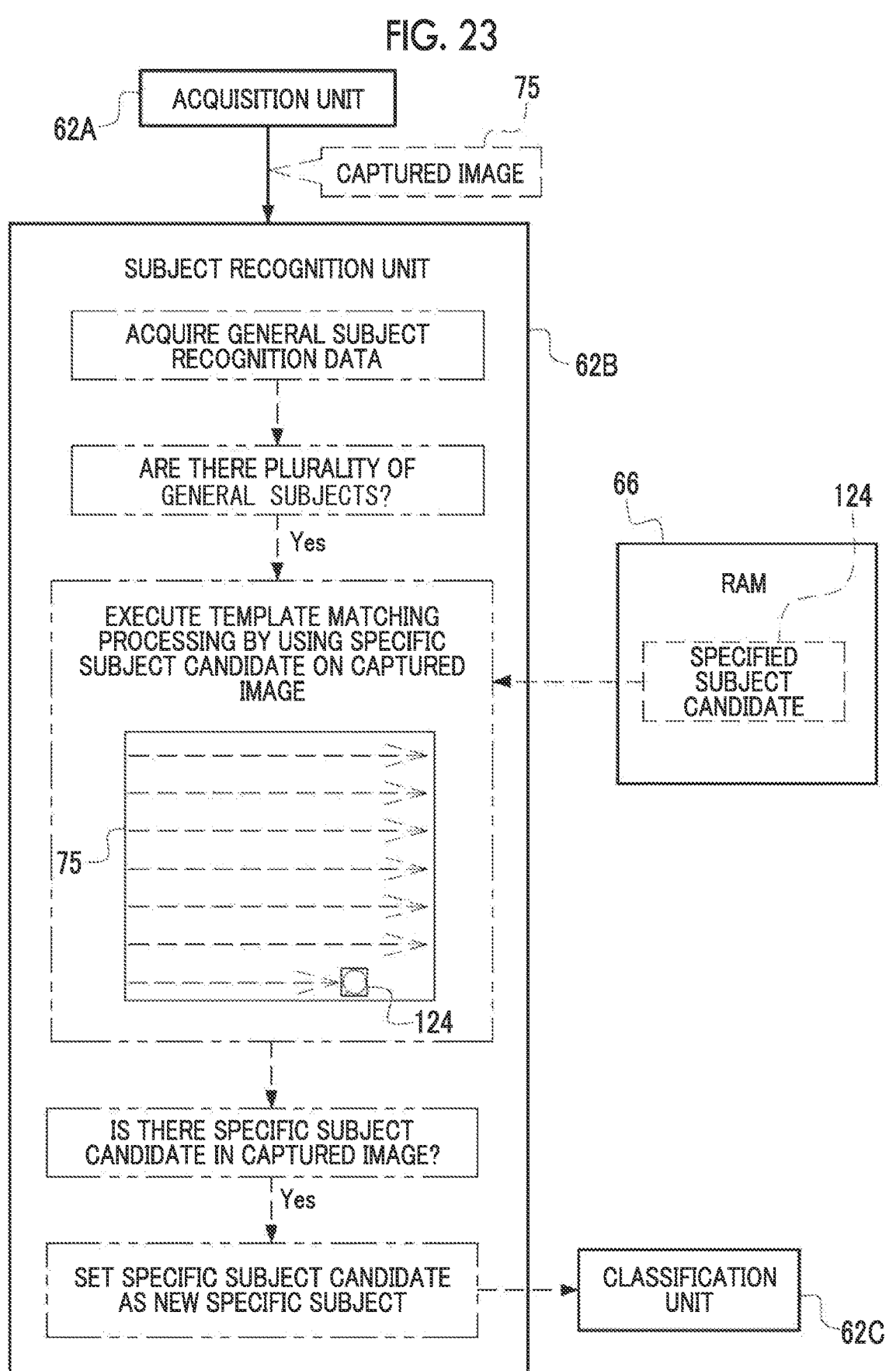
FIG. 23 is a conceptual diagram showing an example of the content of processing of the acquisition unit and the subject recognition unit.

As an example shown in FIG. 23, the subject recognition unit 62B acquires the general subject recognition data 84A output from the general subject trained model 84 by inputting the captured image 75 acquired by the acquisition unit 62A, that is, the captured image 75 displayed on the display 28 to the general subject trained model 84. The subject recognition unit 62B determines whether or not a plurality of general subjects are present in the captured image 75, which is input to the general subject trained model 84, from the acquired general subject recognition data 84A.

In a case where a plurality of general subjects are present in the captured image 75 input to the general subject trained model 84, the subject recognition unit 62B executes template matching type subject recognition processing by using the specific subject candidate 124 as a template on the captured image 75 that is input to the general subject trained model 84.

The subject recognition unit 62B executes the subject recognition processing of the template matching method to determine whether or not the specific subject candidate 124 is present in the captured image 75. Here, in a case where the subject recognition unit 62B determines that the specific subject recognition candidate 124 is present in the captured image 75, the subject recognition unit 62B sets the specific subject candidate 124 as a new specified subject, and then the classification unit 62C performs the above-described processing (see FIG. 11 to FIG. 13 or the like).

Next, the operation of the imaging apparatus 10 will be described with reference to FIG. 24A and FIG. 24B.

Figure 24A:
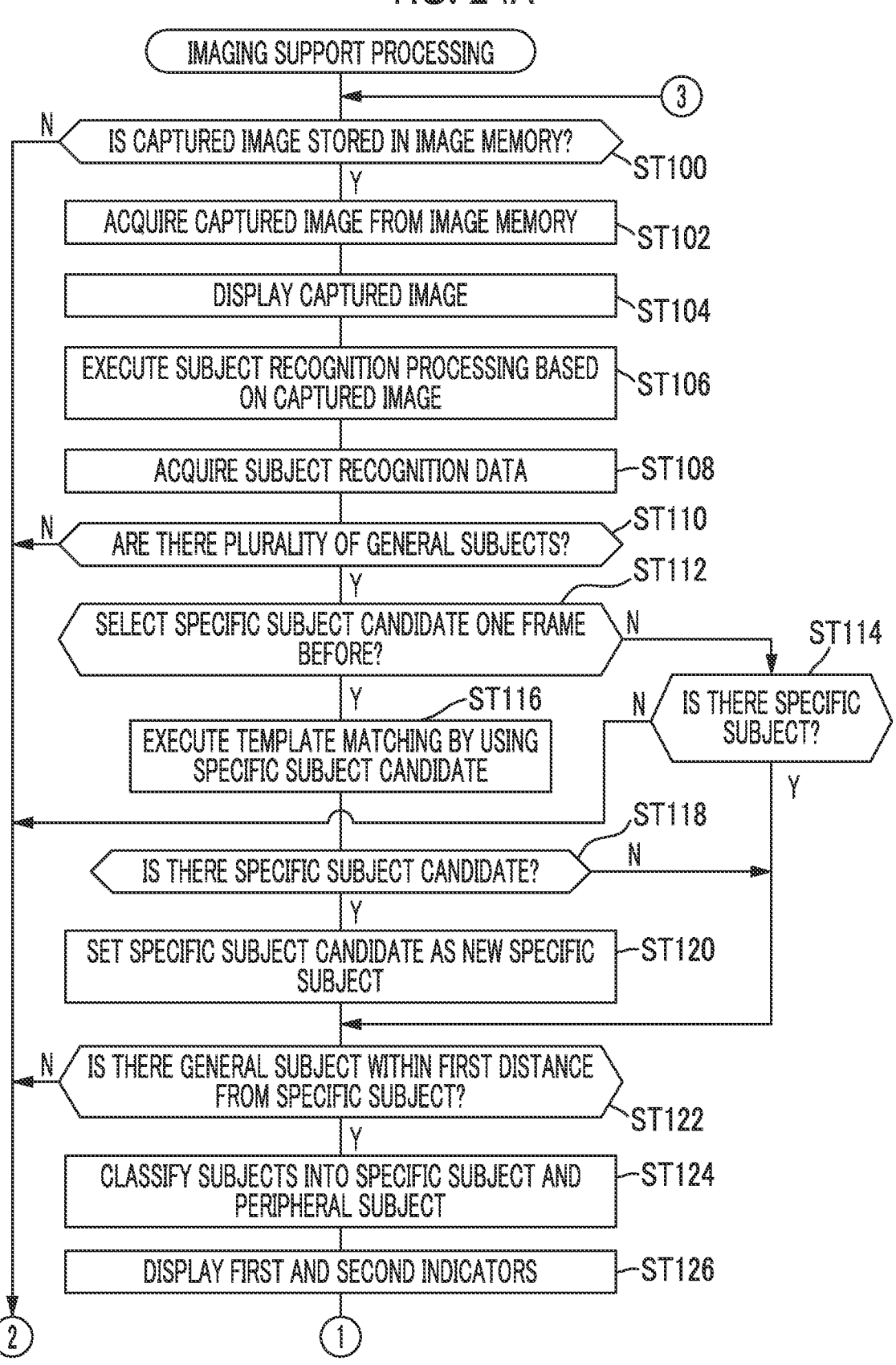
FIG. 24A is a flowchart showing an example of a flow of imaging support processing.

FIGS. 24A and 24B show an example of a flow of the imaging support processing performed by the CPU 62 of the imaging apparatus 10. The flow of the imaging support processing shown in FIGS. 24A and 24B is an example of an "imaging support method" according to the present disclosed technology.

In the imaging support processing shown in FIG. 24A, first, in step ST100, the acquisition unit 62A determines whether or not the captured image 75 is stored in the image memory 46. In step ST100, in a case where the captured image 75 is stored in the image memory 46, the determination is set as negative, and the imaging support processing shifts to step ST144 shown in FIG. 24B. In step ST100, in a case where the captured image 75 is stored in the image memory 46, the determination is set as positive, and the imaging support processing shifts to step ST102.

In step ST102, the acquisition unit 62A acquires the captured image 75 from the image memory 46. After the processing in step ST102 is executed, the imaging support processing shifts to step ST104.

In step ST104, the control unit 62D displays the captured image 75, which is acquired in step ST102, on the display 28. After the processing in step ST104 is executed, the imaging support processing shifts to step ST106.

In step ST106, the subject recognition unit 62B executes the subject recognition processing by using the general subject trained model 84 and the specific subject trained model 86 based on the captured image 75 acquired in step ST102. After the processing in step ST106 is executed, the imaging support processing shifts to step ST108.

In step ST108, the subject recognition unit 62B acquires the general subject recognition data 84A, which is output from the general subject trained model 84 by executing the processing of step ST106, and the specific subject recognition data 86A, which is output from the specific subject trained model 86 by executing the processing of step ST106. After the processing in step ST108 is executed, the imaging support processing shifts to step ST110.

In step ST110, the subject recognition unit 62B determines whether or not the plurality of general subjects are captured in the captured image 75 with reference to the general subject recognition data 84A acquired in step ST108. In step ST110, in a case where the plurality of general subjects are not captured in the captured image 75, the determination is set to negative, and the imaging support processing shifts to step ST144 shown in FIG. 24B. In step ST110, in a case where the plurality of general subjects are captured in the captured image 75, the determination is set to positive, and the imaging support processing shifts to step ST112.

In step ST112, the subject recognition unit 62B determines whether or not the specific subject candidate 124 is selected one frame before (see step ST136 shown in FIG. 24B). In step ST112, in a case where the specific subject candidate 124 is not selected one frame before, the determination is set to negative, and the imaging support processing shifts to step ST114. In a case in which the specific subject candidate 124 is selected one frame before in step ST112, the determination is set to positive, and the imaging support processing shifts to step ST116.

In step ST114, the subject recognition unit 62B determined whether or not the specific subject is present in the plurality of general subjects determined to be captured in the captured image 75 with reference to the specific subject recognition data 86A acquired in step ST108. In step ST114, in a case where the specific subject is not present in the plurality of general subjects determined to be captured in the captured image 75, the determination is set to negative, and the imaging support processing shifts to step ST144 shown in FIG. 24B. In step ST114, in a case where the specific subject is present in the plurality of general subjects determined to be captured in the captured image 75, the determination is set to positive, and the processing shifts to step ST122.

In step ST116, the subject recognition unit 62B executes the template matching type subject recognition processing by using the specific subject candidate 124 selected one frame before on the captured image 75. After the processing in step ST116 is executed, the imaging support processing shifts to step ST118.

In step ST118, the subject recognition unit 62B determines whether or not the specific subject candidate 124 is captured in the captured image 75 with reference to the result of the subject recognition processing executed in step ST116. In step ST118, in a case where the specific subject candidate 124 is not captured in the captured image 75, the determination is set to negative, and the imaging support processing shifts to step ST122. In step ST118, in a case where the specific subject candidate 124 is captured in the captured image 75, the determination is set to positive, and the imaging support processing shifts to step ST120.

In step ST120, the subject recognition unit 62B sets the specific subject candidate 124 as a new specific subject. After the processing in step ST120 is executed, the imaging support processing shifts to step ST122.

In step ST122, the classification unit 62C determines whether or not the general subject is present within the first distance from the specific subject. In step ST122, in a case where the general subject is not present within the first distance from the specific subject, the determination is set to negative, and the imaging support processing shifts to step ST144 shown in FIG. 24B. In step ST122, in a case where the general subject is present within the first distance from the specific subject, the determination is set to positive, and the imaging support processing shifts to step ST124.

In step ST124, the classification unit 62C classifies the general subjects within the first distance into a specific subject and a peripheral subject. After the processing in step ST124 is executed, the imaging support processing shifts to step ST126.

In step ST126, the control unit 62D displays the first indicator 110 that specifies the specific subject and the second indicator 112 that specifies the peripheral subject on the display 28. After the processing in step ST126 is executed, the imaging support processing shifts to step ST128 shown in FIG. 24B.

In step ST128 shown in FIG. 24B, the classification unit 62C determines whether or not the general subject is present within the second distance from the specific subject. In step ST128, in a case where the general subject is not present within the second distance from the specific subject, the determination is set to negative, and the imaging support processing shifts to step ST144. In step ST128, in a case where the general subject is present within the second distance from the specific subject, the determination is set to positive, and the imaging support processing shifts to step ST130.

In step ST130, the classification unit 62C determines whether or not the combination of the type of the specific subject and the type of the peripheral subject is the first combination defined in the first combination specification table 87. In step ST130, in a case where the combination of the type of the specific subject and the type of the peripheral subject is not the first combination defined in the first combination specification table 87, the determination is set to negative, and the imaging support processing shifts to step ST144. In step ST130, in a case where the combination of the type of the specific subject and the type of the peripheral subject is the first combination defined in the first combination specification table 87, the determination is set to positive, and the imaging support processing shifts to step ST132.

In step ST132, the control unit 62D erases the first indicator 110 and the second indicator 112. After the processing in step ST132 is executed, the imaging support processing shifts to step ST134.

In step ST134, the control unit 62D displays the third indicator 120 on the display 28. After the processing in step ST134 is executed, the imaging support processing shifts to step ST136.

In step ST136, the subject recognition unit 62B determines whether or not the specific subject candidate 124 is selected via the touch panel 30. In step ST136, in a case where the specific subject candidate 124 is not selected via the touch panel 30, the determination is set to negative, and the imaging support processing shifts to step ST144. In step ST136, in a case where the specific subject candidate 124 is selected via the touch panel 30, the determination is set to positive, and the imaging support processing shifts to step ST138.

In step ST138, the subject recognition unit 62B extracts the specific subject candidate 124 from the captured image 75 acquired in step ST104. After the processing in step ST138 is executed, the imaging support processing shifts to step ST144.

In step ST144, the subject recognition unit 62B determines whether or not the condition for ending the imaging support processing (hereinafter, also referred to as an "imaging support processing end condition") is satisfied. Examples of the imaging support processing end condition include a condition that the imaging mode that is set for the imaging apparatus 10 is canceled, a condition that an instruction to end the imaging support processing is received by a reception device 76, or the like. In step ST144, in a case where the imaging support processing end condition is not satisfied, the determination is set as negative, and the imaging support processing shifts to step ST140.

In step ST140, the control unit 62D determines whether or not the indicator is displayed on the display 28. In step ST140, in a case where the indicator (for example, the first indicator 110 and the second indicator 112, or the third indicator 120) is not displayed on the display 28, the determination is set to negative, and the imaging support processing shifts to step ST100 shown in FIG. 24A. In step ST140, in a case where the indicator is displayed on the display 28, the determination is set to positive, and the imaging support processing shifts to step ST142.

In step ST142, the control unit 62D erases the indicator that is displayed on the display 28. After the processing in step ST142 is executed, the imaging support processing shifts to step ST100 shown in FIG. 24A.

In step ST144, in a case where the imaging support processing end condition is satisfied, the determination is set as positive, and the imaging support processing is ended.

As described above, in the imaging apparatus 10, the plurality of general subjects are detected based on the captured image 75, and the specific subject and the peripheral subject, which is present within a range of the first distance from the specific subject in the in-plane direction of the captured image 75, are selected from among the detected plurality of general subjects. Thereafter, the imaging apparatus 10 outputs the display data 99 and 115 to the display 28. The display data 99 is data for displaying the captured image 75 on the display 28, and the display data 115 is data for displaying the first indicator 110 and the second indicator 112 on the display 28. The first indicator 110 is an indicator that specifies the specific subject, and the second indicator 112 is an indicator that specifies the peripheral subject. Therefore, according to the present configuration, even in a case where the plurality of general subjects are densely gathered, it is possible to distinguish between the specific subject and the peripheral subject that are present within the range of the first distance from the specific subject in the in-plane direction of the captured image 75.

Further, the imaging apparatus 10 outputs the display data 123 to the display 28. The display data 123 is data for displaying the third indicator 120 instead of the first indicator 110 and the second indicator 112 on the display 28. Accordingly, the third indicator 120 is displayed on the display 28 instead of the first indicator 110 and the second indicator 112. The third indicator 120 is an indicator that specifies the specific subject and the peripheral subject within the second distance as one object. Therefore, according to the present configuration, it is possible to distinguish between the peripheral subject, which is a candidate for the specific subject, and the general subject other than the peripheral subject, among the plurality of general subjects.

Further, the imaging apparatus 10 detects the plurality of general subjects by using the general subject trained model 84. Therefore, according to the present configuration, it is possible to detect the plurality of general subjects with higher accuracy as compared with a case where the plurality of general subjects are detected by using the template matching type subject recognition processing.

Further, the third indicator 120 is an indicator in which the combination of the type of the specific subject and the type of the peripheral subject is the first combination defined in the first combination specification table 87, and the specific subject and peripheral subject that are present within the second distance from the specific subject are specified. Therefore, according to the present configuration, it is possible to suppress the distinguishing the type of combination of the specific subject and the peripheral subject that is not intended by the user or the like and other subjects among the plurality of general subjects, as compared with the case of specifying the specific subject and peripheral subject, which are within the second distance, as the indicators, regardless of the combination of the type of specific subject and the type of peripheral subject.

Further, in the imaging apparatus 10, the specific subject is selected according to a standard different from a standard for selecting the peripheral subject. That is, the specific subject is selected by using the specific subject trained model 86. Therefore, according to the present configuration, it is possible to make it easier for the user or the like to specify the intended subject as a specific subject as compared with the case where the peripheral subject is selected according to the same standard as the specific subject, that is, by using the specific subject trained model 86.

Further, in the imaging apparatus 10, the teacher data 88 is generated based on the selected subject, which is obtained in response to the instruction received by the reception device 76, and the specific subject is selected by using the specific subject trained model 86 obtained by performing the machine learning by using the teacher data 88. Therefore, according to the present configuration, it is possible to make it easier for the user or the like to specify the intended subject as a specific subject as compared with the case where the subject, which is selected based on the standard that is defined regardless of the instruction received by the reception device 76, is specified as the specific subject.

Further, in the imaging apparatus 10, a distance within the captured image 75 is used as the first distance that defines the area 100 within the first distance. Therefore, according to the present configuration, it is possible to easily select the peripheral subject presented in the in-plane direction of the captured image 75, as compared with the case of measuring a distance between the subjects in the real space.

Further, in the imaging apparatus 10, the selected subject position specification data 90A is used as a part of the teacher data 88. Therefore, according to the present configuration, it is possible to accurately specify the general subject that conforms to the tendency of positions where images are frequently specified in the captured image 75 as the specific subject among the plurality of general subjects, as compared with the case where the specific subject is specified only by the user's intuition.

In the above-described embodiment, although the third indicator 120 is exemplified in which the combination of the type of the specific subject and the type of the peripheral subject is the first combination defined in the first combination specification table 87, and the third indicator 120 is an indicator that specifies the specific subject and peripheral subject that are present within the second distance, the present disclosed technology is not limited to this. For example, the combination of the type of the specific subject and the type of the peripheral subject may be a second combination different from the first combination, and a fourth indicator 128 (see FIG. 25), which specifies the specific subject and peripheral subject that are present within a third distance that is shorter than the second distance, may be displayed on the display 28. Further, the third distance is an example of a "third distance" and a "default distance" according to the present disclosed technology.

Figure 25:
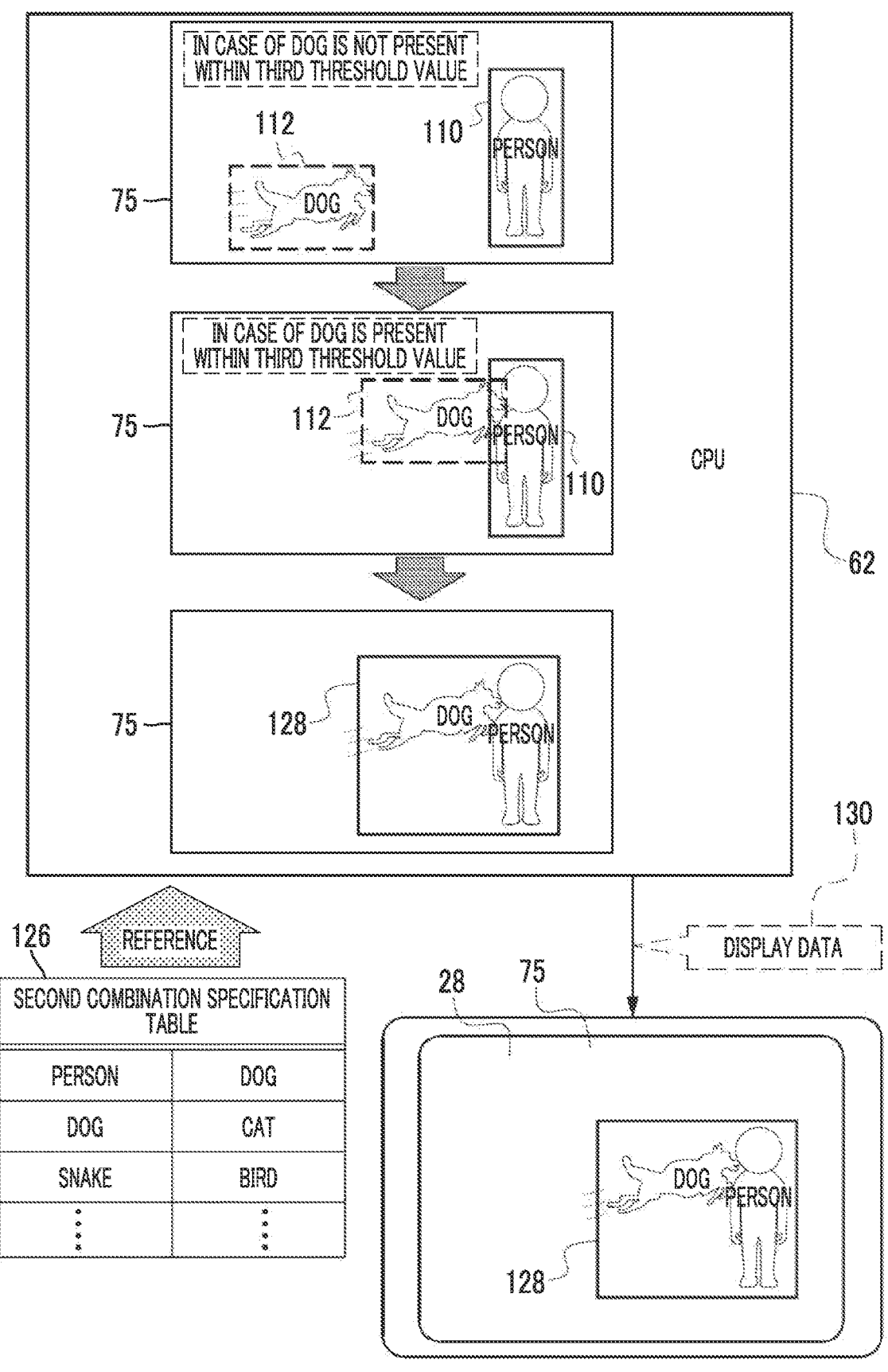
FIG. 25 is a conceptual diagram showing the content of a processing of generating and displaying a fourth indicator.

In this case, as an example shown in FIG. 25, the CPU 62 specifies the combination of the type of the specific subject and the type of the peripheral subject with reference to a second combination specification table 126. The second combination specification table 126 is a table in which a combination different from that of the first combination specification table 87 is defined. In the above-described embodiment, although the combination of subjects of the same type is shown as an example of the first combination specification table 87, the type of the specific subject and the type of the peripheral subject are different from each other in the second combination specification table 126.

In the example shown in FIG. 25, in the captured image 75, a person is shown as the specific subject surrounded by the first indicator 110, and a dog is shown as the peripheral subject surrounded by the second indicator 112. The person as the specific subject and the dog as the peripheral subject are a combination that is defined in the second combination specification table 126.

In the captured image 75, in a case of transitioning a state from a state in which the dog as the peripheral subject is present outside the third distance from the person as the specific subject to a state in which the dog as the peripheral subject is present within the third distance from the person as the specific subject, the CPU 62 erases first indicator 110 and second indicator 112 and generates the fourth indicator 128. Thereafter, the CPU 62 displays the captured image 75 on the display 28 and superimposes and displays the fourth indicator 128 on the captured image 75. That is, the CPU 62 generates the display data 130 for displaying the fourth indicator 128 on the display 28 instead of the first indicator 110 and the second indicator 112. The display data 130 is an example of "display data" and "second data" according to the present disclosed technology. The CPU 62 outputs the generated display data 130 to the display 28. The fourth indicator 128 is an indicator (a rectangular-shaped frame in the example shown in FIG. 25) that specifies, as one object, the person as the specific subject and the dog as the peripheral subject that are present within the third distance that is shorter than the second distance. Note that, the second combination specification table 126 may be any table that defines a combination different from a combination defined in the first combination specification table 87, may be a fixed combination, and may be a combination that is changed in response to the instruction received by the reception device 76.

According to the present configuration, it is possible to suppress the distinguishing the type of combination of the specific subject and the peripheral subject that is not intended by the user or the like and other subjects among the plurality of general subjects, as compared with the case of specifying the specific subject and peripheral subject, which are within the third distance that is shorter than the second distance, as the indicators, regardless of the combination of the type of specific subject and the type of peripheral subject. Further, in a case where the fourth indicator 128 is displayed on the display 28, since the CPU 62 erases the first indicator 110 and the second indicator 112 from the display 28, it is possible to avoid deterioration in the visibility of the captured image 75 due to an increase in the number of indicators.

Further, in the above-described embodiment, although an example of the embodiment in which the first indicator 110, the second indicator 112, the third indicator 120, and the fourth indicator 128 are selectively displayed on the display 28 has been described, the present disclosed technology is not limited to this. For example, the CPU 62 may output control data for control that is related to an imaging performed by the imaging apparatus 10, by using a region corresponding to at least a part of the first indicator 110, the second indicator 112, or the third indicator 120 while displaying the first indicator 110, the second indicator 112, and the third indicator 120 or without displaying the first indicator 110, the second indicator 112, and the third indicator 120.

Figure 26:
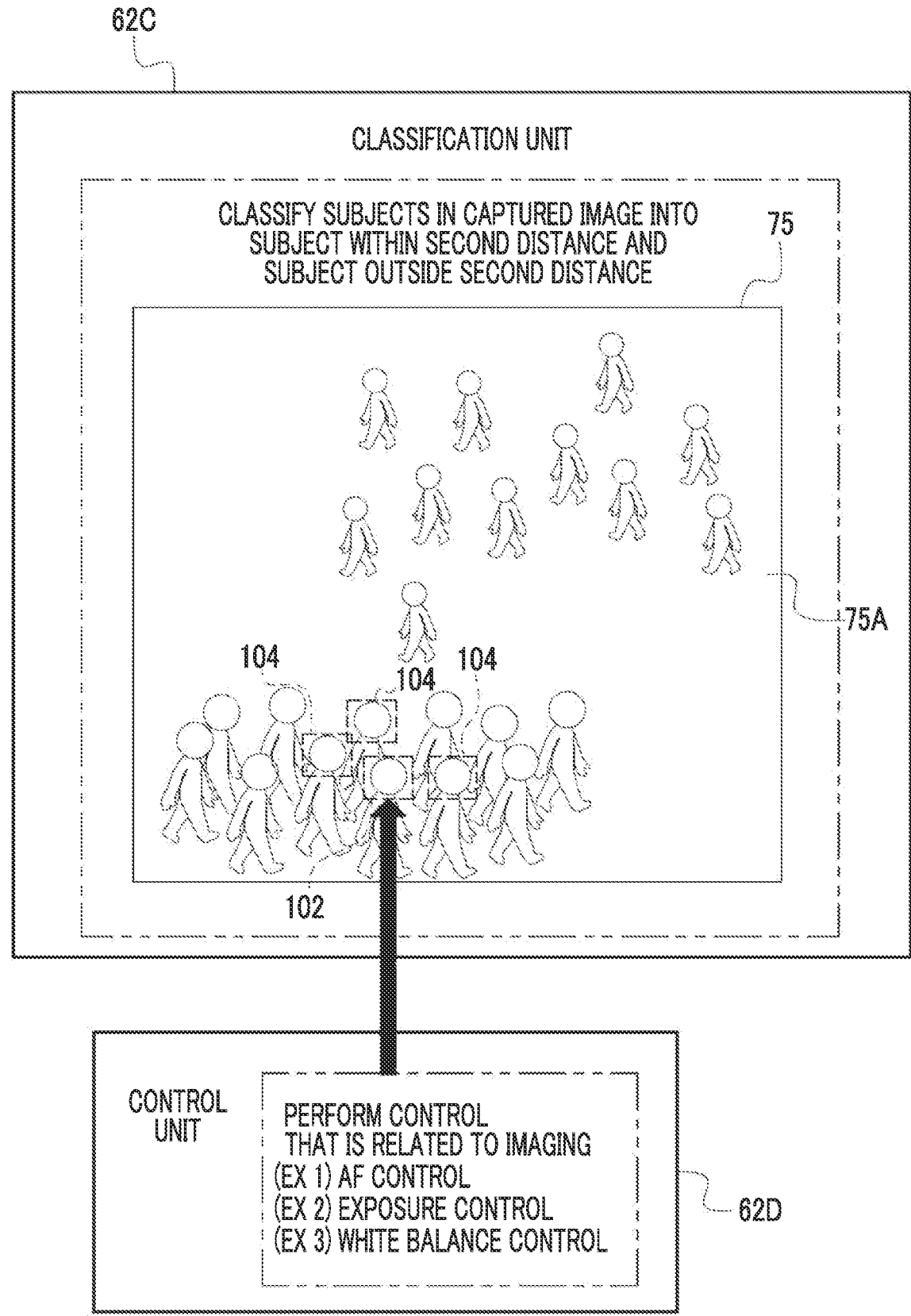
FIG. 26 is a conceptual diagram showing the content of processing of performing control that is related to an imaging.

In this case, for example, as shown in FIG. 26, the control unit 62D performs the control, which is related to the imaging, on the region corresponding to the specific subject (a region surrounded by the first hypothetical frame 102) as the subject within the second distance. Examples of the control that is related to the imaging include AF control, exposure control, and white balance control.

Figure 27:
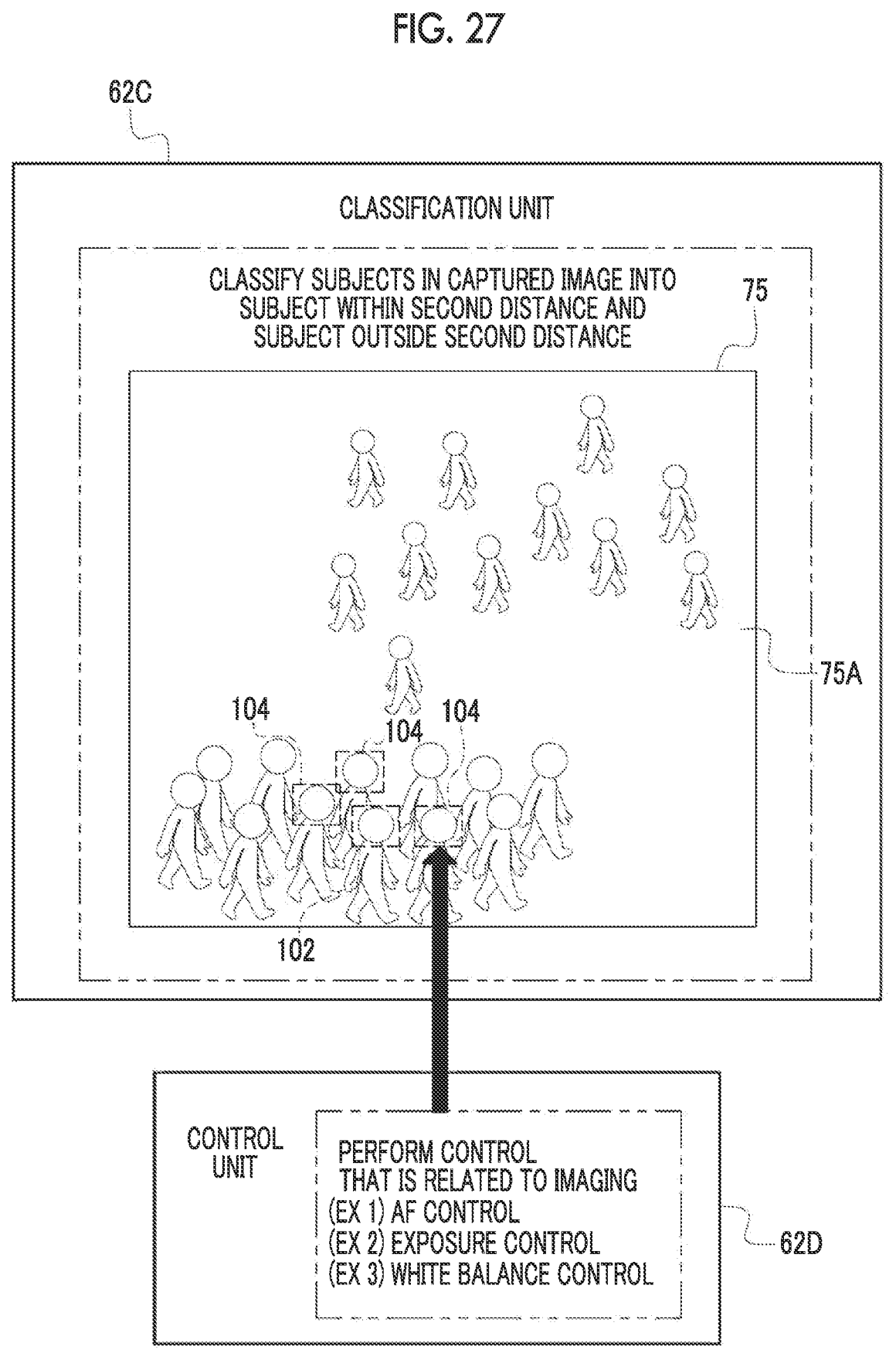

In the example shown in FIG. 26, although the control, which is related to the imaging, is performed on the region corresponding to the specific subject as the subject within the second distance, the present embodiment is not limited to this, and for example, as shown in FIG. 27, the control, which is related to the imaging, may be performed on the region corresponding to the peripheral subject (a region surrounded by the second hypothetical frame 104) as the subject within the second distance.

Figure 28:
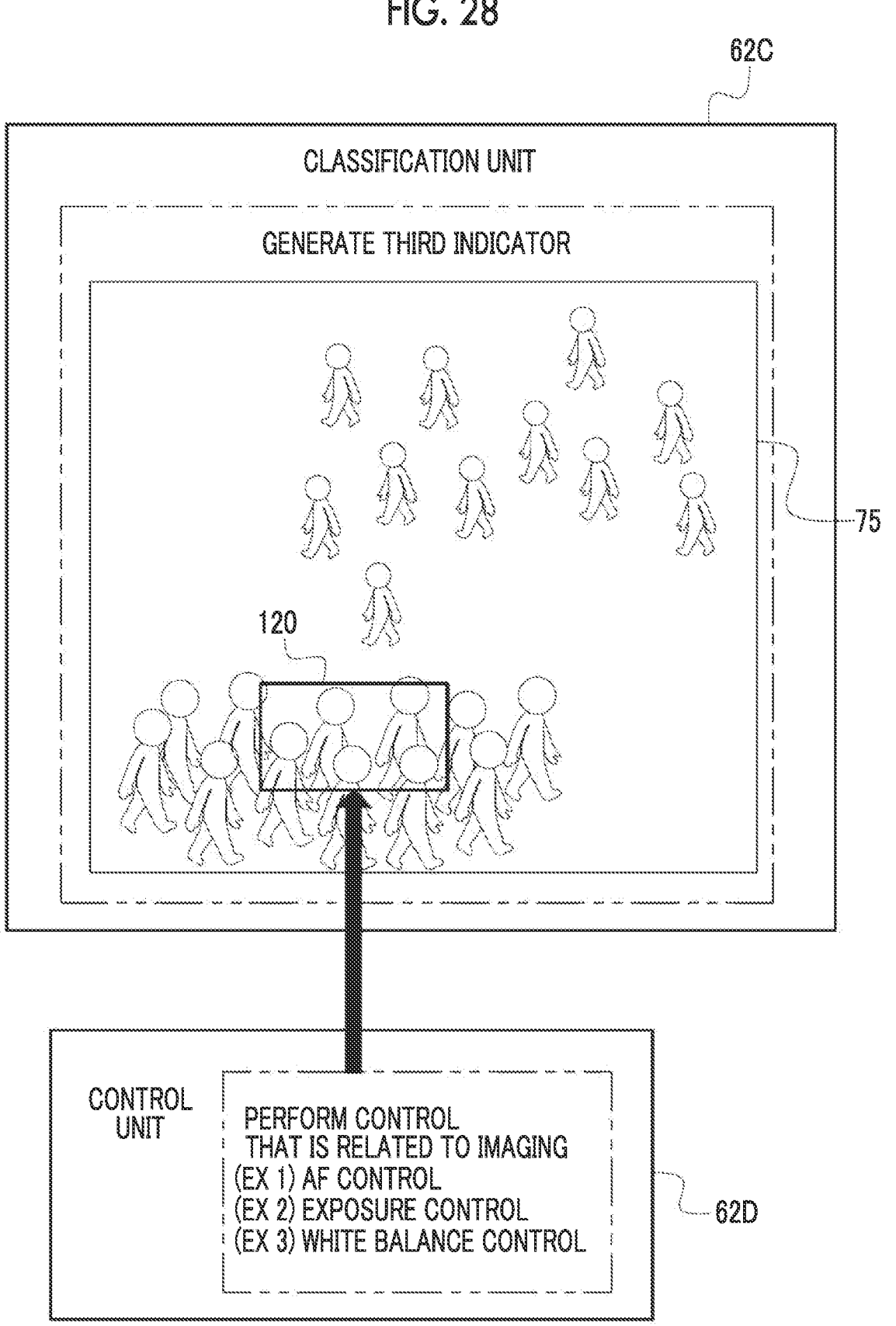
FIG. 28 is a conceptual diagram showing the content of processing of performing control that is related to an imaging.

Further, for example, as shown in FIG. 28, the control, which is related to the imaging, may be performed on a region corresponding to the entire third indicator 120. Further, instead of the third indicator 120, the control, which is related to the imaging, may be performed on a region corresponding to at least a part of the fourth indicator 128 (see FIG. 25).

According to these configurations, it is possible to suppress that the control, which is related to the imaging, is performed on a region that is not intended by the user or the like as compared with the case where the control, which is related to the imaging, is performed on a location different from a location where the indicator is positioned.

The region corresponding to the first indicator 110 is an example of a "first region corresponding to the first subject" according to the present disclosed technology. Further, the region corresponding to the second indicator 112 is an example of a "second region corresponding to the second subject" according to the present disclosed technology. Further, the third indicator 120 and the fourth indicator 128 are "object indicators" according to the present disclosed technology. Further, the region corresponding to the third indicator 120 and the region corresponding to the fourth indicator 128 are examples of a "third region corresponding to the first subject and the second subject" according to the present disclosed technology.

Figure 29:
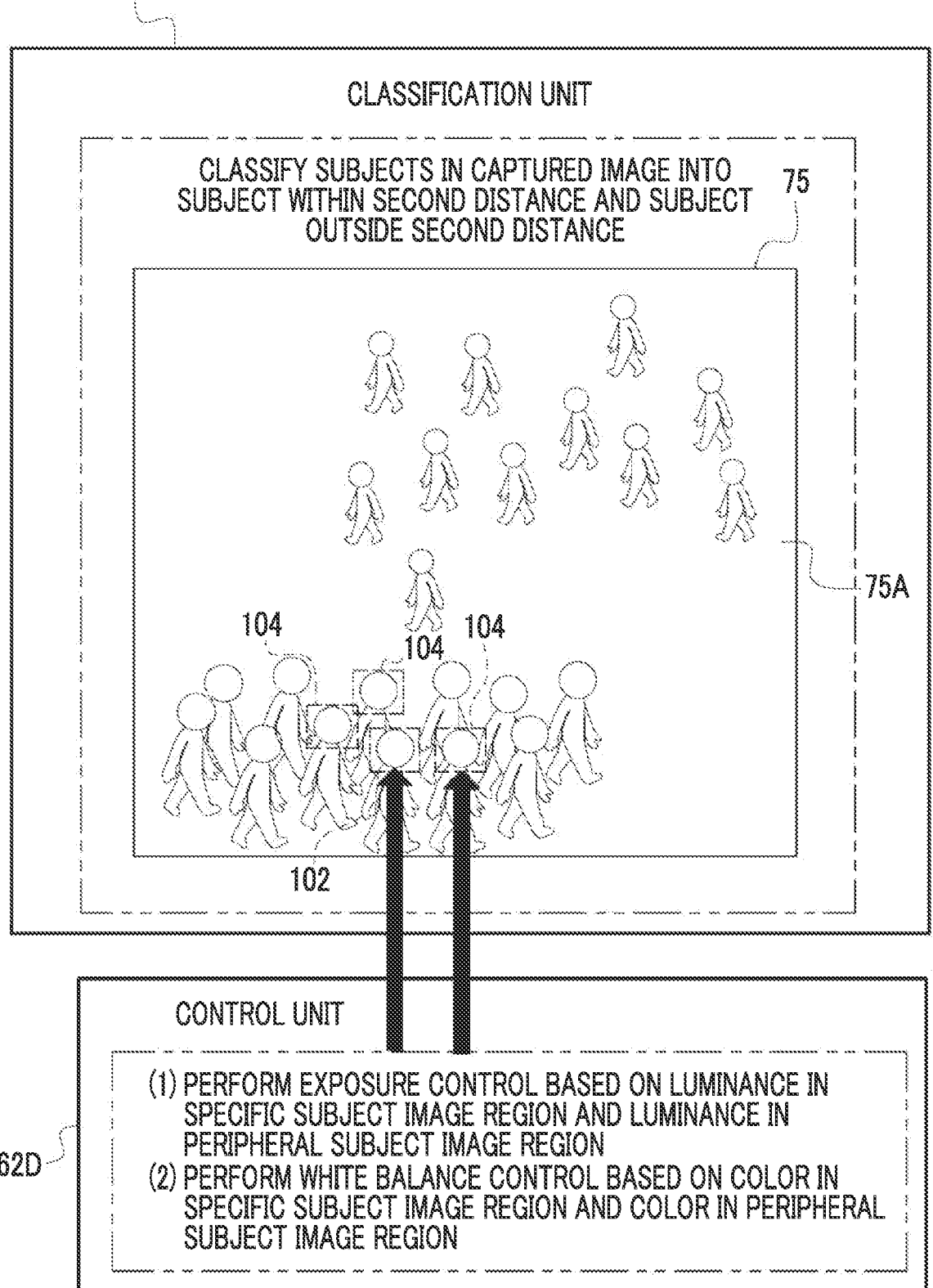
FIG. 29 is a conceptual diagram showing the content of processing of performing control that is related to an imaging.

Further, as an example shown in FIG. 29, in a case where the exposure control is performed on the region corresponding to the specific subject (the region surrounded by the first hypothetical frame 102) as the subject within the second distance and the region corresponding to the peripheral subject (the region surrounded by the second hypothetical frame 104) as the subject within the second distance, the control unit 62D may perform the exposure control based on the luminance in the specific subject image region indicating the specific subject in the image region 75A and the luminance in the peripheral subject image region indicating the peripheral subject in the image region 75A. In this case, it is possible to suppress overexposure or underexposure of the specific subject or the peripheral subject due to a difference in brightness between the specific subject and the peripheral subject in a case where the specific subject and the peripheral subject are imaged as compared with the case where the exposure control is performed by using only the luminance in the specific subject image region or the luminance in the peripheral subject image region. Here, the luminance is an example of "brightness" according to the present disclosed technology.

Further, as an example shown in FIG. 29, in a case where the white balance control is performed on the region corresponding to the specific subject (the region surrounded by the first hypothetical frame 102) as the subject within the second distance and the region corresponding to the peripheral subject (the region surrounded by the second hypothetical frame 104) as the subject within the second distance, the control unit 62D may perform the white balance control based on the color in the specific subject image region (for example, a color signal) indicating the specific subject in the image region 75A and the color in the peripheral subject image region (for example, a color signal) indicating the peripheral subject in the image region 75A. In this case, it is possible to suppress the occurrence of bias in white balance of the specific subject or the peripheral subject due to a difference in brightness between the specific subject and the peripheral subject in a case where the specific subjects and the peripheral subject are imaged as compared with the case where the white balance control is performed by using only the color in the specific subject image region or the color in the peripheral subject image region.

In the above-described embodiment, although the data, which includes the selected subject position specification data 90A and the selected subject type specification data 90B, is exemplified as the selected subject data 90 included in the teacher data 88, the present disclosed technology is not limited to this, and the present disclosed technology is established even without one or both of the selected subject position specification data 90A and the selected subject type specification data 90B. In this case, for example, as shown in FIG. 30, at least one of subject mode data 90C, depth of field data 90D, distance data 90E, positional relationship data 90F, or an occupancy ratio parameter 90G may be used as data to be associated with the captured image 75, together with at least one of the selected subject position specification data 90A or the selected subject type specification data 90B, or instead of the selected subject position specification data 90A and the selected subject type specification data 90B. That is, the machine learning may be performed on the training model using the tendency of the user's selection regarding the subject mode, the depth of field, the distance, the positional relationship, and/or the occupancy ratio or the like, as the teacher data 88.

The subject mode data 90C is data that is capable of specifying the mode of the subject. The mode of the subject refers to, for example, a facial expression of a person, whether or not a person is wearing a hat, color of clothing, color of skin, color of eyes, and/or color of hair. According to the present configuration, it is possible to make it easier to specify the subject intended by a user or the like as the specific subject as compared with a case where the specific subject is specified based on a predetermined standard without considering the mode of the subject.

The depth of field data 90D is data that is capable of specifying the depth of field used in the imaging of the captured image 75. According to the present configuration, it is possible to make it easier to specify the subject intended by a user or the like as the specific subject as compared with a case where the specific subject is specified based on a predetermined standard without considering the depth of field.

The distance data 90E is a distance (for example, an imaging distance, a walking distance, and/or a subject distance) from the imaging apparatus 10 to the subject. According to the present configuration, it is possible to make it easier to specify the subject intended by a user or the like as the specific subject as compared with a case where the specific subject is specified based on a predetermined standard without considering the distance from the imaging apparatus 10 to the subject.

The positional relationship data 90F is data that is capable of specifying the positional relationship between the selected subject and the remaining subject. The data that is capable of specifying the positional relationship between the selected subject and the remaining subjects refers to, for example, data that is capable of specifying that the selected subject is positioned at the center of the front row in a case of taking a group photo including the selected subject. According to the present configuration, it is possible to specify the specific subject with higher accuracy as compared with a case where the specific subject is specified only by the intuition of the user or the like.

The occupancy ratio parameter 90G is an example of a "parameter specified from a captured image" according to the present disclosed technology. The occupancy ratio parameter 90G is a ratio (for example, a ratio in which an image indicating the selected subject is occupied) that the selected subject occupies in the captured image 75. In the example shown in FIG. 30, 25% is exemplified as the occupancy ratio parameter 90G. According to the present configuration, it is possible to accurately specify the general subject, as the specific subject, which conforms to the tendency of the ratio that the frequently designated image in the captured image 75 occupies in the captured image 75 among the plurality of general subjects, as compared with the case where the specific subject is specified only by the user's intuition.

Figure 31:
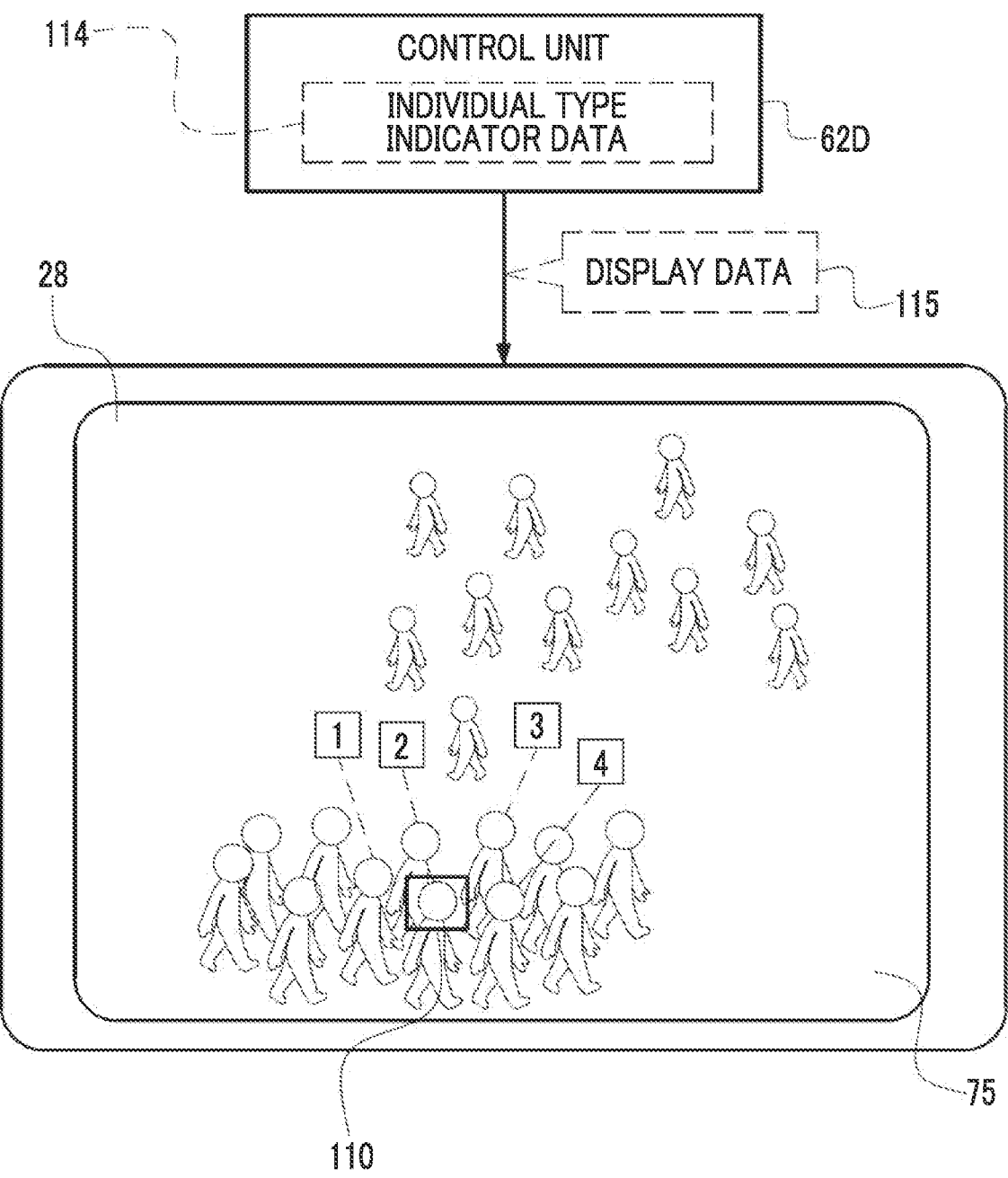
FIG. 31 is a conceptual diagram showing a modification example of an indicator attached to a peripheral subject.

Further, in the above-described embodiment, although the second indicator 112 is exemplified as an indicator that specifies the peripheral subject, the present disclosed technology is not limited to this. For example, as shown in FIG. 31, a number, which specifies the peripheral subject, may be displayed on the display 28 in a state of being associated with peripheral specific subject instead of the second indicator 112 or together with the second indicator 112. Further, the symbol may be displayed on the display 28 in a state of being associated with the peripheral specific subject instead of the number or together with the number. In this case, the number and/or the symbol may be designated by a voice that is recognized by a voice recognition function or may be designated by operating a soft key, a hard key, or the like. According to the present configuration, a user or the like can designate the peripheral subject, which is intended by the user or the like, by using the number and/or the symbol.

Figure 32:
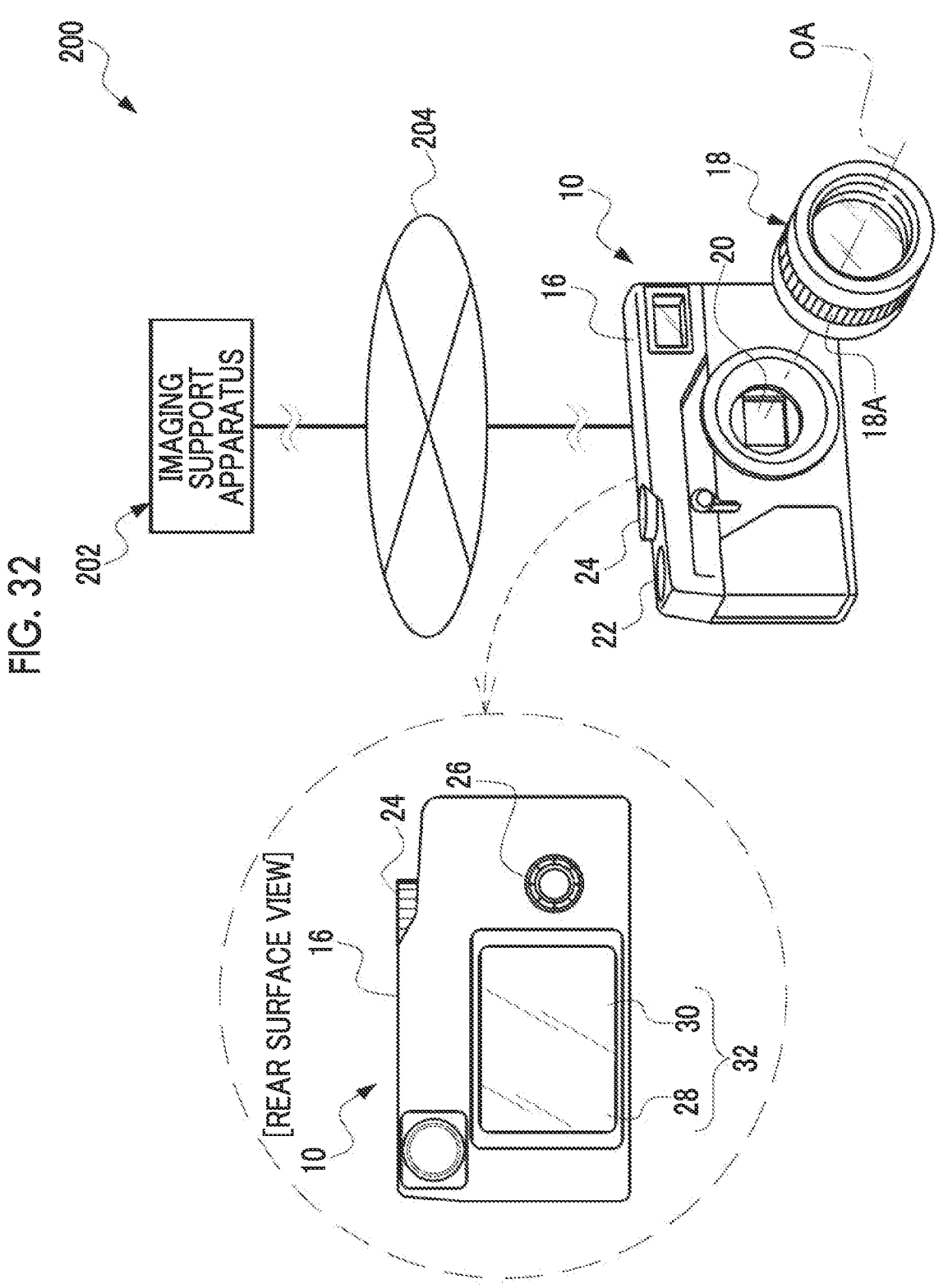
FIG. 32 is a conceptual diagram showing an example of a configuration of an imaging system.

Further, in the above-described embodiment, although the controller 12, which is built in the imaging apparatus 10, has been described as an example of the "image processing apparatus" according to the present disclosed technology, this is only an example. For example, as shown in FIG. 32, the present disclosed technology is also established by an imaging system 200. In the example shown in FIG. 32, the imaging system 200 includes the imaging apparatus 10 and the imaging support apparatus 202, which is an example of the "image processing apparatus" according to the present disclosed technology. The imaging apparatus main body 16 is connected to the imaging support apparatus 202 via the network 204. The imaging support apparatus 202 has at least a part of the functions of the imaging support processing described in the above-described embodiment.

The network 204 is, for example, the Internet. The network 204 is not limited to the Internet and may be a WAN and/or a LAN such as an intranet. The imaging support apparatus 202 is a server that provides the imaging apparatus 10 with a service in response to a request from the imaging apparatus 10. The server may be a mainframe used on-premises together with the imaging apparatus 10 or may be an external server implemented by cloud computing. Further, the server may be an external server implemented by network computing such as fog computing, edge computing, or grid computing. Here, although a server is exemplified as an example of the imaging support apparatus 202, this is only an example, and at least one personal computer or the like may be used as the imaging support apparatus 202 instead of the server.

Further, in the above embodiment, although the CPU 62 is exemplified, at least one other CPU, at least one GPU, and/or at least one TPU may be used instead of the CPU 62 or together with the CPU 62.

In the above embodiment, although an example of the embodiment in which the imaging support processing program 80 is stored in the NVM 64 has been described, the present disclosed technology is not limited to this. For example, the imaging support processing program 80 may be stored in a portable non-temporary storage medium such as an SSD or a USB memory. The imaging support processing program 80, which is stored in the non-temporary storage medium, is installed in the controller 12 of the imaging apparatus 10. The CPU 62 executes the imaging support processing according to the imaging support processing program 80.

Further, the imaging support processing program 80 may be stored in the storage device such as another computer or a server device connected to the imaging apparatus 10 via the network, the imaging support processing program 80 may be downloaded in response to the request of the imaging apparatus 10, and the imaging support processing program 80 may be installed in the controller 12.

It is not necessary to store all of the imaging support processing programs 80 in the storage device such as another computer or a server device connected to the imaging apparatus 10 or the NVM 64, and a part of the imaging support processing program 80 may be stored, a part of the imaging support processing program 80 may be stored.

Further, although the imaging apparatus 10 shown in FIG. 1 and FIG. 2 has a built-in controller 12, the present disclosed technology is not limited to this, and for example, the controller 12 may be provided outside the imaging apparatus 10 (for example, see FIG. 32).

In the above embodiment, although the controller 12 is exemplified, the present disclosed technology is not limited to this, and a device including an ASIC, FPGA, and/or PLD may be applied instead of the controller 12. Further, instead of the controller 12, a combination of a hardware configuration and a software configuration may be used.

As a hardware resource for executing the imaging support processing described in the above embodiment, the following various processors can be used. Examples of the processor include software, that is, a CPU, which is a general-purpose processor that functions as a hardware resource for executing the imaging support processing by executing a program. Further, examples of the processor include a dedicated electric circuit, which is a processor having a circuit configuration specially designed for executing specific processing such as FPGA, PLD, or ASIC. A memory is built-in or connected to any processor, and each processor executes the imaging support processing by using the memory.

The hardware resource for executing the imaging support processing may be configured with one of these various processors or may be configured with a combination (for example, a combination of a plurality of FPGAs or a combination of a CPU and an FPGA) of two or more processors of the same type or different types. Further, the hardware resource for executing the imaging support processing may be one processor.

As an example of configuring with one processor, first, one processor is configured with a combination of one or more CPUs and software, and there is an embodiment in which this processor functions as a hardware resource for executing the imaging support processing. Secondly, as typified by SoC, there is an embodiment in which a processor that implements the functions of the entire system including a plurality of hardware resources for executing the imaging support processing with one IC chip is used. As described above, the imaging support processing is implemented by using one or more of the above-mentioned various processors as a hardware resource.

Further, as the hardware-like structure of these various processors, more specifically, an electric circuit in which circuit elements such as semiconductor elements are combined can be used. Further, the above-mentioned imaging support processing is only an example. Therefore, it goes without saying that unnecessary steps may be deleted, new steps may be added, or the processing order may be changed within a range that does not deviate from the purpose.

The contents described above and the contents shown in the illustration are detailed explanations of the parts related to the present disclosed technology and are only an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustration, within the range that does not deviate from the purpose of the present disclosed technology. Further, in order to avoid complications and facilitate understanding of the parts of the present disclosed technology, in the contents described above and the contents shown in the illustration, the descriptions related to the common technical knowledge or the like that do not require special explanation in order to enable the implementation of the present disclosed technology are omitted.

In the present specification, "A and/or B" is synonymous with "at least one of A or B." That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

What is claimed is:

1. An image processing apparatus comprising:
a processor; and
a memory that is connected to or built into the processor,
wherein the processor is configured to:
    detect a plurality of subjects based on a captured image obtained by being captured by an imaging apparatus;
    select, from among the plurality of subjects, a first subject and a second subject that is present in an in-plane direction of the captured image, within a range of a first pixel distance from the first subject in a plane of the captured image; and
    output display data for displaying, on a display, the captured image, a first indicator that specifies a first subject image showing the first subject, and a second indicator that specifies a second subject image showing the second subject in a mode different from a mode of the first indicator.

2. The image processing apparatus according to claim 1, wherein the processor is configured to detect the plurality of subjects according to a first standard.

3. The image processing apparatus according to claim 1, wherein the processor is configured to detect the first subject based on a second standard different from a standard for detecting the second subject.

4. The image processing apparatus according to claim 3, wherein the second standard is a standard defined based on at least one of a distance from the imaging apparatus, a depth of field, or a mode of the subject.

5. The image processing apparatus according to claim 3, wherein the second standard is a standard defined based on an instruction received by a reception device.

6. The image processing apparatus according to claim 1, wherein the second indicator includes at least one of a number or a symbol specifying the second subject image.

7. The image processing apparatus according to claim 1, wherein the first pixel distance is a distance within the captured image.

8. An image processing apparatus comprising:
a processor; and
a memory that is connected to or built into the processor,
wherein the processor is configured to:
    detect a plurality of subjects based on a captured image obtained by being captured by an imaging apparatus;
    select, from among the plurality of subjects, a first subject and a second subject that is present within a range of a first distance from the first subject in an in-plane direction of the captured image; and
    output display data for displaying, on a display, the captured image, a first indicator that specifies a first subject image showing the first subject, and a second indicator that specifies a second subject image showing the second subject in a mode different from a mode of the first indicator,
wherein the display data includes first data for displaying a third indicator, which specifies the first subject and the second subject that are present within a second distance in the in-plane direction, on the display.

9. The image processing apparatus according to claim 8, wherein the first data includes data for erasing the first indicator and the second indicator from the display in a case where the third indicator is displayed on the display.

10. The image processing apparatus according to claim 8, wherein the processor is configured to acquire a type of each of the plurality of subjects based on the captured image, and
the third indicator is an indicator in which a combination of a type of the first subject and a type of the second subject is a first combination, and the first subject and the second subject that are present within the second distance are specified.

11. The image processing apparatus according to claim 8, wherein the processor is configured to acquire a type of each of the plurality of subjects based on the captured image, and
the display data includes second data for displaying, on the display, a fourth indicator in which a combination of a type of the first subject and a type of the second subject is a second combination that is different from the first combination, and the first subject and the second subject that are present within a third distance shorter than the second distance are specified.

12. The image processing apparatus according to claim 11,
 wherein the second data includes data for erasing the first indicator and the second indicator from the display in a case where the fourth indicator is displayed on the display.

13. An image processing apparatus comprising:
 a processor; and
 a memory that is connected to or built into the processor,
 wherein the processor is configured to:
  detect a plurality of subjects based on a captured image obtained by being captured by an imaging apparatus;
  select, from among the plurality of subjects, a first subject and a second subject that is present within a range of a first distance from the first subject in an in-plane direction of the captured image; and
  output display data for displaying, on a display, the captured image, a first indicator that specifies a first subject image showing the first subject, and a second indicator that specifies a second subject image showing the second subject in a mode different from a mode of the first indicator,
 wherein the display data includes data for displaying a third indicator, which specifies the first subject and the second subject that are present within a second distance in the in-plane direction, on the display instead of the first indicator and the second indicator.

14. An image processing apparatus comprising:
 a processor; and
 a memory that is connected to or built into the processor,
 wherein the processor is configured to:
  detect a plurality of subjects based on a captured image obtained by being captured by an imaging apparatus;
  select, from among the plurality of subjects, a first subject and a second subject that is present within a range of a first distance from the first subject in an in-plane direction of the captured image; and
  output display data for displaying, on a display, the captured image, a first indicator that specifies a first subject image showing the first subject, and a second indicator that specifies a second subject image showing the second subject in a mode different from a mode of the first indicator,
 wherein the processor is configured to output, in a case where an object indicator, which specifies the first subject and the second subject that are present within a default distance as one object, is displayed on the display, control data for control that is related to imaging performed by the imaging apparatus, by using a region corresponding to at least a part of the object specified based on the object indicator.

15. The image processing apparatus according to claim 14,
 wherein the region corresponding to at least a part of the object is at least one of a first region corresponding to the first subject, a second region corresponding to the second subject, or a third region corresponding to the first subject and the second subject.

16. The image processing apparatus according to claim 14,
 wherein the control that is related to the imaging includes at least one of exposure control, focus control, or white balance control.

17. The image processing apparatus according to claim 16,
 wherein the region corresponding to at least a part of the object is a first region corresponding to the first subject and a second region corresponding to the second subject, and
 the processor is configured to perform the exposure control based on a brightness of the first region corresponding to the first subject and a brightness of the second region corresponding to the second subject.

18. The image processing apparatus according to claim 16,
 wherein the region corresponding to at least a part of the object is a first region corresponding to the first subject and a second region corresponding to the second subject, and
 the processor is configured to perform the white balance control based on color of the first region corresponding to the first subject and color of the second region corresponding to the second subject.

19. An image processing apparatus comprising:
 a processor; and
 a memory that is connected to or built into the processor,
 wherein the processor is configured to:
  detect a plurality of subjects based on a captured image obtained by being captured by an imaging apparatus;
  select, from among the plurality of subjects, a first subject and a second subject that is present within a range of a first distance from the first subject in an in-plane direction of the captured image; and
  output display data for displaying, on a display, the captured image, a first indicator that specifies a first subject image showing the first subject, and a second indicator that specifies a second subject image showing the second subject in a mode different from a mode of the first indicator,
 wherein the processor is configured to specify the first subject by using a trained model obtained by performing machine learning that uses, as teacher data, information including at least one of a parameter specified based on the captured image, a positional relationship between a selected subject that is selected according to an instruction received by a reception device from among the plurality of subjects and a remaining subject, or a mode of the selected subject.

20. The image processing apparatus according to claim 19,
 wherein the captured image includes a first designated subject image that shows a subject designated among the plurality of subjects, and
 the parameter includes a relative position of the first designated subject image in the captured image.

21. The image processing apparatus according to claim 19,
 wherein the captured image includes a second designated subject image that shows a subject designated among the plurality of subjects, and
 the parameter includes a value based on a ratio of the second designated subject image within the captured image.

22. An imaging apparatus comprising:
 a processor;
 a memory that is connected to or built into the processor; and
 an image sensor,
 wherein the processor is configured to:
  detect a plurality of subjects based on a captured image obtained by being captured by the image sensor;

select, from among the plurality of subjects, a first subject and a second subject that is present in an in-plane direction of the captured image, within a range of a first pixel distance from the first subject in a plane of the captured image; and display, on a display, the captured image, a first indicator that specifies a first subject image showing the first subject, and a second indicator that specifies a second subject image showing the second subject in a mode different from a mode of the first indicator.

23. An image processing method comprising:

detecting a plurality of subjects based on a captured image obtained by being captured by an imaging apparatus;

selecting, from among the plurality of subjects, a first subject and a second subject that is present in an in-plane direction of the captured image, within a range of a first pixel distance from the first subject in a plane of the captured image; and outputting display data for displaying, on a display, the captured image, a first indicator that specifies a first subject image showing the first subject, and a second indicator that specifies a second subject image showing the second subject in a mode different from a mode of the first indicator.

24. A non-transitory computer-readable storage medium storing a program executable by a computer to perform a process comprising:

detecting a plurality of subjects based on a captured image obtained by being captured by an imaging apparatus;

selecting, from among the plurality of subjects, a first subject and a second subject that is present in an in-plane direction of the captured image, within a range of a first pixel distance from the first subject in a plane of the captured image; and outputting display data for displaying, on a display, the captured image, a first indicator that specifies a first subject image showing the first subject, and a second indicator that specifies a second subject image showing the second subject in a mode different from a mode of the first indicator.

* * * * *